United States Patent
Kitagawa et al.

(10) Patent No.: US 12,227,821 B2
(45) Date of Patent: Feb. 18, 2025

(54) ALLOY OF AT LEAST THREE METAL ELEMENTS, AGGREGATE OF ALLOY NANOPARTICLES, AND CATALYST

(71) Applicant: KYOTO UNIVERSITY, Kyoto (JP)

(72) Inventors: Hiroshi Kitagawa, Kyoto (JP); Kohei Kusada, Kyoto (JP); Syo Matsumura, Fukuoka (JP); Tomokazu Yamamoto, Fukuoka (JP); Xuan Quy Tran, Fukuoka (JP)

(73) Assignee: KYOTO UNIVERSITY, Kyoto (JP)

( * ) Notice: Subject to any disclaimer, the term of this patent is extended or adjusted under 35 U.S.C. 154(b) by 0 days.

(21) Appl. No.: 18/004,561

(22) PCT Filed: Jul. 6, 2021

(86) PCT No.: PCT/JP2021/025438
§ 371 (c)(1),
(2) Date: Jan. 6, 2023

(87) PCT Pub. No.: WO2022/009870
PCT Pub. Date: Jan. 13, 2022

(65) Prior Publication Data
US 2023/0279526 A1 Sep. 7, 2023

(30) Foreign Application Priority Data
Jul. 6, 2020 (JP) .................. 2020-116140

(51) Int. Cl.
*C22C 5/04* (2006.01)
*B22F 1/054* (2022.01)
(Continued)

(52) U.S. Cl.
CPC ............. *C22C 30/00* (2013.01); *B22F 1/054* (2022.01); *B22F 1/18* (2022.01); *B22F 9/06* (2013.01);
(Continued)

(58) Field of Classification Search
CPC ........ C22C 5/04; B22F 9/24; B22F 2009/245; B22F 1/054
See application file for complete search history.

(56) References Cited

U.S. PATENT DOCUMENTS

2020/0001370 A1* 1/2020 Kitagawa .............. C22C 1/0466
2020/0313201 A1* 10/2020 Martinez Bonastre ......................
H01M 4/925
(Continued)

FOREIGN PATENT DOCUMENTS

CN 110137514 A * 8/2019 ............ B82Y 30/00
JP 2006-202698 A 8/2006
(Continued)

OTHER PUBLICATIONS

Translation of CN 110137514 A (Year: 2019).*
Translation of JP 2016041780 A (Year: 2016).*
Translation of JP 2018141232 A (Year: 2018).*
Bondesgaard, et al., General Solvothermal Synthesis Method for Complete Solubility Range Bimetallic and High-Entropy Alloy Nanocatalysts, Advanced Functional Materials, 2019, 1905933, pp. 1-9.
(Continued)

*Primary Examiner* — Hoa (Holly) Le
(74) *Attorney, Agent, or Firm* — FISHERBROYLES, LLP; Roger L. Browdy

(57) ABSTRACT

An alloy composed of three or more types of elements, wherein all the standard deviation of distribution in the alloy of each element constituting the alloy are 15 atomic % or less provides a novel alloy composed of three or more types of elements and having a high solid solution uniformity.

12 Claims, 54 Drawing Sheets

(51) Int. Cl.
 *B22F 1/18* (2022.01)
 *B22F 9/06* (2006.01)
 *C22C 5/00* (2006.01)
 *C22C 30/00* (2006.01)

(52) U.S. Cl.
 CPC ............ *C22C 5/00* (2013.01); *B22F 2301/25* (2013.01); *B22F 2304/054* (2013.01)

(56) References Cited

U.S. PATENT DOCUMENTS

2020/0391285 A1* 12/2020 Choe .................... B42D 25/369
2022/0258231 A1* 8/2022 Kitagawa .................. B22F 1/00

FOREIGN PATENT DOCUMENTS

| JP | 2008-49336 | A |   | 3/2008 |
| JP | 2016041780 | A | * | 3/2016 |
| JP | 2016138324 | A | * | 8/2016 |
| JP | 2018141232 | A | * | 9/2018 |
| WO | 2017150596 | A1 |   | 9/2017 |
| WO | 2019/098599 | A1 |   | 5/2019 |

OTHER PUBLICATIONS

International Preliminary Report on Patentability dated May 17, 2022, from corresponding International application No. PCT/JP2021/025438.
International Search reported dated Sep. 8, 2021, from corresponding PCT/JP2021/025438.
Japanese office action dated Feb. 24, 2023, from corresponding Japanese patent application No. 2022-535337.
Rekha, et al., First Report on High Entropy Alloy Nanoparticle Decorated Graphene, Scientific Reports, 8(8737):1-10 (2018).
Waag, et al., Kinetically-controlled laser-synthesis of colloidal high-entropy allow nanoparticles, RSC Adv., 9:18547-18558 (2019).
Yao, et al., Carbothermal shock synthesis of high-entropy-alloy nanoparticles, Science, 359:1489-1494 (2018).
Decision of Refusal dated Jun. 11, 2024, issued in the corresponding Japanese patent application No. 2022-535337 with its English Machine Translation.
Extended European Search Report dated Jul. 19, 2024 issued in the corresponding European patent application No. 21837604.4.

* cited by examiner

8.9 ± 1.7 nm

11.1±2.5 nm

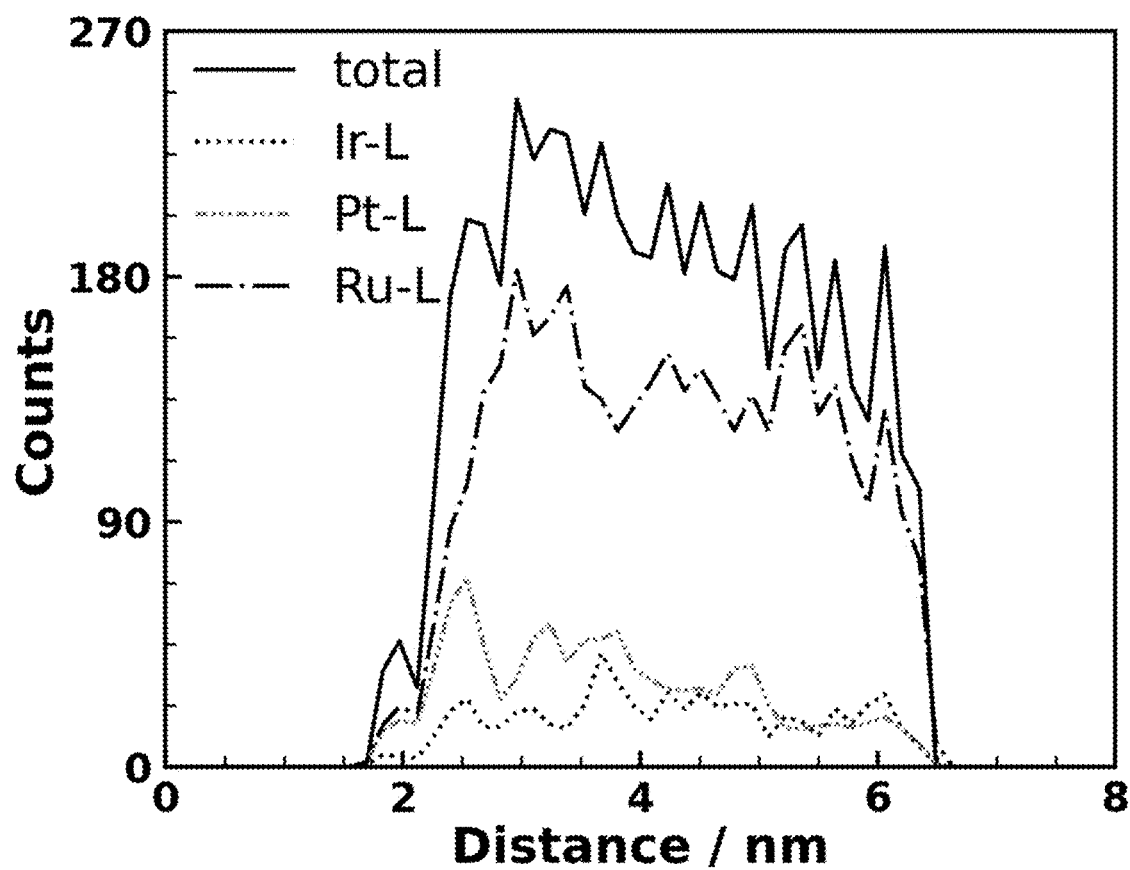

fcc-PtIrRu hcp-PtIrRu (A) fcc-PtIrRu 3.5±0.56 nm (B) hcp-PtIrRu 3.0±0.34 nm (A)PdRuB (B)PdRu

ALLOY OF AT LEAST THREE METAL ELEMENTS, AGGREGATE OF ALLOY NANOPARTICLES, AND CATALYST

TECHNICAL FIELD

The present invention relates to an alloy, an aggregate of alloy nanoparticles, and a catalyst. In particular, the invention relates to a novel alloy or aggregate of alloy nanoparticles composed of three or more types of elements and having a high solid solution uniformity, and to a catalyst containing such an alloy or an aggregate of alloy nanoparticles.

BACKGROUND ART

A solid solution alloy of metal elements in such a combination that are immiscible at the atom level, and a high-entropy alloy nanoparticles are known (see PTL 1 and NPLs 1 to 4).

PTL 1 describes that multicomponent solid solution alloy fine particles prepared by adding a third element M (M is at least one of Rh, Ir, Au, Ag and Pt) to PdRu can maintain catalyst performance even when used for a long period of time at a high temperature. PTL 1 does not define the uniformity in preparing a solid solution (or mixing) of an alloy.

NPL 1 discloses a method for producing high-entropy alloy nanoparticles in which five or more types of metal salts are supported on a carbon material (carbon nanofiber) and a large current is applied thereto so as to rapidly heat it at a high temperature of 2000 K or more and then to rapidly cool it. In the right column on page 3, NPL 1 says that in PtPdCoNiFe of a mixture of 5 elements, the element composition dispersion is around 10%, and is small as compared with that in lithography where the dispersion may be more than 50%.

NPL 2 describes a production method for forming high-entropy alloy nanoparticles on a graphene carrier by mechanically powdering a graphene carrier and a metal. The elementary composition of FeCrCoCuNi nanoparticles shown in FIG. 9 does not indicate uniform mixing.

NPL 3 describes a production method for obtaining nanoparticles by applying a laser to a high-entropy alloy target of a bulk of a 3d transition metal (4th period). Table 2 therein shows a composition of CoCrFeMnNi nanoparticles but does not indicate uniformity of mixing.

NPL 4 describes a production method for obtaining nanoparticles by solvothermal analysis at around 200° C. using an organic metal salt of a platinum group element. FIG. 5 shows scanning transmission electron microscope (STEM)-energy dispersive X-ray analysis (EDS, also referred to as EDX) images of PtRhRu and PtPdIrRhRu particles, but from these images, uniformity in mixing at an atomic level could not be read.

CITATION LIST

Patent Literature

PTL 1: WO2017/150596

Non-Patent Literature

NPL 1: Science (2018) 359, 1489-1494
NPL 2: SCIENTIFIC REPORTS (2018) 8:8737
NPL 3: RSC Adv. (2019) 9, 18547-18558
NPL 4: Adv. Funct. Mater. (2019) 1905933

SUMMARY OF INVENTION

Technical Problem to be Solved by Invention

In the lower left portion of page 6 of NPL 4, the obtained nanoparticles are described as stable up to 700 K (427° C.). In particular, there appears an XRD pattern corresponding to hcp from 800 K, and this suggests formation of an Ru-rich phase of hcp. On the other hand, the literature says that there is little change in each peak position of fcc. If a uniform alloy is first formed and mainly Ru is precipitated, as in Table S1, Ru has a smaller atomic radius than others, so that its lattice constant expands according to the Vegard's law. FIG. S16 shows a relationship between the melting point and the crystallite size, and Ru is said to be a monometal and 2 nm or less. From these, NPL 4 says that a large crystallite fcc alloy and Ru-rich small particles are first precipitated non-uniformly, but because of the small crystal size, XRD indicates that a uniform fcc alloy is formed. When nanoparticles are heated, small hcp particles are roughened and give a remarkable peak in XRD, but it is considered that, since fcc does not change the peak position, and the metal composition ratio thereof does not almost change (Ru does not precipitate from the alloy but exists as different particles). Namely, for the nanoparticles obtained in NPL 4, mixing is not uniform.

In the case of solvothermal synthesis, airtightly sealed vials are gradually heated, and therefore in that case, metals that are more readily decomposed and reduced can react gradually and sequentially in order and a uniform alloy could hardly be formed since the reduction rate differs between the metals.

As described above, for a solid solution alloy of a combination of metal elements that are immiscible at the atom level, and high-entropy alloy nanoparticles, there is a room for improvement in the uniformity of solid solution.

A problem to be solved by the present invention is to provide a novel alloy composed of three or more types of elements and having a high solid solution uniformity.

Solution to Problem

Providing the present invention, the inventors have found a novel alloy having a high solid solution uniformity to such a remarkable degree that has not heretofore been known, and have solved the above-mentioned problems. Such an alloy is a novel alloy that differs from conventional alloys in that the solid solution uniformity thereof is high even though the average composition thereof is considered to be on the same level as that of conventional alloys when macroscopically seen as a lump (bulk) or an aggregate (powder) of particles.

The constitution of the present invention that is a specific means for solving the above-mentioned problem, and preferred embodiments of the present invention are described below.

[1] An alloy composed of three or more types of elements, wherein:
all the standard deviation of distribution in the alloy of each element constituting the alloy are 15 atomic % or less.
[2] The alloy according to [1], wherein all the correlation coefficient of distribution of two elements constituting the alloy are within ±0.50.

[3] The alloy according to [1] or [2], wherein the elements constituting the alloy include a combination of elements not dissolving in a phase equilibrium diagram in solid solution.

[4] The alloy according to any one of [1] to [3], wherein the elements constituting the alloy contain at least three types of elements of the group consisting of platinum group elements (Ru, Rh, Pd, Os, Ir, Pt), Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, H, B, Al, C, Si, N, P, Y, Zr, Nb, lanthanoids, Hf and Ta.

[5] The alloy according to any one of [1] to [4], wherein the elements constituting the alloy contain at least one type of elements of the group consisting of Ru, Rh, Pd, Os, Ir, Pt, Ag, Au and Ni.

[6] The alloy according to any one of [1] to [5], wherein:
the number of types of elements constituting the alloy is m, with m being an integer of three or more,
and wherein the average composition in the alloy of each i element constituting the alloy is $C_i$ atomic %, with i being an integer of 1 or more and m or less, all the standard deviation of distribution of each element in the alloy are $2.5 \times s_i \times 100$ atomic % or less where $s_i$ is expressed by the following formula 1:

$$s_i = \sqrt{\frac{c_i(100 - c_i)}{N}} \qquad \text{Formula 1}$$

wherein $s_i$ represents a standard deviation relative to each element i in the composition distribution in a microvolume 1 nm³ to be analyzed, and N represents a number of atoms per the microvolume 1 nm³ to be analyzed.

[7] The alloy according to any one of [1] to [6], wherein the standard deviation of distribution in the alloy of each element constituting the alloy is 40% or less of the composition ratio of the element in the alloy.

[8] The alloy according to any one of [1] to [7], which is nanoparticles having an average particle size of 0.5 to 30 nm.

[9] The alloy according to [8], which is an aggregate of the nanoparticles.

[10] The alloy according to [8], wherein the nanoparticles are held on a carrier.

[11] The alloy according to [10], wherein the carrier is a non-carbon material carrier or a granular carbon carrier.

[12] An aggregate of alloy nanoparticles, containing the alloy of [8] in an amount of 98% by number or more.

[13] A catalyst containing the alloy of any one of [1] to [11], or the aggregate of alloy nanoparticles of [12].

Advantageous Effects of Invention

According to the present invention, there can be provided a novel alloy composed of three or more types of elements and having a high solid solution uniformity.

BRIEF DESCRIPTION OF DRAWINGS

FIG. 28(A) is a graph showing the specific X-ray counts at each position through the arrowed part in FIG. 27.

DESCRIPTION OF EMBODIMENTS

Figure 1:
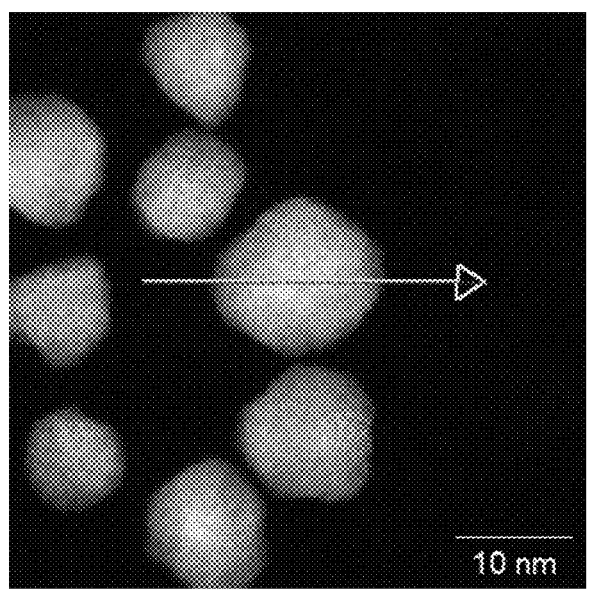
FIG. 1 is a scanning transmission electron micrograph used in EDS line scan analysis in STEM-EDS of the alloy obtained in Example 1.

In the following, the present invention is described in detail. The constitutional elements may be described below with reference to representative embodiments and specific examples of the invention, but the invention is not limited to the embodiments and the examples. In the description herein, a numerical range expressed as "to" means a range that falls between the former number indicating the lower limit of the range and the latter number indicating the upper limit thereof.

[Alloy]

The alloy of the present invention is an alloy composed of three or more types of elements, wherein all the standard deviation of distribution in the alloy of each element constituting the alloy are 15 atomic % or less.

Having the constitution, there can be provided a novel alloy composed of three or more types of elements and having a high solid solution uniformity. The solid solution uniformity of an alloy refers to a measure that indicates a solid solution state of how uniform the composition distribution of the solid solution is.

Heretofore, an alloy composed of a plurality of non-solid-soluble elements have a problem in that metal distribution is gradually biased over time, and phase separation is ultimately caused. An alloy having a low solid solution uniformity so that the standard deviation oversteps the upper limit of the range defined in the present description may gradually cause metal distribution biasing over time, and finally may cause phase separation. As compared with the alloy of the present invention, such an alloy is poor in the catalyst performance, and in use in an environment where the alloy is exposed to high temperatures for a long period of time, the alloy of the type may have a short lifetime and may be unstable.

As opposed to this, the alloy of the present invention is highly uniformized, it is excellent in composition stability and hardly causes phase separation. Consequently, the alloy of the present invention is favorable for use that requires high durability, for example, for use in an environment that may be exposed to high temperatures for a long period of time, for example, for use as a catalyst in chemical reaction. Specifically, using the alloy of the present invention, a long-life catalyst can be produced.

More preferably, the alloy more can show a stable structure when heated to have a high substance uniformity. In particular, a quinary or higher multicomponent high-entropy alloy has a large configurational entropy S, and therefore has a solid solution phase that is uniform and stable at high temperatures based on the Gibbs free energy $G=H-TS$ (where H is an enthalpy, T is an absolute temperature, and S is an entropy). Especially preferably, the alloy shows a stable structure and has a high substance uniformity when heated, for example, up to 500 K or higher (preferably 700 K or higher, more preferably 900 K or higher). Substance uniformity can be confirmed by in-situ XRD or STEM-EDS.

Also preferably, in the alloy, the constituent elements are mixed at an atomic level. Specifically, in the case where alloy is used as an aggregate of alloy nanoparticles, preferably, the aggregate of alloy nanoparticles contains the alloy of the present invention in an amount of 98% by number or more. Or also preferably, arbitrary alloy nanoparticles constituting an aggregate of alloy nanoparticles contain all three or more types of elements as the constituent elements. In the case where the alloy nanoparticle is used as a catalyst containing a large number of alloy nanoparticles, preferably, 98% by number of more alloy nanoparticles contained in the catalyst are the alloy nanoparticles of the present invention. Or also preferably, arbitrary alloy nanoparticles contained in the catalyst contain all three or more types of elements as the constituent elements.

Preferred embodiments of the present invention are described hereinunder.

<Element>

The alloy of the present invention is composed of three or more types of elements, preferably 3 to 50 types of elements, more preferably 3 to 25 types of elements, especially preferably 3 to 10 types of elements, more especially preferably 3 to 5 types of elements, even more especially preferably 3 or 4 types of elements.

The types of the elements constituting the alloy of the present invention are not specifically limited.

The elements constituting the alloy can contain a combination of elements not dissolving in solid solution in a phase equilibrium diagram, or may not contain a combination of elements not dissolving in solid solution in a phase equilibrium diagram. Specifically, the alloy may be a combination of elements that could not readily form a solid solution, or may also be a combination of elements that can readily form a solid solution. The phase equilibrium diagram is also referred to as a phase diagram, a state diagram or an alloy state diagram, and all similar diagrams can be used herein as a phase equilibrium diagram. The phase equilibrium diagram may be a phase equilibrium diagram of two elements, or may also be a phase equilibrium diagram of three or more elements.

According to the present invention, there can be provided a novel alloy having a high solid solution uniformity using a large variety of elements. Consequently, it is preferable that the elements constituting the alloy contain a combination of elements not dissolving in solid solution in a phase equilibrium diagram.

The combination of elements not dissolving in solid solution in a phase equilibrium diagram means a combination of elements having 30 atomic % or more immiscible region under a pressure of 1 atm (normal pressure) at 1000° C.

More preferably, the elements constituting the alloy contain a combination of elements not dissolving in solid solution in a binary phase equilibrium diagram or in a ternary phase equilibrium diagram, even more preferably contain a combination of elements not dissolving in solid solution both in a binary phase equilibrium diagram and in a ternary phase equilibrium diagram.

Among the combinations of two types of elements constituting the alloy, preferably at least one combination contains elements not dissolving in solid solution in a binary phase equilibrium diagram, more preferably two or more combinations contain elements not dissolving in solid solution in a binary phase equilibrium diagram.

Among the combinations of two types of elements constituting the alloy, at least one combination of elements not dissolving in solid solution in a binary phase equilibrium diagram includes PdRu, AuIr, AgRh, AuRh, AuRu, CuRu, CuIr, AgCu, FeCu, AgIr, AgRu, MoRu, RhC, RuN, RuSn, PdOs, CuOs, AgOs, AuOs, CuRh, IrRh, IrPd, AgPt, AuPt, and other combinations of a noble metal and any other metal than noble metals. Among three or more types of elements constituting the alloy, a combination of two types of elements not dissolving in solid solution in a binary phase equilibrium diagram includes a combination of PdRuB, AuRuIr, RuRhAu, PtIrRu, FeRuRh, AuIrRh, AgIrRh, AuPdRu and etc. Among five or more types of elements constituting the alloy, a combination of two types of elements not dissolving in solid solution in a binary phase equilibrium diagram includes a combination of PdRuRhOsIr and Pt, a combination of RuRhPdIr and Pt, and AuRuRhIrPt.

Among the combinations of three types of elements constituting the alloy nanoparticle, at least one combination of elements not dissolving in solid solution in a ternary phase equilibrium diagram includes PdRuB, AuRuIr, RuRhAu, PtIrRu, FeRuRh, AuIrRh, AgIrRh, AuPdRu.

Combinations of elements of which the binary phase equilibrium diagram is not known are also included in the combinations of elements not dissolving in solid solution in a phase equilibrium diagram so far as the combinations can have 30 atomic % or more immiscible region under a pressure of 1 atm (normal pressure) at 1000° C.

Preferably, the elements constituting the alloy include oxidation-resistant metals. Oxidation-resistant metals mean those capable of maintaining a metal state as particles having a particle diameter of 50 nm or less such as noble metals and Ni (those in which a metal structure such as fcc, bcc and hcp can be confirmed).

The alloy of the present invention preferably contains at least 3 types of elements of the group consisting of platinum group elements (Ru, Rh, Pd, Os, Ir, Pt), Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, H, B, Al, C, Si, N, P, Y, Zr, Nb, lanthanoids, Hf and Ta.

More preferably, the elements constituting the alloy of the present invention contain at least 3 types of elements of the group consisting of platinum group elements (Ru, Rh, Pd, Os, Ir, Pt), Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, B, Al, C, Si, N, P, and lanthanoids.

Among these, especially preferably, the elements constituting the alloy contain at least 3 types of elements of the group consisting of platinum group elements (Ru, Rh, Pd, Os, Ir, Pt), Ag, Au, In, Tl, Sn, Bi, Mo, W, Re, 3d metals (Sc, Ti, V, Cr, Mn, Fe, Co, Ni, Cu, Zn), Ga, B, C, N, and lanthanoids.

Even more preferably, the elements constituting the alloy contain 3 types of elements of the group consisting of Ru, Rh, Ir, Pt, Au, Ag, Sn, Cu, Mo, W, Re, Fe, Co, Ni, B, and N.

On the other hand, the elements constituting the alloy preferably contain at least one type of an element of the group consisting of platinum group elements (Ru, Rh, Pd, Os, Ir, Pt), Ag, Au, and Ni, and more preferably contain two types of the elements. Also especially preferably, the elements contain at least one type of an element of the group consisting of Ru, Rh, Ir, Pt, Ag, Au and Ni and even more preferably contain two types of the elements.

The crystal structure of the alloy is not specifically limited. Depending on the composition of the alloy and the average electronic number of all the alloys, the alloy may have a crystal structure such as a face-centered cubic lattice (fcc), a hexagonal close-packed lattice (hcp), or a body-centered cubic lattice (bcc). The alloy (particles) of one preferred embodiment of the present invention is a solid solution having an fcc structure or an hcp structure.

In the case where the alloy is a regular alloy (that is, in the case where the alloy nanoparticle has a regular phase), or where the alloy nanoparticle forms an amorphous structure or forms an intermetallic compound, the alloy can maintain the other structure than the above-mentioned structure. In the case where the alloy contains a mixture of elements greatly differing from each other in the atomic radius or the electric negativity, it may form an intermetallic compound. The intermetallic compound does not have a random atomic configuration but is a regular alloy. The case includes an embodiment where among the combinations of two types of elements constituting the alloy, at least one combination is a part of RhC, PdB or a combination of a noble metal and a transition metal, or an embodiment where at least one combination among them is a part of a combination of a noble metal and a typical element such as RuSn. In the case of a regular alloy containing a large number of constituent elements, the atomic site in the regular alloy may be randomly composed of specific plural elements. For example, at the atomic site of an element having a large atomic radius, elements having a large atomic radius can be randomly arranged, while at the atomic site of an element having a small atomic radius, elements having a small atomic radius can be randomly arranged.

Among six types of elements of a platinum group, fcc (face-centered cubic lattice) contains four types of Rh, Pd, Ir and Pt, and hcp (hexagonal close-packed lattice) contains two types of Os and Ru. The alloy (particles) of one preferred embodiment of the present invention is a solid solution of an fcc structure containing platinum group elements. The alloy of another preferred embodiment of the present invention is a solid solution of an hcp structure containing platinum group elements. In the case of using six types of platinum group elements, the proportion of the fcc structure can be high like in the original, or the proportion of the hcp structure can be high.

The solid solution uniformity of the alloy of the present invention is high, and therefore it is preferable that the three or more types of elements are uniformly distributed and dissolved in solid in the alloy nanoparticle. Here, "uniformly distributed" means that there is no bias in the distribution of the three or more types of elements, and that all the standard deviation of distribution in the alloy of each element constituting the alloy are 15 atomic % or less.

Further, preferably, no bias is confirmed in the distribution of elements (atoms) in the energy dispersion X-ray analysis maps. Also preferably, a single fcc, bcc or hcp pattern is confirmed in powdery X-ray diffractometry (XRD). Even though fcc and hcp coexist, it is considered that the constituent elements are uniformly distributed in each structure so far as the atomic distance is the same in the two structures. At that time, the metallic composition of the two structures fcc and hcp is the same, and therefore the atomic distance is also the same in the two.

(Proportion of Elements)

The alloy of the present invention is not specifically limited in respect of the proportion of each element constituting the alloy inside the alloy. Specifically, the average composition of the alloy of the present invention is not specifically limited.

In one preferred embodiment of the present invention, when the total amount of the alloy is set to 100 atomic %, the upper limit of the proportion of the element that accounts for the largest amount in the alloy is 99.9 atomic % or less, 80 atomic % or less, 70 atomic % or less, 60 atomic % or less, 50 atomic % or less, 45 atomic % or less, 40 atomic % or less, or 35 atomic % or less.

In one preferred embodiment of the present invention, when the total amount of the alloy is set to 100 atomic %, the lower limit of the proportion of the element that accounts for the smallest amount in the alloy nanoparticle is 0.1 atomic % or more, 1 atomic % or more, 5 atomic % or more, 9 atomic % or more, 10 atomic % or more, or 15 atomic % or more.

The amount of the element having a largest atomic ratio is preferably 1 to 500 times the element having a smallest atomic ratio, more preferably 1 to 5 times, even more preferably 1 to 3 times, especially more preferably 1 to 2 times, most preferably 1 to 1.5 times. In the case where the alloy of the present invention is a high-entropy solid solution alloy, preferably, the atomic ratio of the three or more types of elements therein is as close as possible.

<Standard Deviation of Distribution>

The alloy of the present invention is preferably such that all the standard deviation of distribution in the alloy of each element constituting the alloy is 15 atomic % or less, more preferably 14 atomic % or less, even more preferably 13 atomic % or less, further more preferably 12 atomic % or less, further more preferably 11 atomic % or less, further more preferably 10 atomic % or less, and further more preferably 8.7 atomic % or less. Also preferably, all the standard deviation of distribution in the alloy of at least two types of elements constituting the alloy is 15 atomic % or less, more preferably 14 atomic % or less, even more preferably 13 atomic % or less, further more preferably 12 atomic % or less, further more preferably 11 atomic % or less, further more preferably 10 atomic % or less, and further more preferably 8.7 atomic % or less.

Preferably, the standard deviation of distribution in the alloy of each element constituting the alloy is 50% or less of the composition ratio of the element in the alloy, more preferably 40% or less, even more preferably 30% or less, and further more preferably 20% or less.

With the increase in the number of types of elements constituting the alloy, it is desirable that the standard deviation of distribution in the alloy of each element constituting the alloy falls within a smaller range. In the case where the number of types of elements constituting the alloy is three, the above-mentioned range is preferred.

A case is taken into consideration where a uniform m-nary random alloy composed of m-types of elements constituting the alloy is divided into a plurality of microvolumes for statistical analysis of spatial distribution thereof. An average composition of the alloy is expressed as $(C_1, C_2, \ldots, C_m)$ atomic %, and the total number of the atoms contained in a infinitesimal space (the number of atoms per the microvolume to be analyzed) is referred to as N. In that condition, the statistical distribution of the atomic number of each element contained in each microvolume can be approximated by a polynominal distribution in the case of a random alloy. In that case, the fluctuation in composition can be evaluated by the standard deviation that is a spread of the distribution. The standard deviation $s_i$ relative to each element i in the composition distribution in the microvolume (standard deviation relative to each element i in the composition distribution in the microvolume to be analyzed) can be expressed by the following formula 1.

$$s_i = \sqrt{\frac{c_i(100 - c_i)}{N}} \quad \text{Formula 1}$$

In the formula 1, $s_i$ represents a standard deviation relative to each element i in the composition distribution in a microvolume 1 nm³ to be analyzed, and N represents a number of atoms per the microvolume 1 nm³ to be analyzed.

Here, the microvolume is suitably 1 nm³ in consideration of the calculation accuracy and spatial scale of the composition of the alloy nanoparticles, and N can be calculated using the number of atoms contained in the crystal structure and the lattice constant in the case of a crystalline alloy.

For example, a case is taken into consideration where a certain alloy (e.g., an fcc alloy having a lattice constant on a level of around Pt) is divided into microvolumes of 1 nm³ each and measured. In this case, the standard deviation $s_i$ of a composition distribution of a completely random alloy is calculated as in the following Table 1. (The number of atoms contained in the unit lattice of a completely fcc metal is 4, the lattice constant is 0.38 to 0.4 nm, and the number of atoms N contained in 1 nm³ is about 60 to 70. For example, the number of atoms contained in the unit lattice of Pt is 4, the lattice constant is 0.392 nm, and from 4/(0.392×0.392×0.392), N=66. Under the condition, the following Table 1 was calculated.)

On the other hand, an ordinary alloy can be said to have a high solid solution uniformity when the composition fluctuation thereof is not more than 2.5 times the random alloy, and the composition fluctuation is preferably not more than 2.0 times, more preferably not more than 1.5 times. In other words, regarding the alloy of the present invention, in the case where m-types of elements constituting the alloy with m being an integer of three or more and where each i-element constituting the alloy with i being an integer of 1 or more and m or less has an average composition in the alloy of Ci atomic number, it is preferable that the distribution of each element in the alloy is unimodal. Also in the case, all the standard deviation of the distribution of each element in the alloy is preferably 2.5×$s_i$ atomic % or less, using $s_i$ in the formula 1, more preferably 2.0×$s_i$ atomic % or less, even more preferably 1.5×$s_i$ atomic % or less. For example, a preferred range of the standard deviation of distribution of each element in a 3-nary to 10-nary alloy where each i element is isocompositional is as shown in the following Table 1. For reference, values of a binary element are also shown therein.

TABLE 1

| m | $C_i$ | $s_i$ | 1.5 × $s_i$ | 2 × $s_i$ | 2.5 × $s_i$ |
|---|---|---|---|---|---|
| 2-nary | 50 | 6.2 | 9.3 | 12 | 16 |
| 3-nary (isocomposition) | 33 | 5.8 | 8.7 | 12 | 15 |
| 4-nary (isocomposition) | 25 | 5.3 | 8.0 | 11 | 13 |
| 5-nary (isocomposition) | 20 | 4.9 | 7.4 | 9.8 | 12 |
| 6-nary (isocomposition) | 17 | 4.6 | 6.9 | 9.2 | 12 |
| 10-nary (isocomposition) | 10 | 3.7 | 5.5 | 7.4 | 9.2 |

The above-mentioned preferred range is applicable to any other non-isocomposition alloy. For example, in the case of an alloy in which the average composition of each element is 60 atomic %, 20 atomic %, 10 atomic % and 10 atomic %, the standard deviation of distribution of the 1st to 4th elements in the alloy is preferably 2.5×$s_i$ atomic % or less, using each $s_i$ in the case where $C_1$ is 60, $C_2$ is 20, $C_3$ is 10 and $C_4$ is 10, more preferably 2.0×$s_i$ atomic % or less, even more preferably 1.5×$s_i$ atomic % or less.

The standard deviation of distribution in an alloy of each element constituting the alloy can be determined by STEM-EDS analysis according to the method mentioned below.

Elementary analysis is carried out by line scanning on plural fields of view in scanning transmission microscopy. Among plural fields of view, a field of view where a large number of particles exist is selected, and preferably, particles which are separated from ambient particles via a suitable distance therebetween, which do not overlap with each other and which have an average particle size are selected. Regarding the dispersion, an average value of the data calculated from plural measurement points can be employed. A size dependence may be investigated to determine an average value, but those having an average size are selected (or can be selected) as representative points. Particles that are used as representative points may be determined as follows. An average composition at each measurement point calculated from plural measurement points is determined, and then among these data, particles having a composition closest to the composition determined through elementary analysis by XRF, or particles having a composition closest to the charge-in composition of each element in a mixture solution prepared by mixing raw material solutions can be used as representative points. In a line scanning analysis process, one or plural particles are selected in a field of view of a specific measurement point, and analyzed in an arrowed direction. Another one or plural particles may be arbitrarily selected and analyzed, and in the latter, almost the same results can be obtained, that is, even though the arrowed direction, the particle shape and the particle size differ, homogeneous results can be obtained. Consequently, it is considered that arbitrary alloy nanoparticles constituting an aggregate can give nearly the same results.

In a certain field of view, the range of line scanning (range of position) is controlled in a range longer than the particle size of the alloy (for example, the shape of the nanoparticles). The range for line scanning is preferably a range that crosses the entire of the selected one or plural particles from the viewpoint of confirming the uniformity of all the particles. Namely, two end points of the range for line scanning is preferably not inside the particles but around the outer peripheries of the particles or the area where no particles exist. More preferably, the range for line scanning crosses a possibly longer part of the particle, and for example, in the case where the range crosses one entire particle, more preferably, the range crosses the major axis of the particle (the line segment including the two points to be the longest distance among the outer periphery of the particle).

The number of counts are measured for every position of the length around the surface separation or the lattice constant of an atom. For example, the measurement point distance (position distance) is preferably 0.5 nm or less, more preferably 0.30 nm or less, even more preferably 0.25 nm or less.

The integral count number of the characteristic X-ray peak is preferably 400 counts or more from the viewpoint of improving the accuracy. When the count is low, there may occur a problem that the standard deviation may be estimated to be large. In the case where a specific area is repeatedly scanned, the count number can be increased by increasing the number of measurements or the measurement time.

The background count varies depending on measurement. The background count is calculated from the integral count of the portion where no elements of the sample are clearly present, and the background threshold is thereby determined.

Assuming that each element is present in a position area having a count number exceeding the background threshold, a ratio (composition) of each element at each position is determined based on the count number.

An average composition and a standard deviation are determined using a normal arithmetic mean for the composition of the position area of the count number exceeding the background threshold.

When the standard deviation of distribution in the alloy of each element constituting the alloy is determined from the element map, 2D analysis may be employed. Pixels may be set in the STEM data.

Preferably, the measurement point distance in the 1D analysis (line scanning) and the size of pixels in the 2D analysis are controlled depending on the particle size of the alloy.

<Correlation Coefficient of Distribution>

Preferably, all the correlation coefficient of distribution of two elements constituting the alloy of the present invention is less than ±0.50, from the viewpoint of no risk of segregation, more preferably within ±0.45, even more preferably within ±0.40.

Also preferably, the correlation coefficient of distribution of at least two types of element constituting the alloy of the present invention is less than ±0.50, more preferably within ±0.45, even more preferably within ±0.40.

When the segregation of element distribution in an alloy decreases, the value of the correlation coefficient of distribution of each element varies from a state where the elements are close to each other (a positive value close to 1) or an exclusive state (a negative value close to 1) to a state with little correlation (an absolute value close to 0).

For calculation of the correlation coefficient of composition, a method used for evaluation of a composition distribution of minerals (rocks) in the field of geology may be applied to analysis of alloys. The correlation coefficient of distribution of two elements constituting an alloy can be determined according to the method mentioned below. For details of the method, reference may be made to Jour. Geol. Soc. Japan (2006) Vol. 112, No. 3, pp. 173-187, and the literature is incorporated herein by reference.

First, centered log ratio transformation (clr) is applied to the sample composition vector of each measurement point to perform one-to-one coordinate transformation from the composition space where the value is restricted from 0 to 1, to an actual space (and accordingly, by the coordinate transformation, an ordinary multivariate statistical technique becomes applicable to the sample data of the composition vector). For the sample vector of the composition after coordinate transformation, dispersion and co-dispersion are calculated according to the following formula to determine the correlation coefficient.

Centered Log Ratio Transformation:

$$clr(vec\_x)=(\ln x\_A/g(x), \ln x\_B/g(x), \ln x\_C/g(x))= (z\_A, z\_B, z\_C)$$

wherein $g(x)=(\Pi x\_i)^{(1/3)}$ (i=A, B, C)

The multivariate analysis using a transformed vector is the same as in an ordinary real space, and can be performed according to a known method.

The correlation coefficient needs not inverse transformation, but thereafter the statistical value calculated by dr inverse transformation is inversely mapped to the composition space to obtain a calculated value.

<Shape of Alloy>

Not specifically limited, the shape of the alloy of the present invention may be bulky or granular, or may also be in the form of an aggregate (powdery form) of particles, but is preferably a granular (as fine particles), and is more preferably in the form of alloy nanoparticles.

In the case where the alloy of the present invention is an aggregate (powdery form) of particles, every particle is in contact with the interface.

The alloy nanoparticles are particles having an average particle size of less than 1000 nm.

The shape of the alloy nanoparticle of the present invention includes various shapes such as a spherical shape, an elliptical shape, a rectangular cylindrical shape, a cylindrical shape, a cubic shape, a rectangular parallelepiped shape, and a scale-like shape, and is preferably a spherical shape or an elliptical shape.

The average particle diameter of the alloy nanoparticles is preferably 0.5 to 50 nm, more preferably 0.5 to 30 nm, even more preferably 0.5 to 20 nm. The average particle diameter of the alloy nanoparticles can be calculated as an arithmetic average, for example, by direct observation with a transition electron microscope (TEM). The average particle diameter of the above-mentioned particles is an average particle diameter of the alloy nanoparticles, and in the case where the alloy nanoparticles are supported on a carrier, it is an average particle diameter of the alloy nanoparticles excluding the carrier.

The particle diameter distribution of the particles is preferably an average particle diameter±0.1 to 15 nm, more preferably ±0.3 to 15 nm, even more preferably ±1.0 to 10 nm.

The alloy of the present invention may be in the form of an aggregate of alloy nanoparticles, or may also be in the form supported on a carrier.

(Aggregate of Alloy Nanoparticles)

The aggregate of alloy nanoparticles means a powder of a large number of alloy nanoparticles aggregated together.

For example, it is preferable that the aggregate of alloy nanoparticles does not substantially contain a carrier, or is not supported on a carrier.

The aggregate of alloy nanoparticles may contain a protective agent such as a polymer.

Also the aggregate of alloy nanoparticles may have an oxide coating film on the surface of each alloy nanoparticle.

The aggregate of alloy nanoparticles may contain impurity particles in addition to the alloy nanoparticles of the present invention. However, the aggregate of alloy nanoparticles preferably contains the alloy nanoparticles of the present invention in an amount of 90% by number or more, more preferably 98% by number or more, even more preferably 99% by number or more, and especially more preferably 100% by number.

The aggregate of alloy nanoparticles may contain, in addition to the alloy nanoparticles in which all the three or more types of elements contained in the compounds used in production of the alloy nanoparticles are dissolved in a solid solution, alloy nanoparticles in which only a part of the three or more types of elements contained in the compounds used in the production are dissolved in a solid solution. However, it is preferable that the proportion of the alloy nanoparticles of the same type of elements dissolved in a solid solution is high. Among the alloy nanoparticles constituting the aggregate of alloy nanoparticles, the aggregate preferably contains alloy nanoparticles containing all the five or more types of elements as the constituent elements in an amount of 90% by number or more, more preferably 98% by number or more, even more preferably 99% by number or more, and especially more preferably 100% by number.

The proportion of the particles contained in the aggregate of alloy nanoparticles can be determined within a range of the field of view vision in observing a part of the aggregate of alloy nanoparticles. For example, in a range of the field of view where a part of the aggregate of alloy nanoparticles is observed, it is desirable that, among the alloy nanoparticles constituting the aggregate of alloy nanoparticles, the aggregate contains alloy nanoparticles containing all the 3 or more types of elements as the constituent elements in the above range. However, it is more desirable that the proportion of the alloy nanoparticles contained in the aggregate of alloy nanoparticles is determined as an average value of the found data in a plurality of the fields of view where a part of the aggregate of alloy nanoparticles is observed.

(Carrier)

The career is not specifically limited.

The carrier to be used is not specifically limited, but the carrier to be used includes oxides, nitrides, carbides, elemental carbon, and elemental metals.

The oxides for use for the carrier include oxides such as silica, alumina, ceria, titania, zirconia, and niobia, and composite oxides such as silica-alumina, titania-zirconia, ceria-zirconia, and strontium titanate.

The elemental carbon includes active carbon, carbon black, graphite, and carbon nanotubes.

The nitrides include boron nitride, silicon nitride, gallium nitride, indium nitride, aluminum nitride, zirconium nitride, vanadium nitride, tungsten nitride, molybdenum nitride, titanium nitride, and niobium nitride.

The carbides include silicon carbide, gallium carbide, indium carbide, aluminum carbide, zirconium carbide, vanadium carbide, tungsten carbide, molybdenum carbide, titanium carbide, niobium carbide, and boron carbide.

The elemental metals include pure metals such as iron, copper and aluminum, and alloys such as stainless steel.

In the present invention, the carrier is preferably a non-carbon fiber carrier or a non-graphene carrier, more preferably a non-carbon fiber carrier (a material that is not a material of an elemental carbon) or a granular carbon carrier, especially preferably a non-carbon material carrier since the carrier of the type is not burnt in a high-temperature oxidizing atmosphere, and is more especially preferably an oxide carrier. As the granular carbon carrier, active carbon is usable.

<Protective Agent>

The solid solution of the present invention can be covered with a protective agent (preferably a surface protective agent). The protective agent includes polymers such as polyvinyl pyrrolidone (PVP) and polyethylene glycol (PEG), amines such as oleylamine, and carboxylic acids such as oleic acid.

<Production Method for Alloy>

In the production method for the alloy of the present invention, preferably, the metal ions contained in the mixed solution are reduced at the same time. The method for simultaneously reducing the metal ions contained in the mixed solution is not specifically limited, examples thereof are mentioned below.

(1) A method of individually ultrasonicating the solutions of compounds each containing an element that constitutes the alloy (raw material solutions) and thereafter mixing them.

(2) For rapid reaction in a flow reactor, a method of strictly keeping constant the temperature, the flow rate and the pressure from the start to completion of inputting the chemical liquids (reducing agent solution, raw material solution or mixed solution thereof) to the reaction system.

(3) In a spray system, a method of controlling the spray condition to be constant.

In the production method for the alloy of the present invention, the solutions of compounds each containing an element that constitutes the alloy (raw material solutions) are individually ultrasonicated and then mixed. Preferably, the mixed solution is added to and mixed with a reducing agent. More preferably, the mixed solution is added to and mixed with a reducing agent that has been heated to have a sufficient reducing power.

Hereinunder preferred embodiments of the alloy production method are described.

(Preparation of Raw Material Solution)

The production method for alloy preferably includes a step of preparing a solution (raw material solution) of a compound containing each element to constitute the alloy.

Each element to constitute the alloy nanoparticle is dissolved in a solvent.

A polar solvent is usable, including water, alcohols (e.g., methanol, ethanol, isopropanol), polyols (e.g., ethylene glycol, diethylene glycol, triethylene glycol, propylene glycol, glycerin), polyethers (e.g., polyethylene glycol), acetonitrile, acetone, dimethylformamide, dimethyl sulfoxide, and N-methylpyrrolidone. Among these, water and alcohols are preferred.

A nonpolar solvent is also usable, including hexane, benzene, toluene, diethyl ether, chloroform, ethyl acetate and THF.

Preferably, the raw material solution is an aqueous solution containing a water-soluble salt of a metal element or a water-soluble salt of an element except metals, but in the case of a combination of nonpolar metal salts, a nonpolar solvent containing a nonpolar metal salt can be used.

By controlling the molar ratio of the compounds each containing the constituent element, the molar ratio of the elements constituting the alloy nanoparticle to be obtained can be controlled.

Salts of water soluble elements include the following:

Known water-soluble salts (e.g., sulfates, nitrates, acetates, chlorides, bromides, iodides, potassium cyanates, sodium cyanates, hydroxides, carbonates) of platinum group elements (Ru, Rh, Pd, Os, Ir, Pt), Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, B, Al, C, Si, N, P, Y, Zr, Nb, lanthanoids, Hf and Ta. The following are especially preferred.

- Ru: Ruthenium halides such as $RuCl_3$, $RuCl_3 \cdot nH_2O$, $RuBr_3$ and $K_2RuCl_5(NO)$, and ruthenium nitrate, $Ru_3(CO)_{12}$, $Ru(NO)(NO_3)_a(OH)_b$, and $Ru(acac)_3$.
- Rh: Rhodium acetate, rhodium nitrate, rhodium chloride ($RhCl_3$), and $RhCl_3 \cdot 3H_2O$.
- Pd: $K_2PdCl_4$, $Na_2PdCl_4$, $K_2PdBr_4$, $Na_2PdBr_4$, and palladium nitrate.
- Os: Osmium halides such as $OsCl_3$, and $OsBr_3$.
- Ir: Iridium chloride, iridium acetylacetonate (acac; acac compounds are preferably dissolved in a nonpolar solvent), potassium iridium cyanate, potassium iridate, and $H_2IrCl_6$.
- Pt: $K_2PtCl_4$, $(NH_4)_2K_2PtCl_4$, $(NH_4)_2PtCl_6$, $Na_2PtCl_6$, $H_2PtCl_6$ and $Pt(acac)_2$.
- Au: $AuCl_3$, $HAuCl_4$, $K[AuCl_4]$, $Na[AuCl_4]$, $K[Au(CN)_2]$, $K[Au(CN)_4]$, $AuBr_3$, and $HAuBr_4$.
- Ag: $AgNO_3$, and $Ag(CH_3COO)$.
- In: $InCl_3 \cdot 4H_2O$.
- Sn: $SnCl_3 \cdot 2H_2O$, and $Sn(ethyhex)_2$.
- Mo: $Mo(CO)_6$.
- Cu: $Cu(NO_3)_2$, $CuSO_4$, $Cu(CH_3COO)_2$, $CuCO_3$, $CuCl$, and $CuCl_2$.
- Fe: $FeCl_3 \cdot 6H_2O$, $FeCl_2 \cdot 4H_2O$, and $Fe(NO_3)_3$.
- Co: $CoCl_2 \cdot 6H_2O$.
- Ni: $NiCl_2 \cdot 6H_2O$.
- B: $BH_3$.
- N: $Ru(NO)(NO_3)_a(OH)_b$, ammonia, nitric acid, and hydrazine.

(Individual Ultrasonic Treatment)

The alloy production method preferably includes a step of individually ultrasonicating the solutions of compounds each containing an element that constitutes the alloy (raw material solutions). By individually ultrasonicating the raw material solutions, an alloy having a noticeably higher solid solution uniformity can be obtained than that in a case where a solution prepared by mixing all the compounds each containing an element that constitutes an alloy is ultrasonicated all at a time.

Ultrasonic treatment is preferably performed while light is blocked from the viewpoint of suppressing reduction by light of a compound containing each element. Also from the viewpoint of suppressing reduction by heat of metal salts, ultrasonic treatment is preferably performed at a low temperature, for example, in an ice bath.

The effect of individual ultrasonic treatment and the effect of light blocking or temperature control during ultrasonic treatment may vary depending on the type of the element constituting the alloy or on the type of the raw material solution. Consequently, in accordance with the type of the element constituting the alloy and the type of the raw material solution, the degree to be increased by these steps of the solid solution uniformity may vary.

However, in place of the step of individually ultrasonicating the raw material solutions, if there is any other step capable of individually and uniformly preparing raw material solution at the same speed as that in the case of individual ultrasonic treatment, the other step may also be employed.

(Preparation of Reducing Agent)

Also preferably, the production method for alloy includes a step of preparing a reducing agent.

The reducing agent is preferably a liquid reducing agent.

Examples of the liquid reducing agent include polyalcohols such as ethylene glycol, glycerin, diethylene glycol, and triethylene glycol; or lower alcohols such as methanol, ethanol, n-propanol, isopropanol, n-butanol or isobutanol under high pressure; or hydrous alcohols such as hydrous ethanol under high pressure; a THF solution of $BH_3$ (THF complex); or hydrazine, an $NaBH_4$ solution, and a sodium naphthalenide solution. Each element constituting the alloy can also be sued as a reducing agent. For example, a THF solution of $BH_3$ (THF complex) can be used as a reducing agent to produce alloy nanoparticles containing a B element.

In the case where the raw materials are mixed and heated under the pressure using the flow apparatus to be mentioned below, a reducing agent having a low boiling point can be used preferably. The boiling point of a lower alcohol which is a preferred reducing agent is room temperature to around 130° C., more preferably 40 to 120° C. or so, even more preferably 60 to 100° C. Since the boiling point of these reducing agent is low under normal pressure, it is difficult to produce alloy formed of metals not dissolving in solid solution in a phase equilibrium diagram by reducing compounds that contain elements constituting the alloy (e.g., metal compounds). At high temperatures under pressure, these reducing agent can exhibit reducing performance, and therefore under such conditions, these can function as a reducing agent for producing alloy nanoparticles composed of metals not dissolving in solid solution in a phase equilibrium diagram.

The reducing agent is used in an amount of 1 equivalent or more for reducing the compounds (preferably water-soluble salts) that contain elements constituting the alloy, and is preferably used in an excessive amount.

(Mixing)

The production method for alloy preferably includes a step of mixing the raw material solution to give a mixed solution.

Before or during heating the mixed solution, preferably a reducing agent is mixed in the raw material solutions.

The production method for alloy preferably includes a step of heating and reacting the mixed solution.

The heating time in heating can be 1 minute to 12 hours or so.

Preferably, the heating is carried out with stirring.

The reaction temperature in heating is preferably 170 to 300° C. or so, more preferably 180 to 250° C. or so. In the case where a reducing agent such as $NaBH_4$ is used, it can be used at room temperature or with cooling.

The mixing or heating method is not specifically limited, and for example, one or both of the reducing agent and the mixed solution can be previously heated and mixed.

Preferably, the production method for alloy includes a step of heating the reducing agent, and also preferably, a raw material solution is added to the reducing agent heated in this step, and further heated and reacted. For example, a reducing agent is previously heated, and a mixed solution may be dropwise added thereto via a pump (syringe pump) or may be sprayed thereon with a spraying device and then mixed.

Also 3 types of more individually ultrasonically-treated raw material solution and a solution of a reducing agent may be put in a reactor, and then mixed and heated therein using a flow apparatus (flow reactor) for reaction under heat and pressure.

In the case of reaction under pressure in a flow apparatus, the pressure of the raw material solution and the solution of a reducing agent each are preferably 0.1 to 10 MPa or so, preferably 0.2 to 9 MPa or so. The pressure inside the reactor is preferably 0.1 to 20 MPa or so, preferably 0.2 to 9 MPa or so. The temperature in the reactor (reaction temperature) under pressure is 100 to 500° C. or so, preferably 150 to 400° C. or so, more preferably 180 to 300° C. or so.

(Collection of Alloy)

The production method for alloy preferably includes a step of collecting a precipitate from the solution after reaction under heat.

The step gives alloy nanoparticles containing three or more types of elements in a state of a solid solution.

The means of collecting the precipitate includes reduced-pressure drying, centrifugal separation, filtration, precipitation, reprecipitation, and separation with a powdery separator (cyclone).

Before collecting the precipitate, preferably, the solution after reaction is left cooled or is rapidly cooled.

A protective agent may be added to the mixed solution, or a reducing agent, or a reaction solution prepared by mixing these to produce particles (preferably nanoparticles) prevented from being aggregated.

In the case of using a protective agent, the protective agent is contained in the reaction solution prepared by mixing a mixed solution of a raw material solution and a reducing agent, in an amount of preferably 0.01 to 100 times, as a ratio by mass, the total amount of the metal compounds in the reaction solution, more preferably 0.5 to 50 times, even more preferably 1 to 10 times. The protective agent can be contained in a raw material solution, or can be contained in a reducing agent, or can also be contained in both a raw material solution and a reducing agent.

A carrier may be mixed in the mixed solution, or a reducing agent, or a reaction solution prepared by mixing these, and in the case, a supported catalyst of alloy nanoparticles supported on the carrier can be obtained.

By mixing (co-existing) a carrier in the reaction solution, a supported catalyst of a multicomponent solid solution supported on the carrier can be obtained. In the case where the multicomponent solid solution is in the form of nanoparticles, a protective agent can be added simultaneously with a carrier to the reaction solution for producing multicomponent solid solution nanoparticles to obtain a supported catalyst in which the nanoparticles are prevented from aggregating.

On the other hand, a protective agent and a carrier may not be added to the mixed solution, the reducing agent or a reaction solution of a mixture of these. With that, alloy nanoparticles in the form of an aggregate of alloy can be obtained.

In that case, the alloy in the form of an aggregate of alloy nanoparticles and a carrier may be mixed in a solution or powders thereof may be mixed in a non-solvent system or a solvent system, and then shaped to give a supported catalyst of the alloy supported on a carrier. In the case where a solvent is used, if desired, the resultant product may be filtered and then dried.

[Catalyst]

The alloy of the present invention can be used as a catalyst that exhibits excellent performance. In use as a catalyst, the shape of the alloy nanoparticles is not specifically limited.

The alloy nanoparticles can also be used as a supported catalyst that is supported on a carrier.

The catalytic reaction in which the alloy of the present invention exhibits excellent performance as a catalyst is not specifically limited. For example, there is mentioned a reaction generally known as a reaction using a platinum group element-containing catalyst. Specifically, the reaction includes chemical reactions such as a reduction reaction including a hydrogenation reaction, a dehydrogenation reaction, an oxidation reaction including firing, and a coupling reaction. In addition, based on the catalytic performance, the catalyst can be favorably used in various processes and devices. For example, but not specifically limited thereto, preferred applications using the catalyst include a hydrogen emission reaction (HER) catalyst, a hydrogenation catalyst, a hydrogen oxidation reaction catalyst, an oxygen reducing reaction (ORR) catalyst, an oxygen emitting reaction (OER) catalyst, a nitrogen oxide (NOx) reducing reaction catalyst, a carbon monoxide (CO) oxidation reaction catalyst, a dehydrogenation reaction catalyst, a VVOC or VOC oxidation reaction catalyst, an exhaust gas purification catalyst, a water electrolysis reaction catalyst, and a hydrogen fuel cell catalyst.

EXAMPLES

Hereinunder the present invention is described more specifically with reference to Examples and Comparative Examples, in which the material used, its amount and ratio, the details of the treatment and the treatment process may be suitably modified or changed not overstepping the spirit and the scope of the invention. Accordingly, the invention should not be limitatively interpreted by the Examples mentioned below.

[Apparatus]

In Examples, the following apparatuses were used. As the PXRD, Rigaku Miniflex 600 (Cu Kα) was used unless otherwise specified.

(i-1) Powder X-ray Diffraction (PXRD)
  Rigaku Miniflex 600 (Cu Kα)
(i-2) PXRD
  SPring-8 BL02B2 ($\lambda$=0.63 angstroms, 0.58 angstroms)
(i-3) PXRD
  SPring-8 BL04B2
(ii) Energy-dispersive x-ray spectroscopy in scanning transmission electron microscopy (STEM-EDS) and EELS
  JEOL JEM-ARM200CF (accelerating voltage: 120 kV)
(iii) X-ray fluorescence analysis (XRF)
  Fluorescent X-ray analyzer ZSX Primus IV

[Example 1]: AuRuIr

<Individual Ultrasonic Treatment of Metal Ion Solutions>

A metal ion solution was prepared by dissolving $HAuBr_4$ in diethylene glycol DEG, and while light was blocked, the solution was ultrasonically treated for 5 minutes. Unless otherwise specifically indicated, the ultrasonic treatment was performed at a low temperature while cooled with ice.

A metal ion solution was prepared by dissolving $K_2RuCl_5$ (NO) in diethylene glycol DEG, and while light was blocked, the solution was ultrasonically treated for 5 minutes.

A metal ion solution was prepared by dissolving $H_2IrCl_6$ in diethylene glycol DEG, and ultrasonically treated for 5 minutes.

The three metal ion solutions that had been individually ultrasonicated were mixed in 1/1/1, and about 3 ml of each metal ion mixed solution of 0.15 mmol DEG solution were dissolved and combined to be 10 ml.

<Preparation of Alloy>

100 ml of ethylene glycol (EG) containing polyvinylpyrrolidone (PVP) K30 (4 mmol: by FUJIFILM Wako Pure Chemical Corporation) was stirred under heat at 195° C.

To the solution, the metal ion mixed solution was added dropwise at a rate of 1.5 ml/min using a syringe pump, and kept at 195° C. for 10 minutes. Subsequently, this was left cooled to room temperature. The formed precipitate of nanoparticles was separated by centrifugation.

<Elementary Analysis by STEM-EDS>

The separated nanoparticles were analyzed by STEM-EDS. By line scanning elemental analysis with a scanning transmission electron microscope for plural fields of view, the metal composition of the three elements was calculated. In the line scanning method for analysis in the following Examples and Comparative Examples, one or plural particles were selected in a field of view of a specific measurement point, and analyzed in the arrowed direction to obtain real data. Another one or plural particles were arbitrary selected and analyzed and the case also gave almost the same results, that is, even though the arrowed direction, the shape of the particles and the particle size differ, homogeneous alloys were obtained. Consequently, it is considered that arbitrary alloy nanoparticles constituting an aggregate could have almost the same results.

Figure 2A:
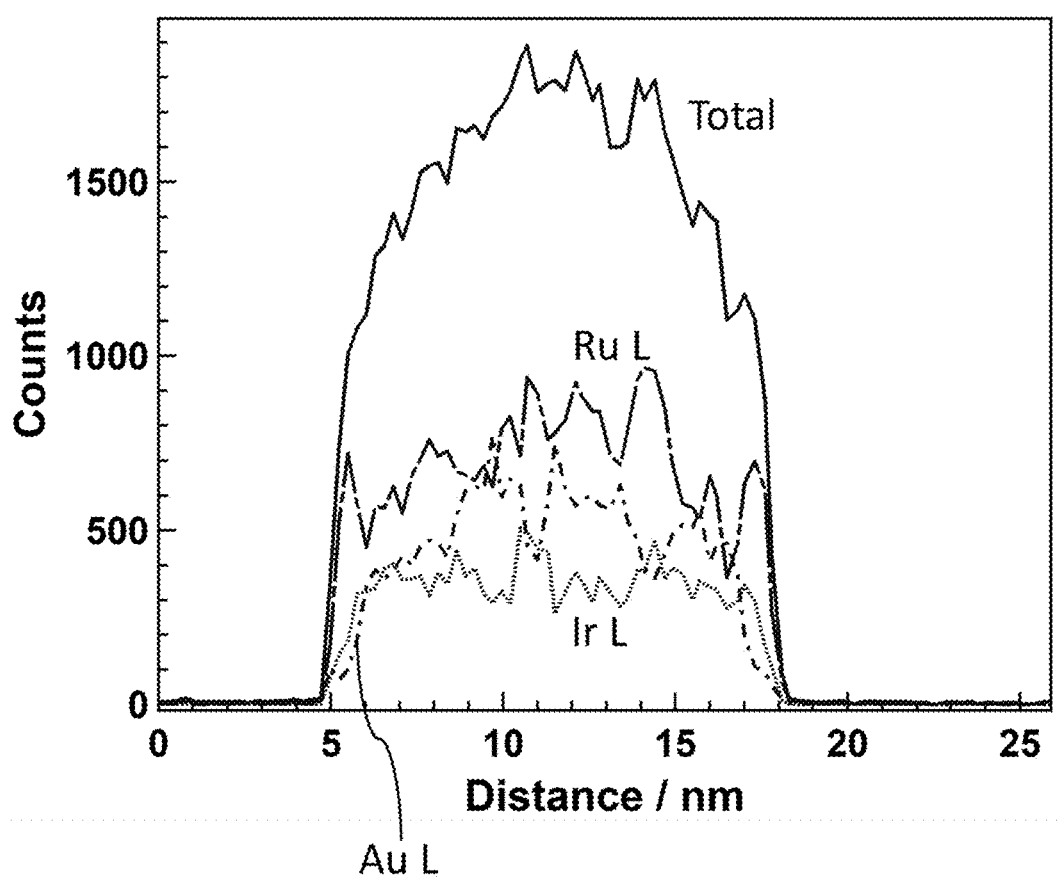
FIG. 2(A) is a graph showing the specific X-ray counts at each position (distance from a position 0.00 nm, and the same shall apply to the subsequent graphs) through the arrowed part in FIG. 1.
Figure 2B:
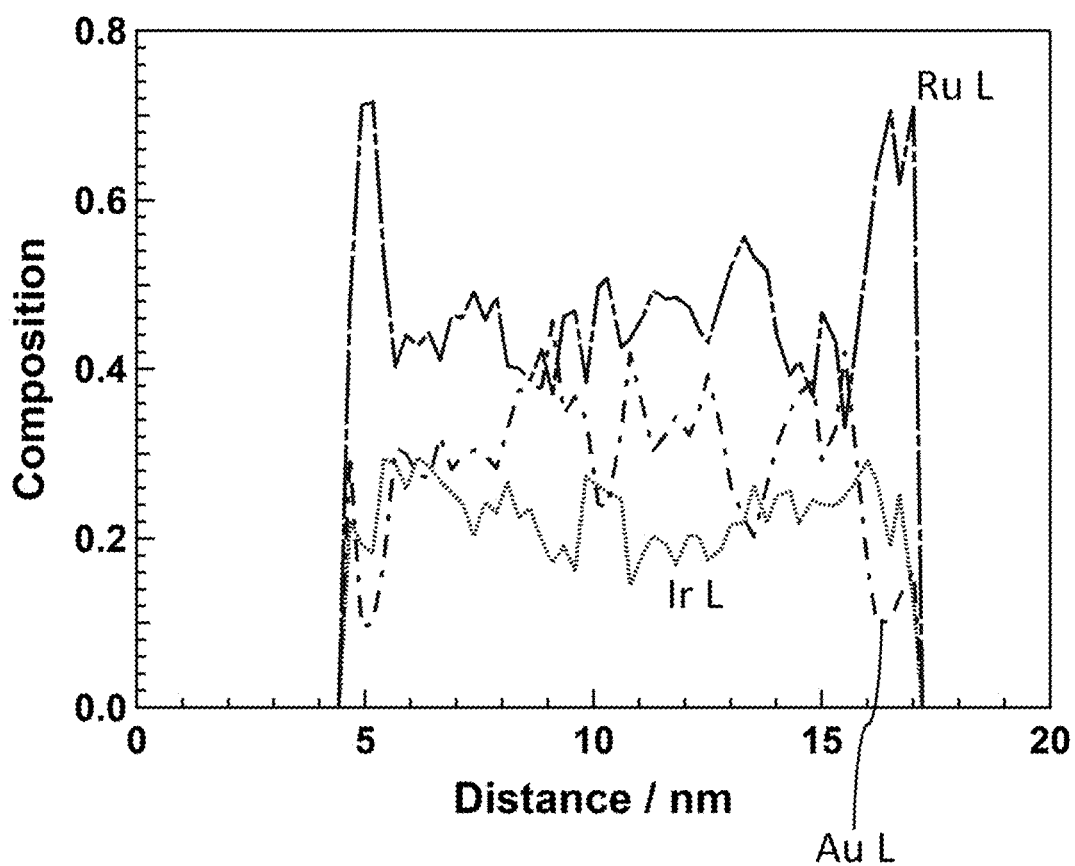
FIG. 2(B) is a graph showing the composition at each position through the arrowed part in FIG. 1.

Regarding the measurement points in FIG. 1, in the arrowed part, 100 points from a position 0.00 nm to a position 25.90 nm were elemental-analyzed at intervals of 0.15 to 0.30 nm. The background threshold was 30 counts. The nanoparticles were counted from a position 4.67 nm to a position 17.70 nm, and the length of the nanoparticles on the arrowed part was about 13.03 nm. A graph of the specific X-ray counts at each position in the arrowed part in FIG. 1 and the composition therein are shown in FIG. 2(A) and FIG. 2(B), respectively.

At the measurement point in FIG. 1, the average composition, the standard deviation of distribution in an alloy of each element constituting the alloy, and the correlation coefficient of distribution of two elements constituting the alloy were determined, and the data are shown in the following Table 2.

Ordinary arithmetic average was applied to the average composition.

Ordinary arithmetic average was applied to the standard deviation.

Centered log ratio transformation (clr) was applied to the correlation coefficient. For clr, Jour. Geol. Soc. Japan (2006) Vol. 112, No. 3, pp. 173-187 was referred to. Specifically, for the correlation coefficient, the line scanning data in EDX were transformed into composition data, using EDX software, Noran system 7 (by Thermo Fisher Scientific Inc.), and the correlation coefficient was calculated using statistical calculation software R and R library package Compositions. Compositions are a library for statistical analysis of composition data (see "Analyzing Compositional Data with R", van den Boogaart, K. Gerald, Tolosana-Delgado, Raimon, Softcover ISBN: 978-3-642-36808-0, by Springer).

TABLE 2

|  | Ru | Ir | Au |
|---|---|---|---|
| Average Composition (atomic %) | 48% | 23% | 29% |
| Standard Deviation | 0.09 | 0.04 | 0.09 |
| Correlation Coefficient | Ru—Ir 0.22 | Ru—Au −0.39 | Ir—Au 0.37 |

Figure 3:
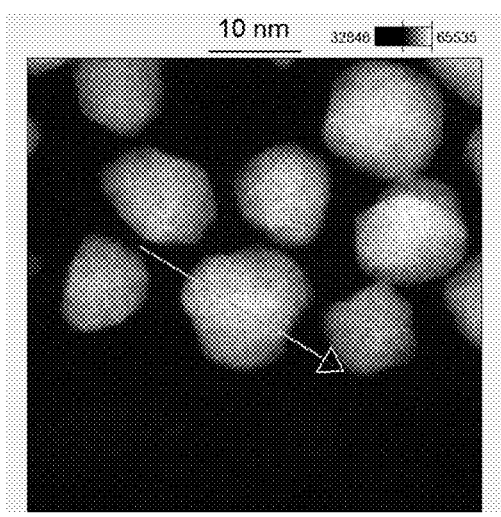
FIG. 3 is a scanning transmission electron micrograph used in other EDS line scan analysis in STEM-EDS of the alloy obtained in Example 1.
Figure 4A:
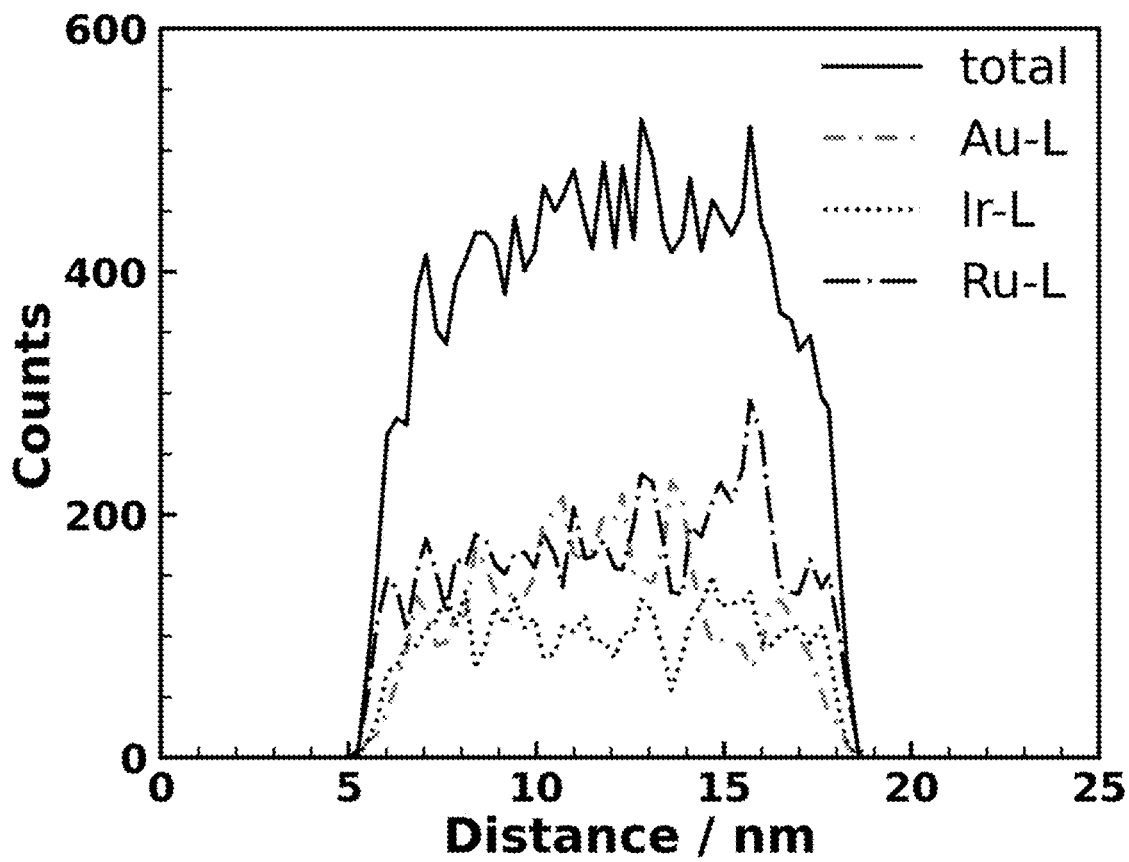
FIG. 4(A) is a graph showing the specific X-ray counts at each position through the arrowed part in FIG. 3.
Figure 4B:
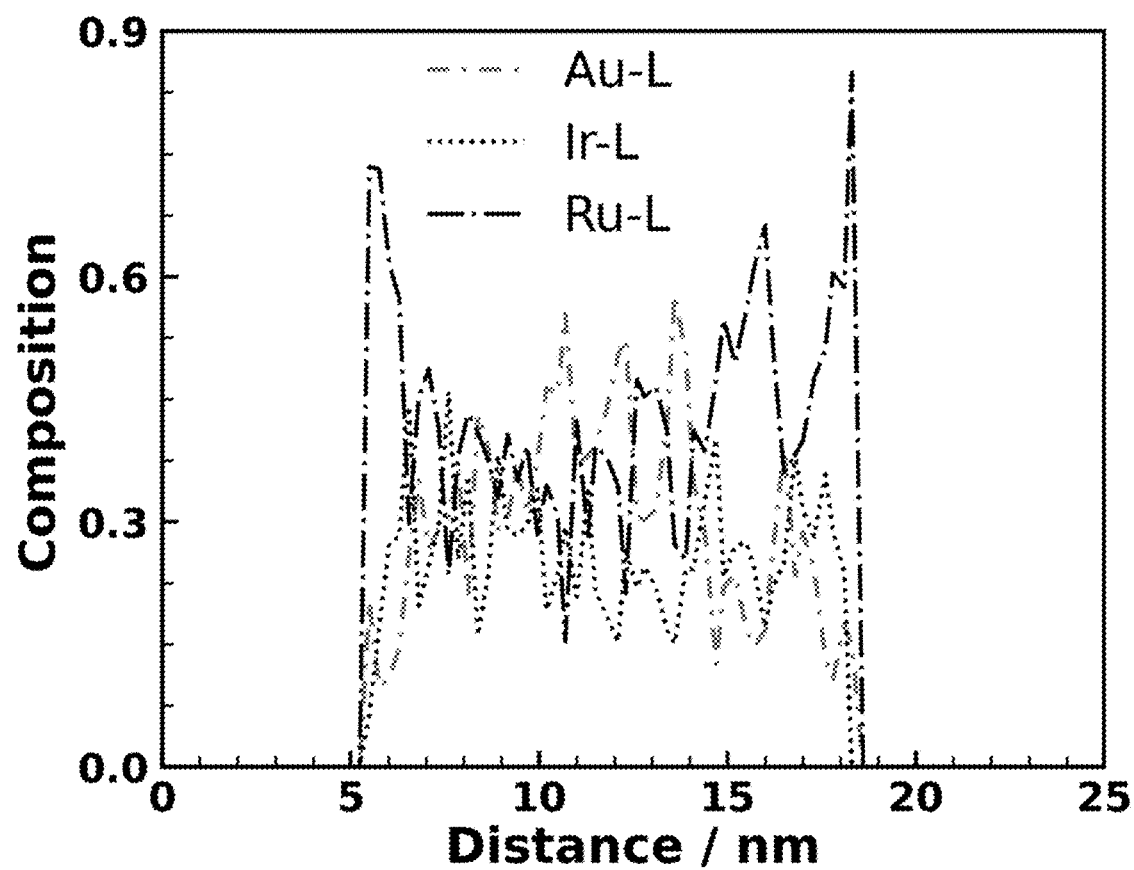
FIG. 4(B) is a graph showing the composition at each position through the arrowed part in FIG. 3.

At the measurement point in FIG. 1, elemental analysis of the nanoparticles obtained in Example 1 was performed at intervals of 0.15 to 0.30 nm in the arrowed part. The background threshold was 30 counts. A graph of the specific X-ray counts and a graph of the composition at each position in the arrowed part in FIG. 2 are shown in FIG. 3(A) and FIG. 3(B), respectively. The average composition and the standard deviation of distribution in the alloy of each element constituting the alloy were determined, and the data are shown in the following Table 3. The average composition, the standard deviation and the correlation coefficient were determined in the same manner as in Example 1.

TABLE 3

|  | Ru | Ir | Au |
|---|---|---|---|
| Average Composition (atomic %) | 43% | 26% | 31% |
| Standard Deviation | 0.14 | 0.08 | 0.12 |
| Correlation Coefficient | Ru—Ir 0.12 | Ru—Au −0.25 | Ir—Au 0.14 |

Figure 5:
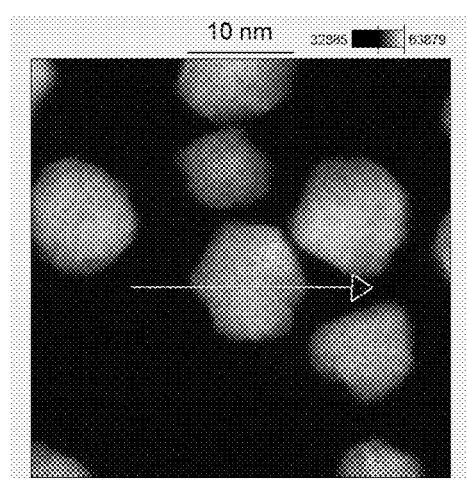
FIG. 5 is a scanning transmission electron micrograph used in other EDS line scan analysis in STEM-EDS of the alloy obtained in Example 1.
Figure 6A:
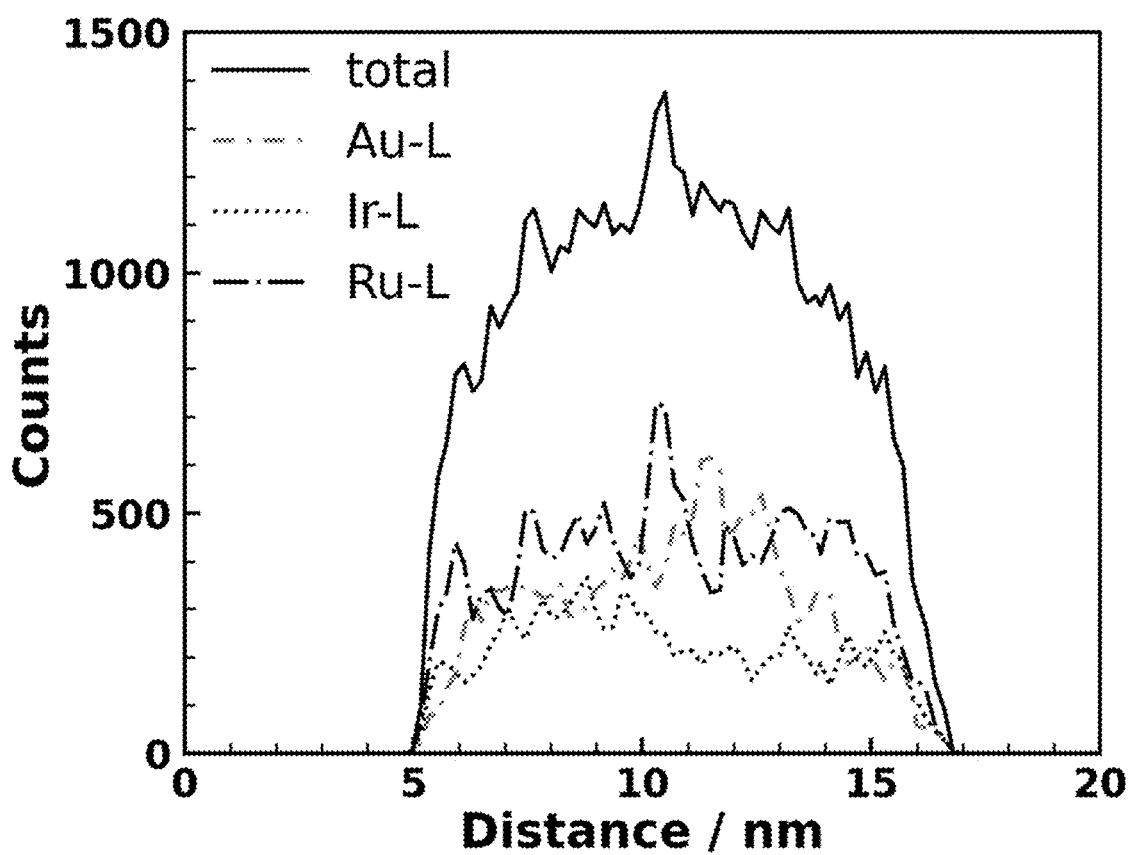
FIG. 6(A) is a graph showing the specific X-ray counts at each position through the arrowed part in FIG. 5.
Figure 6B:
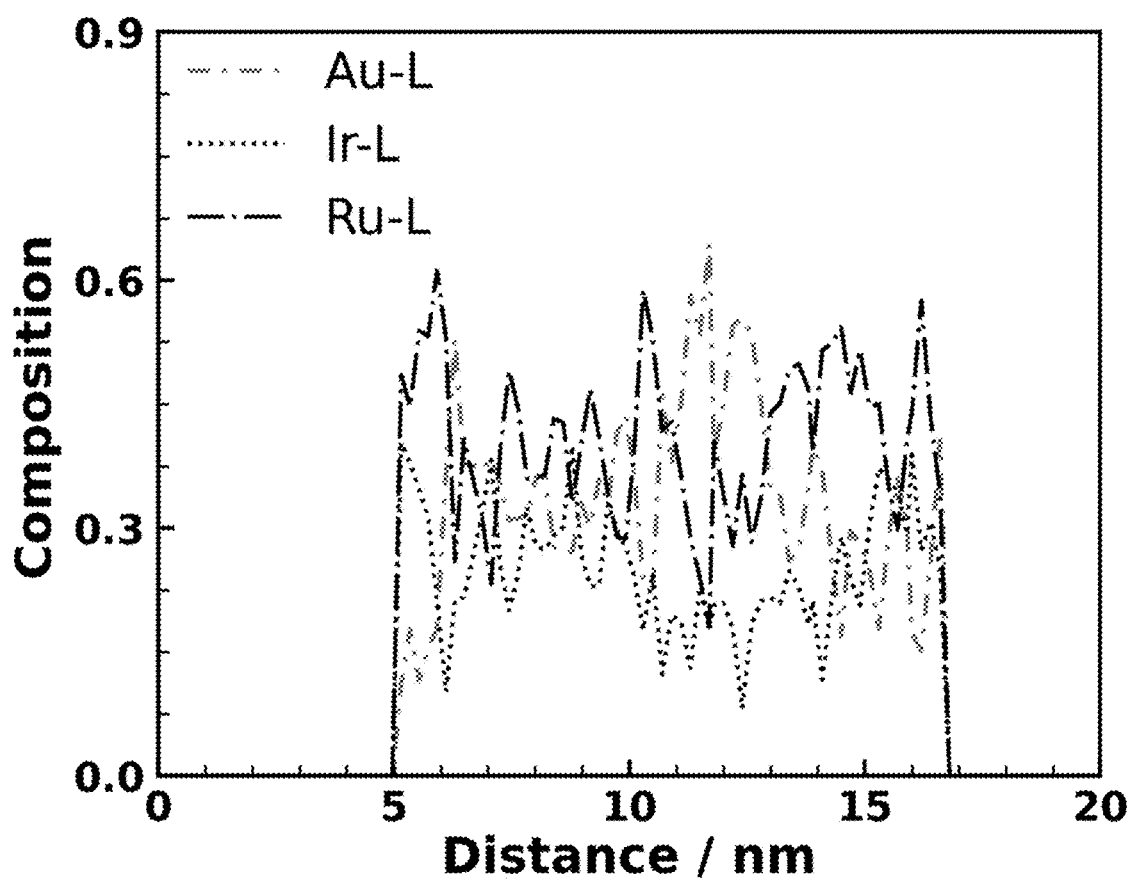
FIG. 6(B) is a graph showing the composition at each position through the arrowed part in FIG. 5.

At the measurement point in FIG. 5, elemental analysis of the nanoparticles obtained in Example 1 was performed at intervals of 0.15 to 0.30 nm in the arrowed part. The background threshold was 30 counts. A graph of the specific X-ray counts and a graph of the composition at each position in the arrowed part in FIG. 5 are shown in FIG. 6(A) and FIG. 6(B), respectively. The average composition and the standard deviation of distribution in the alloy of each element constituting the alloy were determined, and the data are shown in the following Table 4. The average composition, the standard deviation and the correlation coefficient were determined in the same manner as in Example 1.

TABLE 4

|  | Ru | Ir | Au |
|---|---|---|---|
| Average Composition (atomic %) | 41% | 25% | 34% |
| Standard Deviation | 0.09 | 0.07 | 0.12 |
| Correlation Coefficient | Ru—Ir 0.43 | Ru—Au −0.14 | Ir—Au −0.31 |

From Tables 2 to 4, it is known that the alloy of the present invention has a high solid solution uniformity in the shape of nanoparticles thereof.

Figure 7:
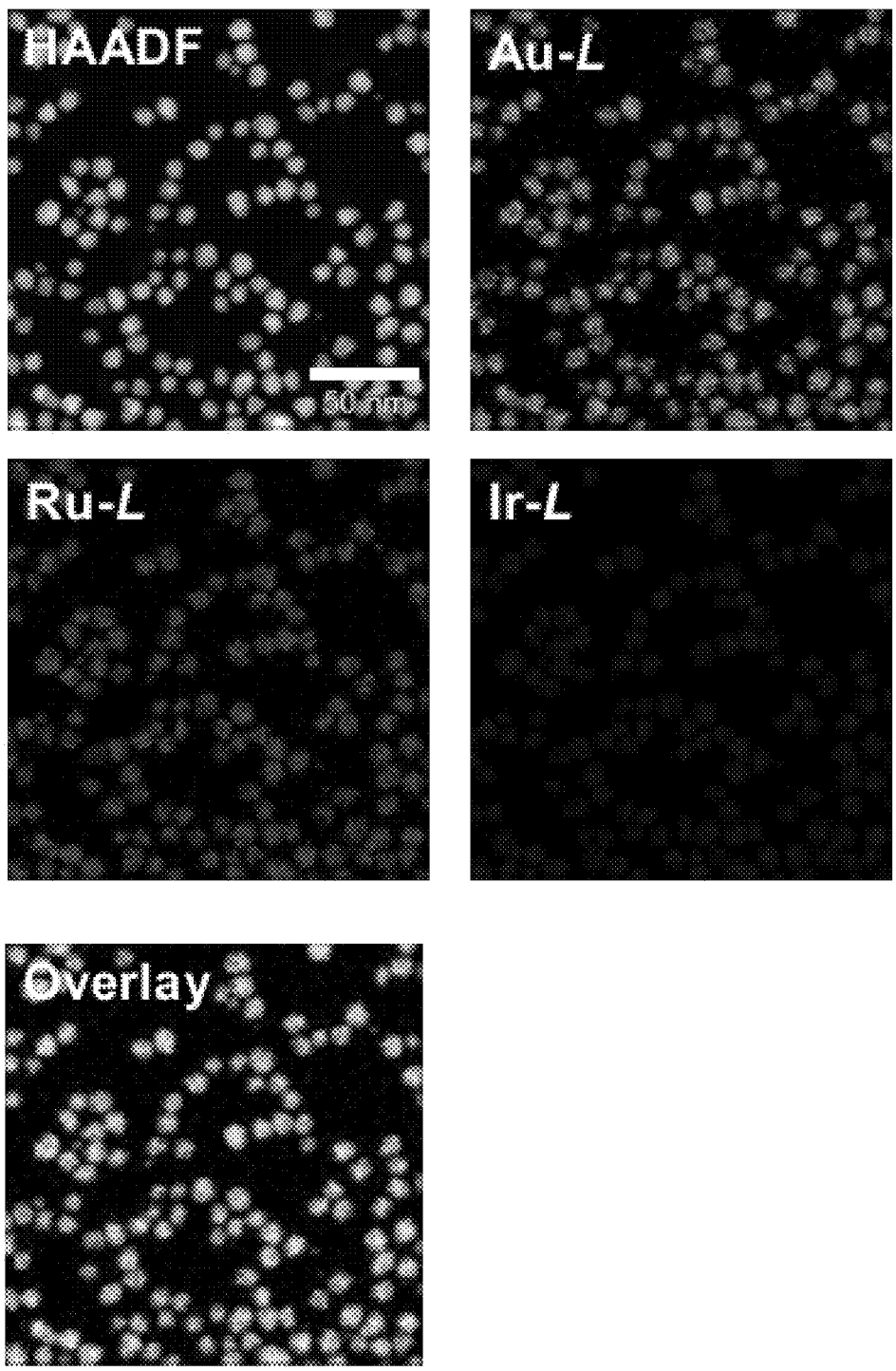
FIG. 7 shows a high-angle annular dark field (HAADF) STEM image and an energy dispersive X-ray spectroscopy (EDS) map of the alloy obtained in Example 1.

An HAADF-STEM image and an EDS map of a part of all the obtained alloys are shown in FIG. 7. From FIG. 7, it is confirmed that, so far as the STEM image was observed, all elements dissolved in solid solution in each nanoparticle. Namely, in the range of the field of view confirmed in this Example, it is known that the aggregate of alloy nanoparticles contains 100% by number of the alloy nanoparticles each composed of, as the constituent elements in the form of a solid solution, all the three types of elements contained in the compounds used for production of the alloy. In addition, it is known that, in the alloy of the present invention, arbitrary alloy nanoparticles constituting the aggregate contain, as the constituent elements, all the three types of elements contained in the compounds used for production of the alloy.

<XRD Analysis>

Figure 8:
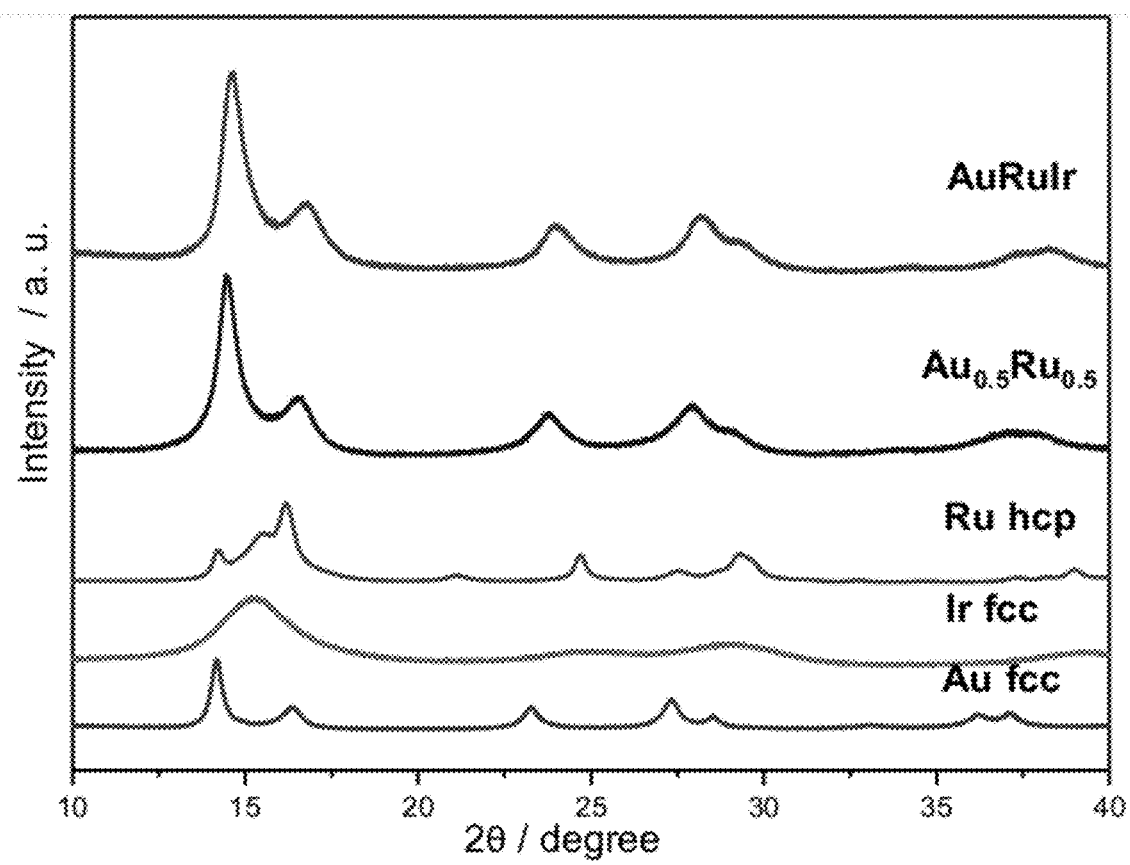
FIG. 8 shows an energy powder X-ray diffraction (XRD or PXRD) pattern of the alloy obtained in Example 1.

The resultant AuRuIr nanoparticles were analyzed by XRD analysis using Spring-8 BL02B2. The resultant data are shown in FIG. 8.

<Analysis by TEM>

Figure 9:
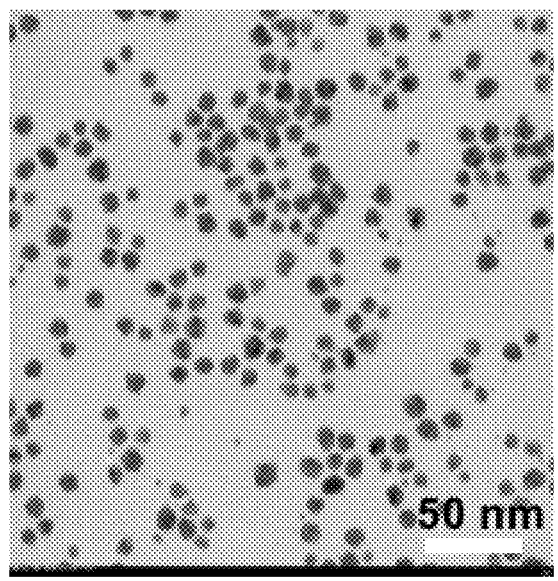
FIG. 9 is a transmission electron micrograph (TEM) of the alloy obtained in Example 1.

A TEM image of the resultant AuRuIr nanoparticles is shown in FIG. 9. In FIG. 9, the average particle size of the nanoparticles was 8.9±1.7 nm.

<Production of Electrode>

The resultant AuRuIr nanoparticles were held on carbon particles to produce an electrode catalyst (alloy/C: metal amount 20 wt %). The amount of the nanoparticles was 0.05 mg.

In water, the synthesized alloy nanoparticles were mixed with carbon particles (Vulcan-XC-72R) in a proportion of 20% by weight, and ultrasonically dispersed to be supported on carbon, then collected by centrifugation and dried to give a catalyst powder. 2.5 mg of the catalyst powder was dispersed in a mixed solution of 6.55 ml of isopropanol and 3.44 ml of water, then 0.01 ml of 5 wt % Nafion (registered trademark) solution (by FUJIFILM Wako Pure Chemical Corporation) was added and fully mixed to give a catalyst ink. An appropriate amount of the ink was applied to a work electrode such as a rotary ring disc electrode or a glassy carbon electrode to produce a catalyst electrode.

<Catalyst Activity>

Figure 10A:
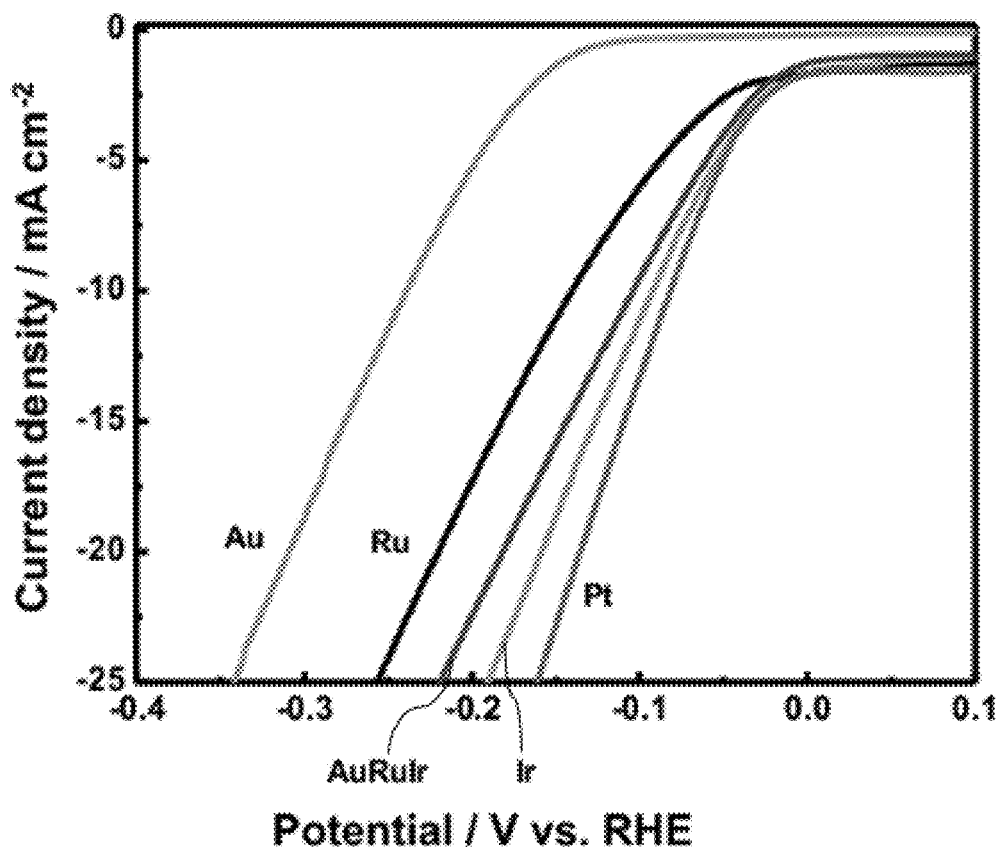
FIG. 10(A) is a graph relating to the hydrogen electrode reaction (HER) catalyst activity of the alloy obtained in Example 1.
Figure 10B:
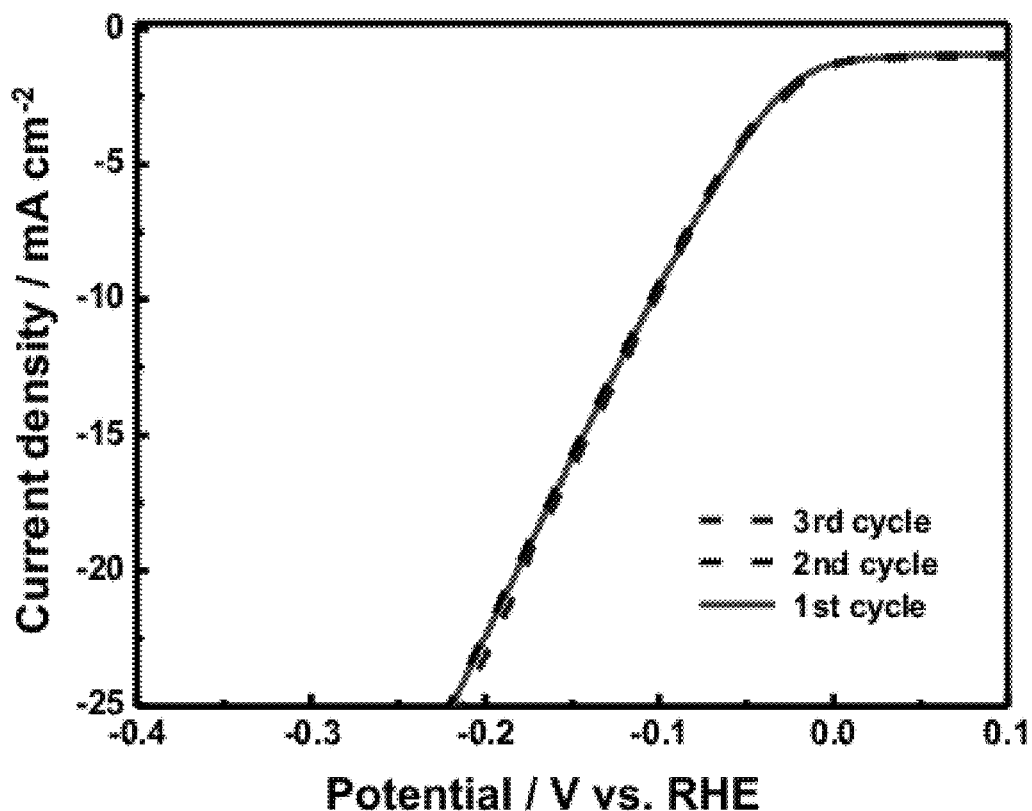
FIG. 10(B) is a graph relating to the comparison in three measurements of the HER catalyst activity of the alloy obtained in Example 1.

Current measurement device: Potentiostat (ALS760E, by BAS Inc.) Measurement method: Using a three-electrode mode cell (counter electrode: platinum wire, reference electrode: silver-silver chloride electrode (Ag/AgCl), electrolytic solution: aqueous 0.1 M $HClO_4$ solution, 25° C., oxygen saturation) in which the cathode was a rotary ring disc electrode having the resultant AuRuIr nanoparticles supported on carbon particles, the current value I was measured when the potential E was swept from 0.1 V to −0.4 V (vs. RHE) at 5 mV/s, to thereby evaluate the HER catalyst activity three times. The results are shown in FIG. 10(A) and FIG. 10(B).

$$2H^+ + 2e^- \rightarrow H_2 \quad \text{HER:}$$

[Example 11]: RuRhAu

<Individual Ultrasonic Treatment of Metal Ion Solutions>

A metal ion solution was prepared by dissolving $HAuBr_4$ in diethylene glycol DEG, and while light was blocked, the solution was ultrasonically treated for 5 minutes.

A metal ion solution was prepared by dissolving $K_2RuCl_5$ (NO) in diethylene glycol DEG, and while light was blocked, the solution was ultrasonically treated for 5 minutes.

A metal ion solution was prepared by dissolving $RhCl_3$ in diethylene glycol DEG, and ultrasonically treated for 5 minutes.

The three metal ion solutions that had been individually ultrasonicated were mixed in 1/1/1, and about 3 ml of each metal ion mixed solution of 0.15 mmol DEG solution were dissolved and combined to be 10 ml.

<Preparation of Alloy>

100 ml of ethylene glycol (EG) containing polyvinylpyrrolidone (PVP) K30 (4 mmol: by FUJIFILM Wako Pure Chemical Corporation) was stirred under heat at 195° C.

To the solution, the metal ion mixed solution was added dropwise at a rate of 1.5 ml/min using a syringe pump, and kept at 195° C. for 10 minutes. Subsequently, this was left cooled to room temperature. The formed precipitate of nanoparticles was separated by centrifugation.

<Elementary Analysis)

The separated nanoparticles were analyzed by STEM-EDS. By line scanning elemental analysis with a scanning transmission electron microscope for plural fields of view, the metal composition of the three elements was calculated.

Figure 11:
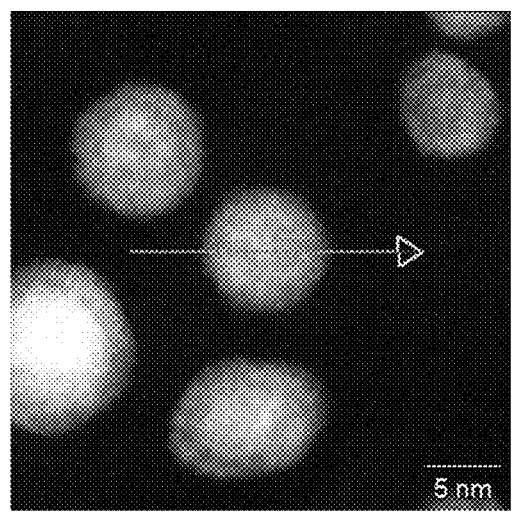
FIG. 11 is a scanning transmission electron micrograph used in EDS line scan analysis in STEM-EDS of the alloy obtained in Example 11.
Figure 12A:
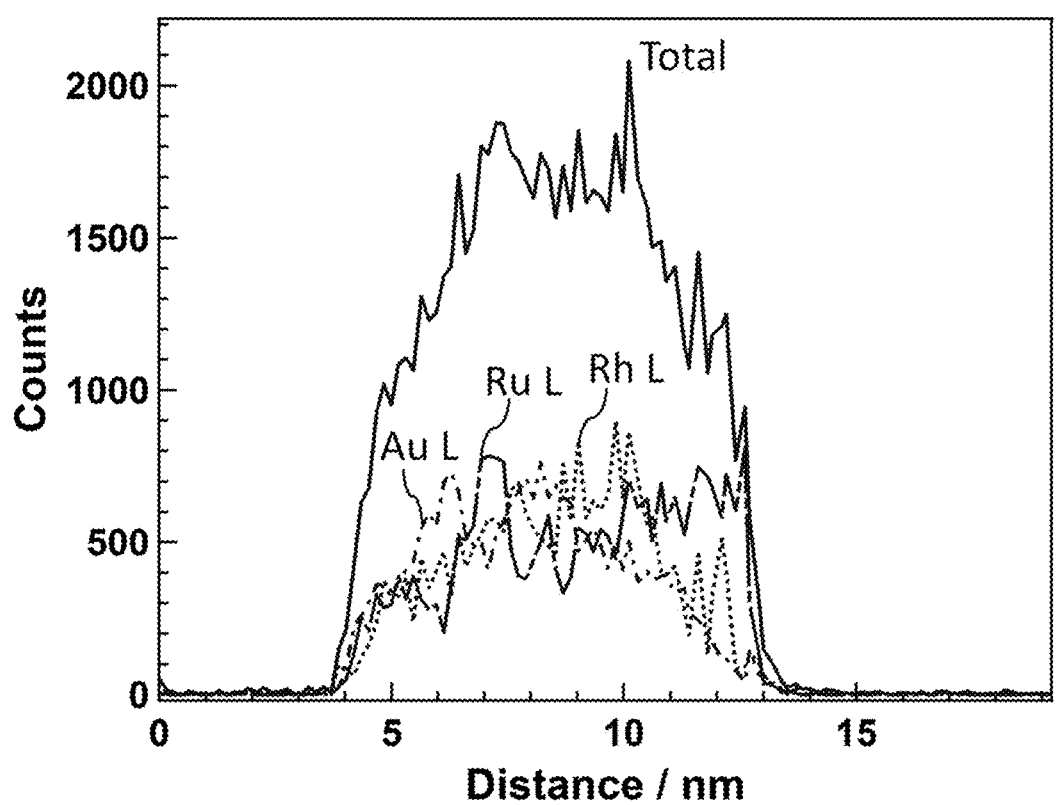
FIG. 12(A) is a graph showing the specific X-ray counts at each position through the arrowed part in FIG. 11.
Figure 12B:
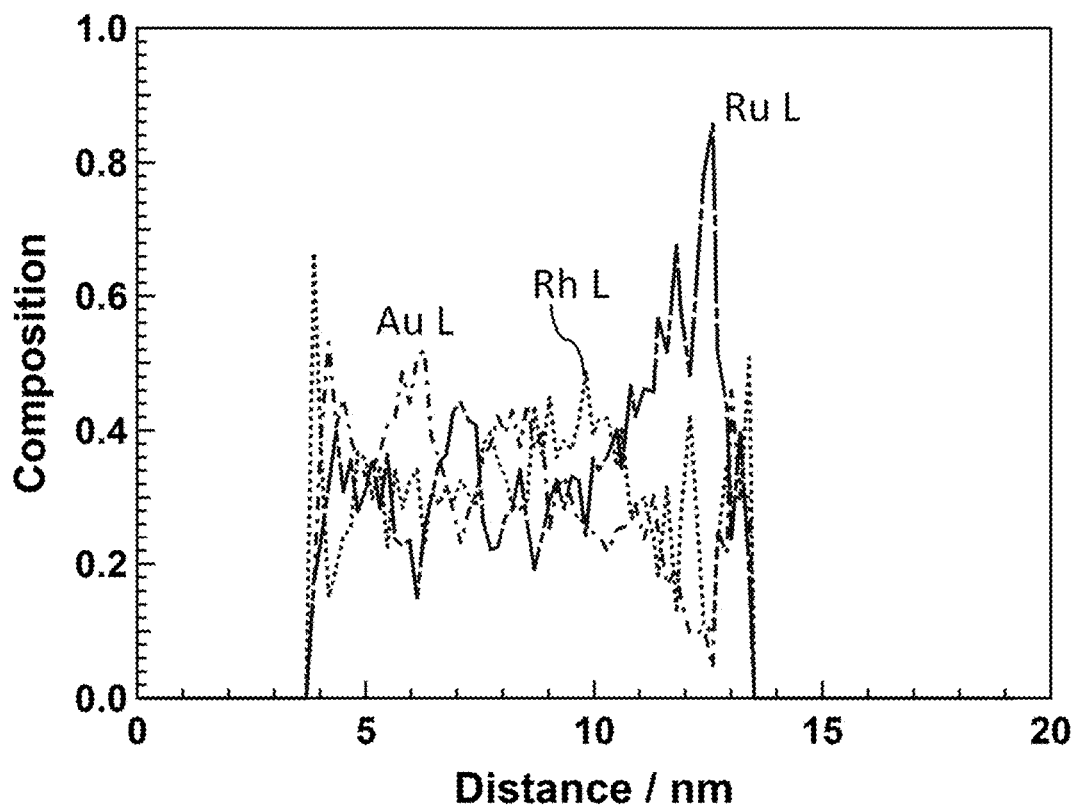
FIG. 12(B) is a graph showing the composition at each position through the arrowed part in FIG. 11.

Regarding the measurement points in FIG. 11, in the arrowed part, 120 points from a position 0.00 nm to a position 19.20 nm were elemental-analyzed at intervals of 0.10 to 0.20 nm. The background threshold was 35 counts. The nanoparticles were counted from a position 3.86 nm to a position 13.40 nm, and the length of the nanoparticles on the arrowed part was about 9.54 nm. A graph of the counts at each position in the arrowed part in FIG. 11 and the composition therein are shown in FIG. 12(A) and FIG. 12(B), respectively.

At the measurement point in FIG. 11, the average composition, the standard deviation of distribution in an alloy of each element constituting the alloy, and the correlation coefficient of distribution of two elements constituting the alloy were determined, and the data are shown in the following Table 5.

TABLE 5

|  | Ru | Rh | Au |
|---|---|---|---|
| Average Composition (atomic %) | 36% | 32% | 32% |
| Standard Deviation | 0.14 | 0.10 | 0.11 |
| Correlation Coefficient | Ru—Rh 0.02 | Ru—Au −0.39 | Rh—Au 0.37 |

Figure 13:
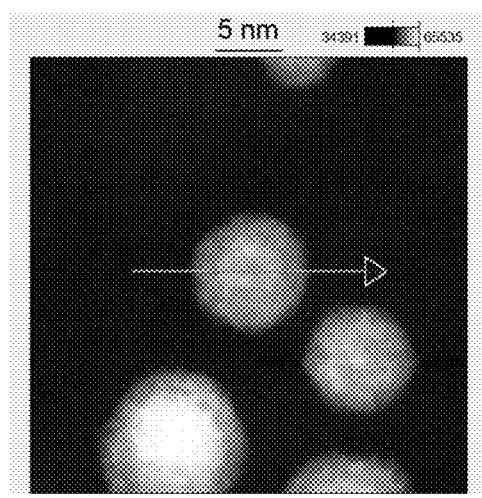
FIG. 13 is a scanning transmission electron micrograph used in other EDS line scan analysis in STEM-EDS of the alloy obtained in Example 11.
Figure 14A:
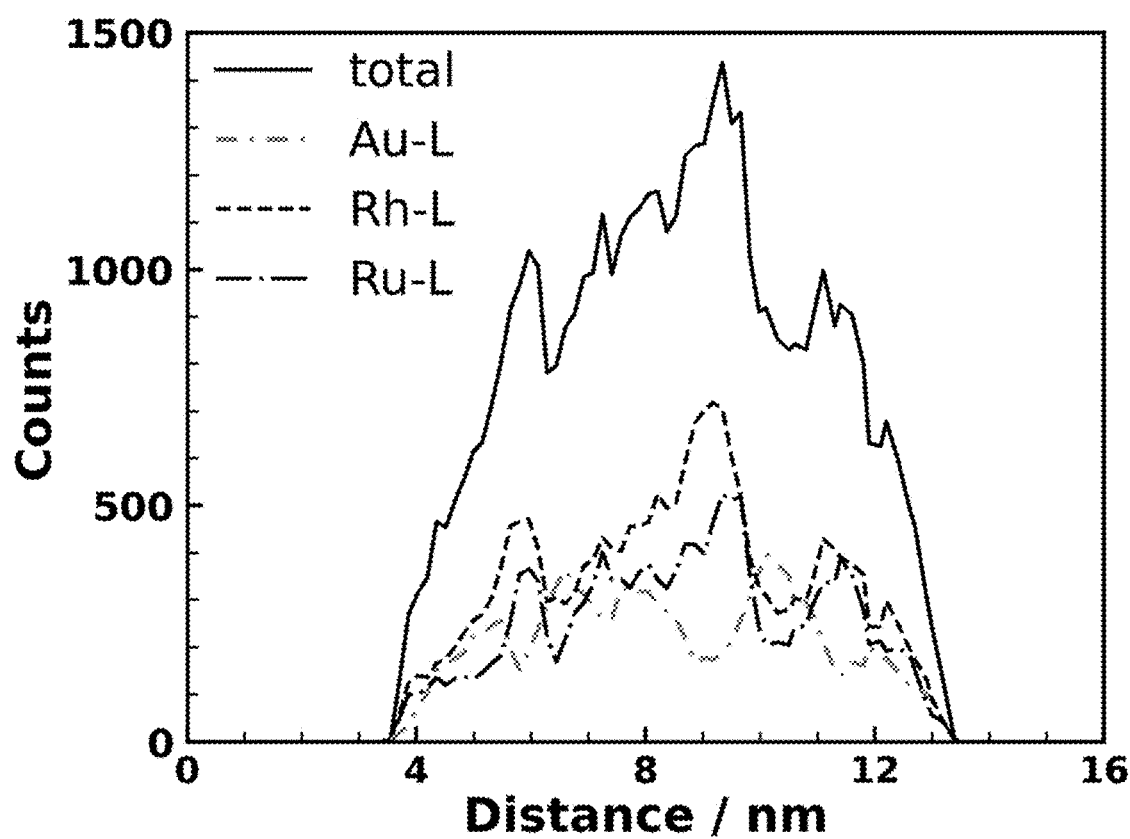
FIG. 14(A) is a graph showing the specific X-ray counts at each position through the arrowed part in FIG. 13.
Figure 14B:
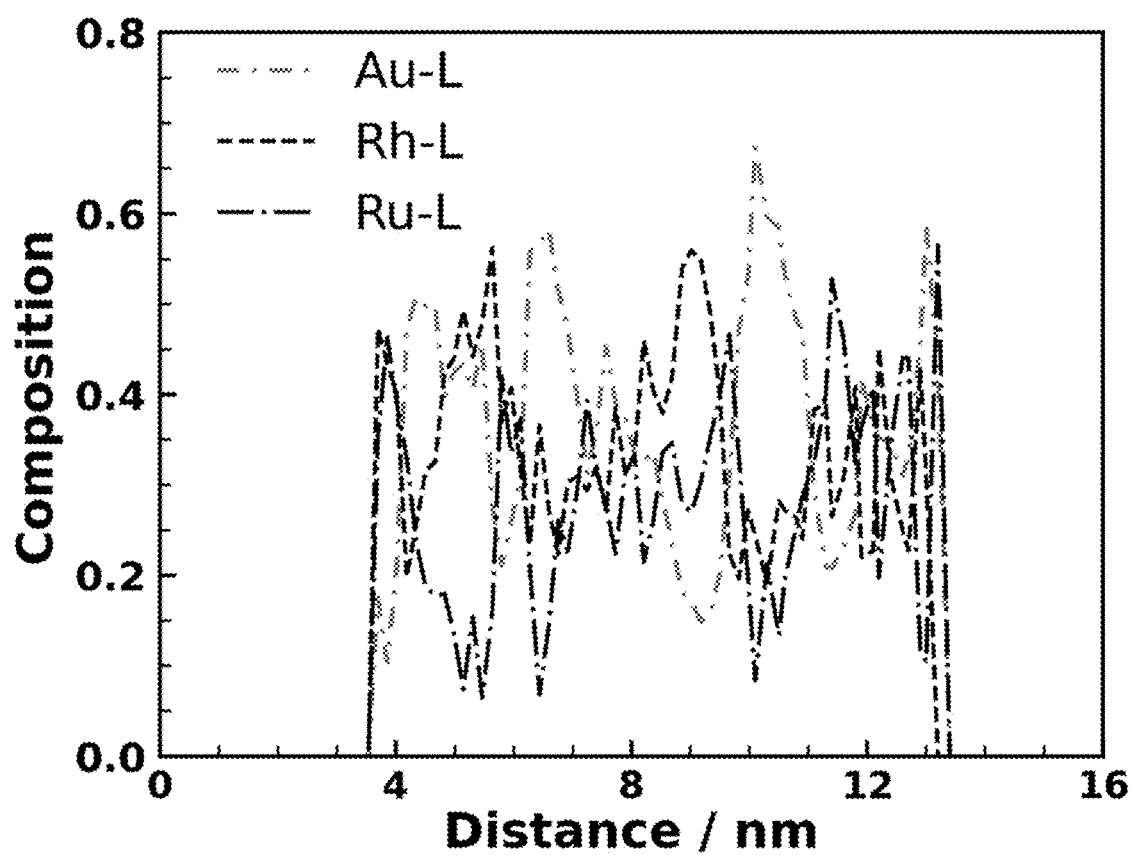
FIG. 14(B) is a graph showing the composition at each position through the arrowed part in FIG. 13.

At the measurement point in FIG. 13, elemental analysis of the nanoparticles obtained in Example 11 was performed at intervals of 0.15 to 0.30 nm in the arrowed part. The background threshold was 30 counts. A graph of the specific X-ray counts and a graph of the composition at each position in the arrowed part in FIG. 13 are shown in FIG. 14(A) and FIG. 14(B), respectively. The average composition and the standard deviation of distribution in the alloy of each element constituting the alloy were determined, and the data are shown in the following Table 6. The average composition, the standard deviation and the correlation coefficient were determined in the same manner as in Example 1.

TABLE 6

|  | Ru | Rh | Au |
|---|---|---|---|
| Average Composition (atomic %) | 28% | 35% | 37% |
| Standard Deviation | 0.12 | 0.11 | 0.13 |
| Correlation Coefficient | Ru—Rh 0.15 | Ru—Au −0.34 | Rh—Au 0.21 |

Figure 15:
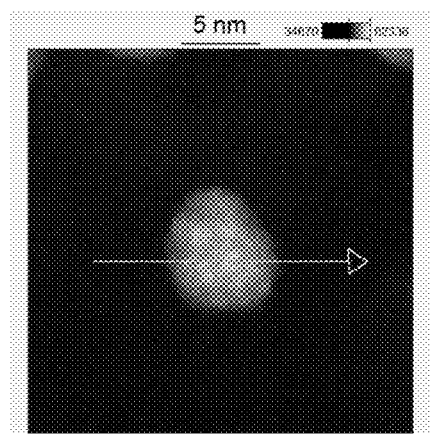
FIG. 15 is a scanning transmission electron micrograph used in other EDS line scan analysis in STEM-EDS of the alloy obtained in Example 11.
Figure 16A:
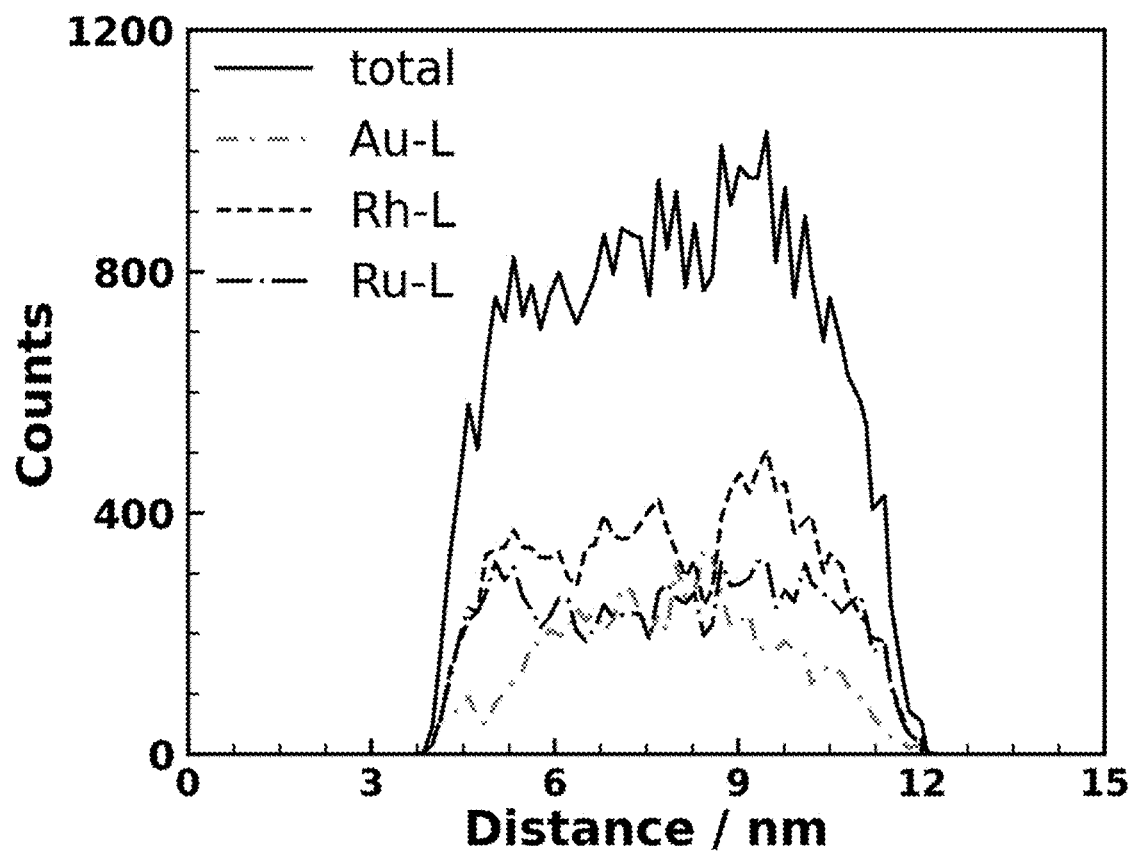
FIG. 16(A) is a graph showing the specific X-ray counts at each position through the arrowed part in FIG. 15.
Figure 16B:
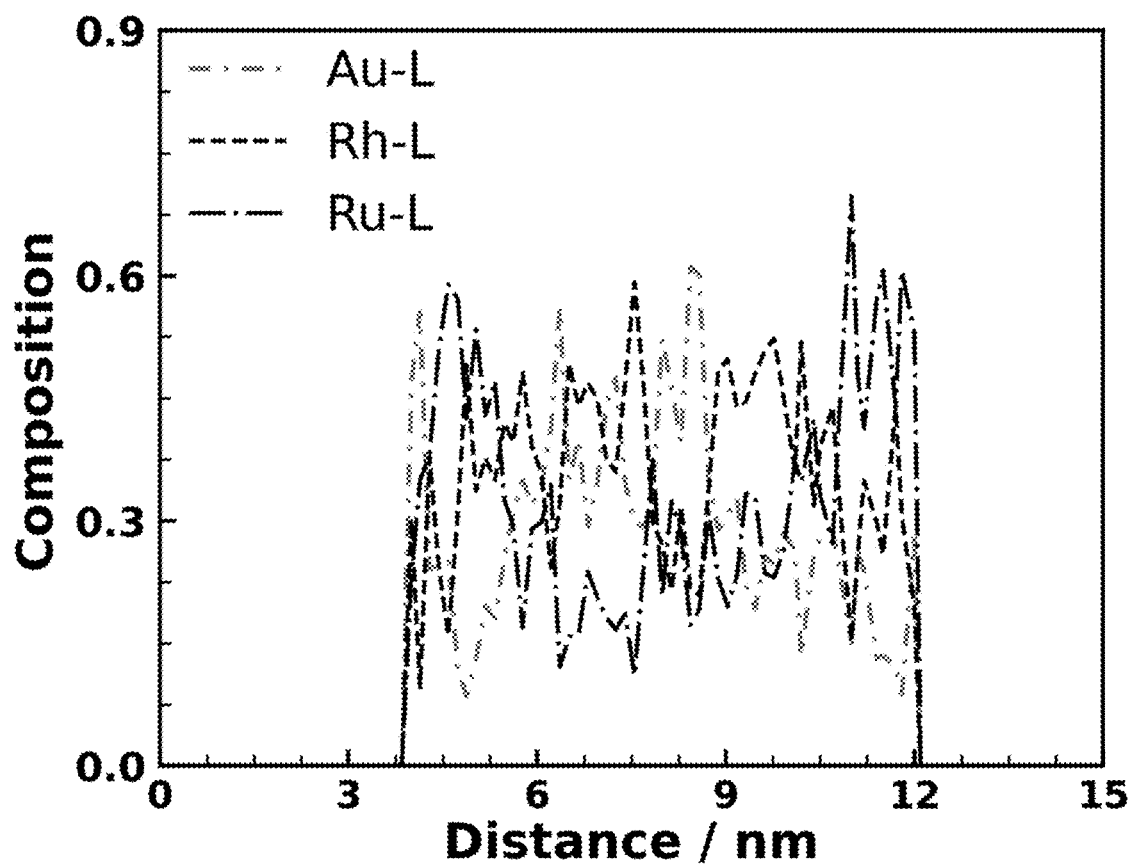
FIG. 16(B) is a graph showing the composition at each position through the arrowed part in FIG. 15.

At the measurement point in FIG. 15, elemental analysis of the nanoparticles obtained in Example 11 was performed at intervals of 0.15 to 0.30 nm in the arrowed part. The background threshold was 30 counts. A graph of the specific X-ray counts and a graph of the composition at each position in the arrowed part in FIG. 15 are shown in FIG. 16(A) and FIG. 16(B), respectively. The average composition and the standard deviation of distribution in the alloy of each element constituting the alloy were determined, and the data are shown in the following Table 7. The average composition, the standard deviation and the correlation coefficient were determined in the same manner as in Example 1.

TABLE 7

|  | Ru | Rh | Au |
|---|---|---|---|
| Average Composition (atomic %) | 34% | 36% | 30% |
| Standard Deviation | 0.14 | 0.11 | 0.13 |
| Correlation Coefficient | Ru—Rh 0.13 | Ru—Au −0.34 | Rh—Au 0.23 |

Figure 17:
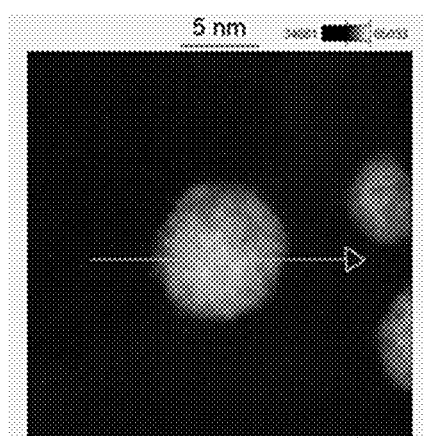
FIG. 17 is a scanning transmission electron micrograph used in other EDS line scan analysis in STEM-EDS of the alloy obtained in Example 11.
Figure 18A:
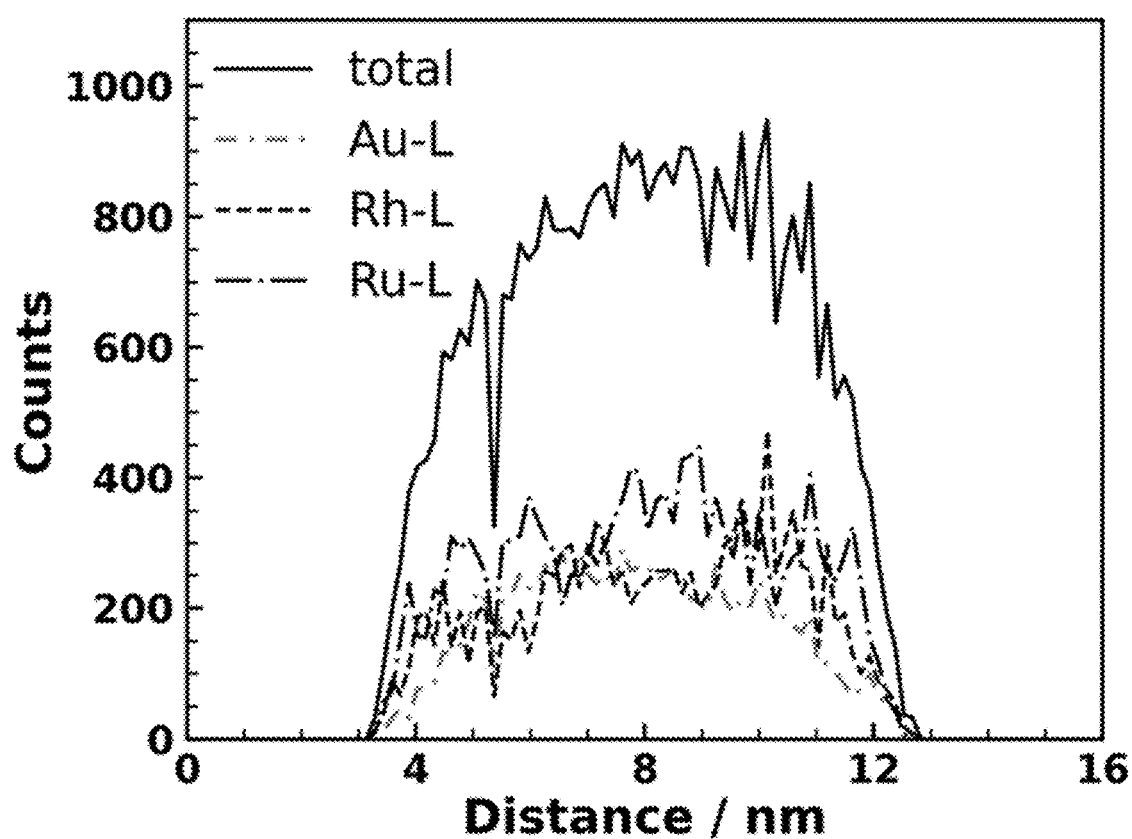
FIG. 18(A) is a graph showing the specific X-ray counts at each position through the arrowed part in FIG. 17.
Figure 18B:
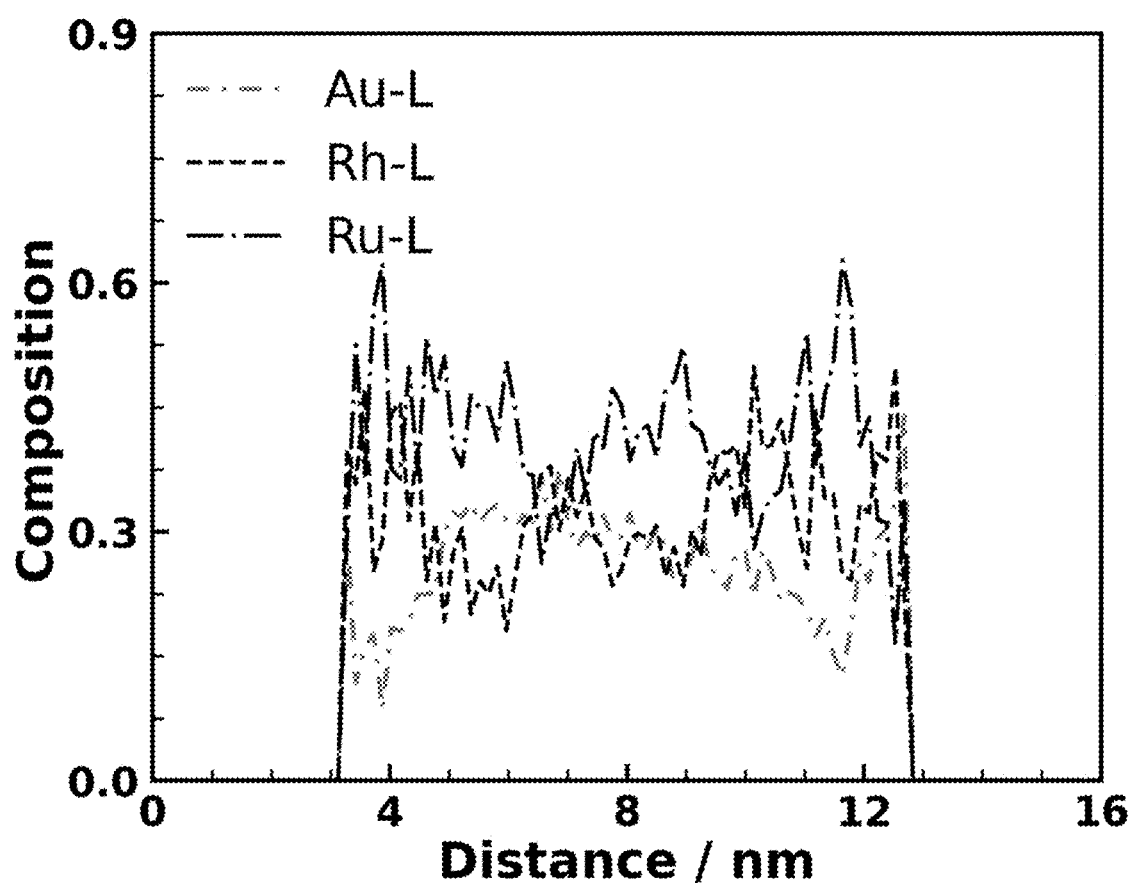
FIG. 18(B) is a graph showing the composition at each position through the arrowed part in FIG. 17.

At the measurement point in FIG. 17, elemental analysis of the nanoparticles obtained in Example 11 was performed at intervals of 0.15 to 0.30 nm in the arrowed part. The background threshold was 30 counts. A graph of the specific X-ray counts and a graph of the composition at each position in the arrowed part in FIG. 17 are shown in FIG. 18(A) and FIG. 18(B), respectively. The average composition and the standard deviation of distribution in the alloy of each element constituting the alloy were determined, and the data are shown in the following Table 8. The average composition, the standard deviation and the correlation coefficient were determined in the same manner as in Example 1.

TABLE 8

|  | Ru | Rh | Au |
|---|---|---|---|
| Average Composition (atomic %) | 41% | 32% | 26% |
| Standard Deviation | 0.09 | 0.08 | 0.07 |
| Correlation Coefficient | Ru—Rh 0.03 | Ru—Au −0.09 | Rh—Au 0.06 |

From Tables 5 to 8, it is known that the alloy of the present invention has a high solid solution uniformity in the shape of nanoparticles thereof.

Figure 19:
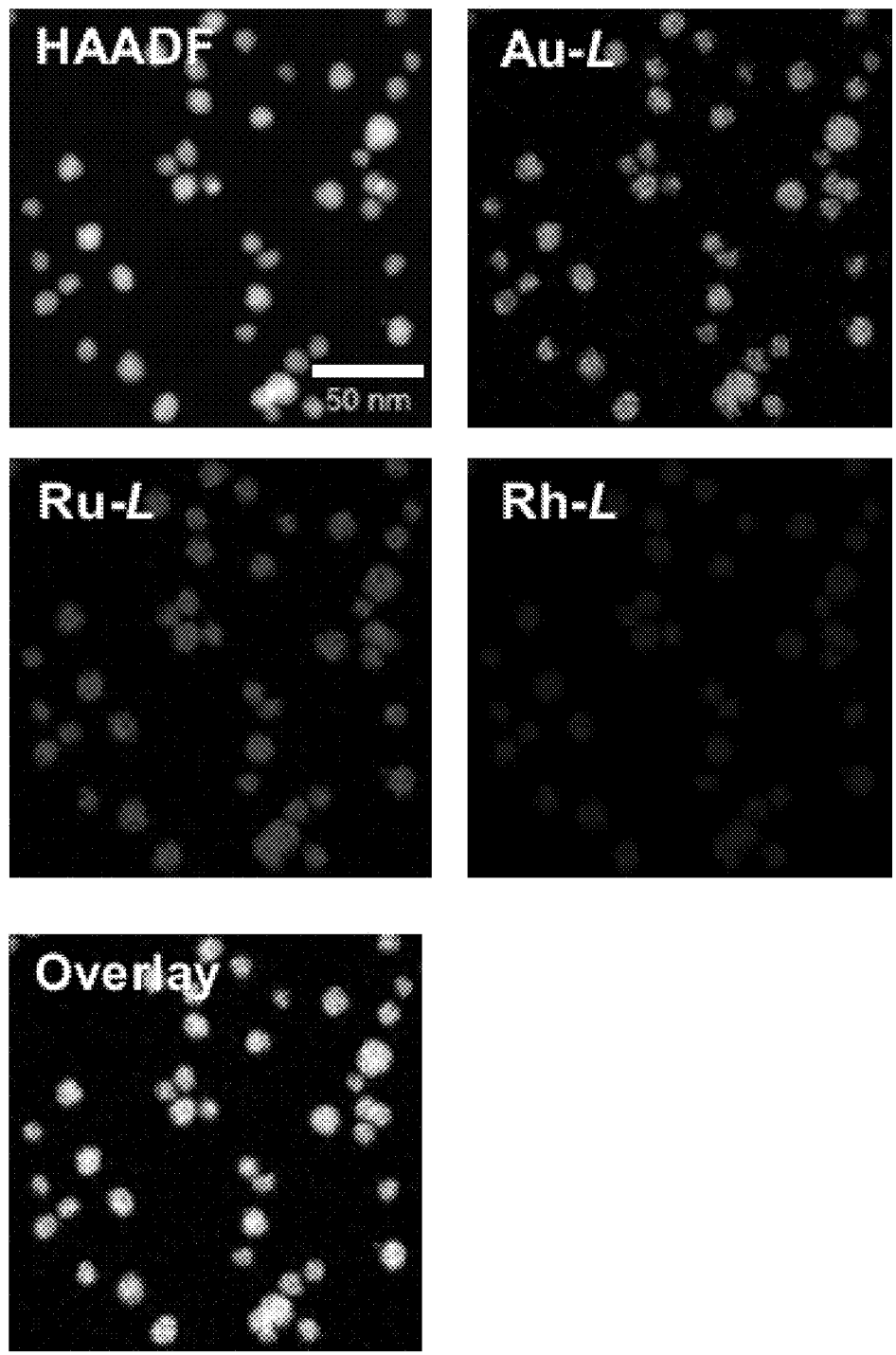
FIG. 19 shows a HAADF-STEM image and an energy dispersive X-ray spectroscopy (EDS) map of the alloy obtained in Example 11.

An HAADF-STEM image and an EDS map of a part of all the obtained alloys are shown in FIG. 19. From FIG. 19, it is confirmed that, so far as the STEM image was observed, all elements dissolved in solid solution in each nanoparticle. Namely, in the range of the field of view confirmed in this Example, it is known that the aggregate of alloy nanoparticles contains 100% by number of the alloy nanoparticles each composed of, as the constituent elements in the form of a solid solution, all the three types of elements contained in the compounds used for production of the alloy. In addition, it is known that, in the alloy of the present invention, arbitrary alloy nanoparticles constituting the aggregate contain, as the constituent elements, all the three types of elements contained in the compounds used for production of the alloy.

<XRD Analysis>

Figure 20:
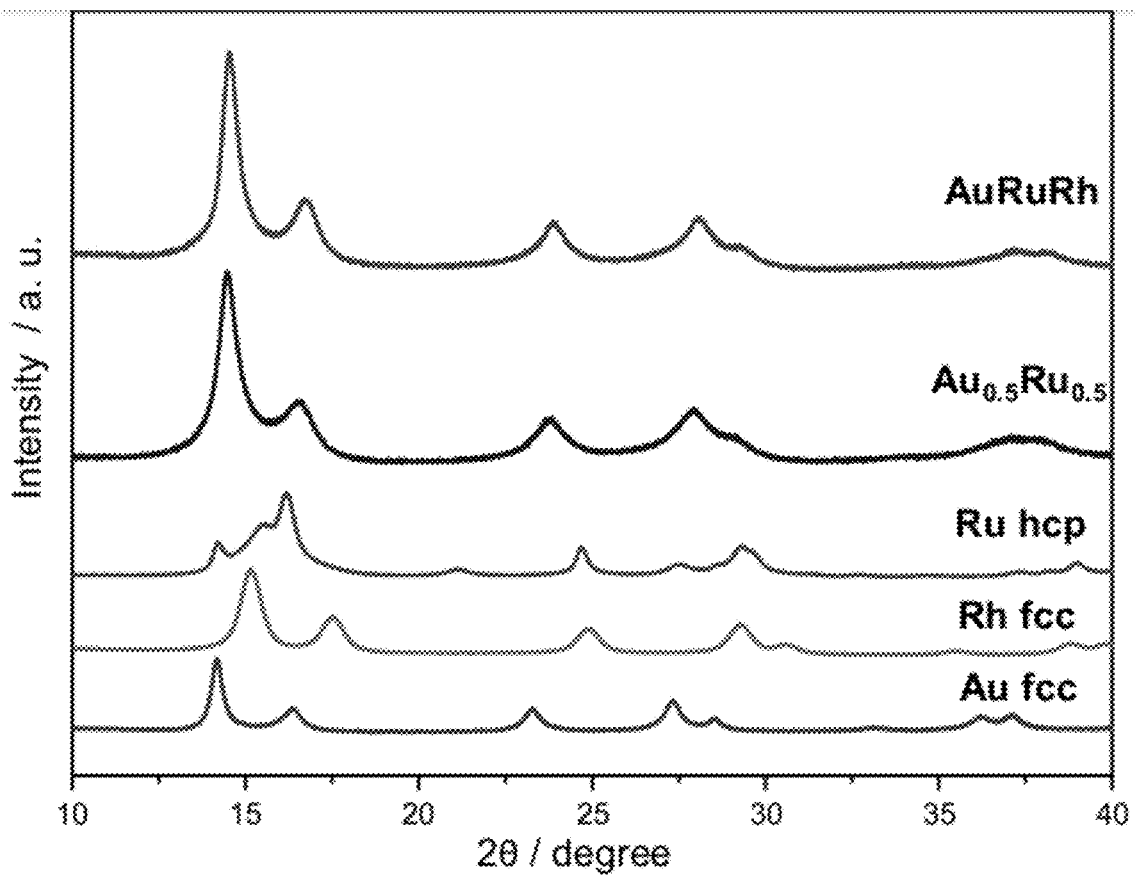
FIG. 20 shows an energy powder X-ray diffraction (XRD or PXRD) pattern of the alloy obtained in Example 11.

The resultant RuRhAu nanoparticles were analyzed by XRD analysis using Spring-8 BL02B2. The resultant data are shown in FIG. 20.

<Analysis by TEM and XRF>

Figure 21:
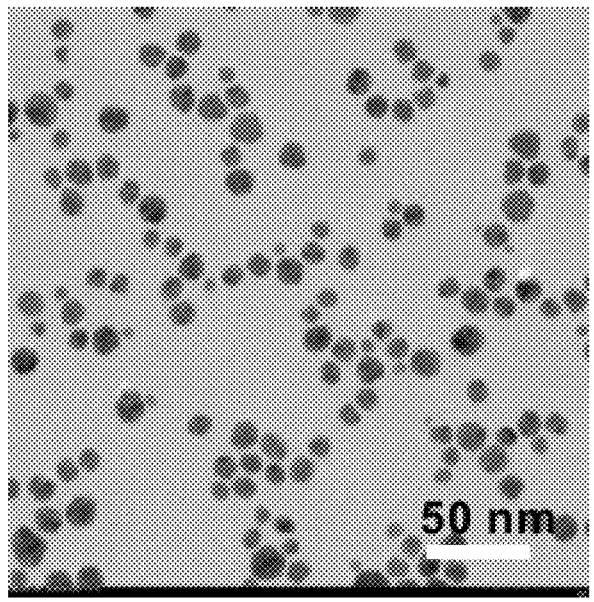
FIG. 21 is a transmission electron micrograph (TEM) of the alloy obtained in Example 11.

A TEM image of the resultant RuRhAu nanoparticles is shown in FIG. 21. In FIG. 21, the average particle size of the nanoparticles was 11.1±2.5 nm.

The result of elementary analysis by XRF was: Ru/Rh/Au=35.1 atomic %/34.3 atomic %/30.6 atomic %.

<Catalyst Activity>

The resultant RuRhAu nanoparticles were held on carbon particles to produce an electrode catalyst (alloy/C: metal amount 20 wt %). The amount of the nanoparticles was 0.05 mg. An electrode was produced in the same manner as in Example 1.

Current measurement device: Potentiostat (ALS760E, by BAS Inc.)

Figure 22A:
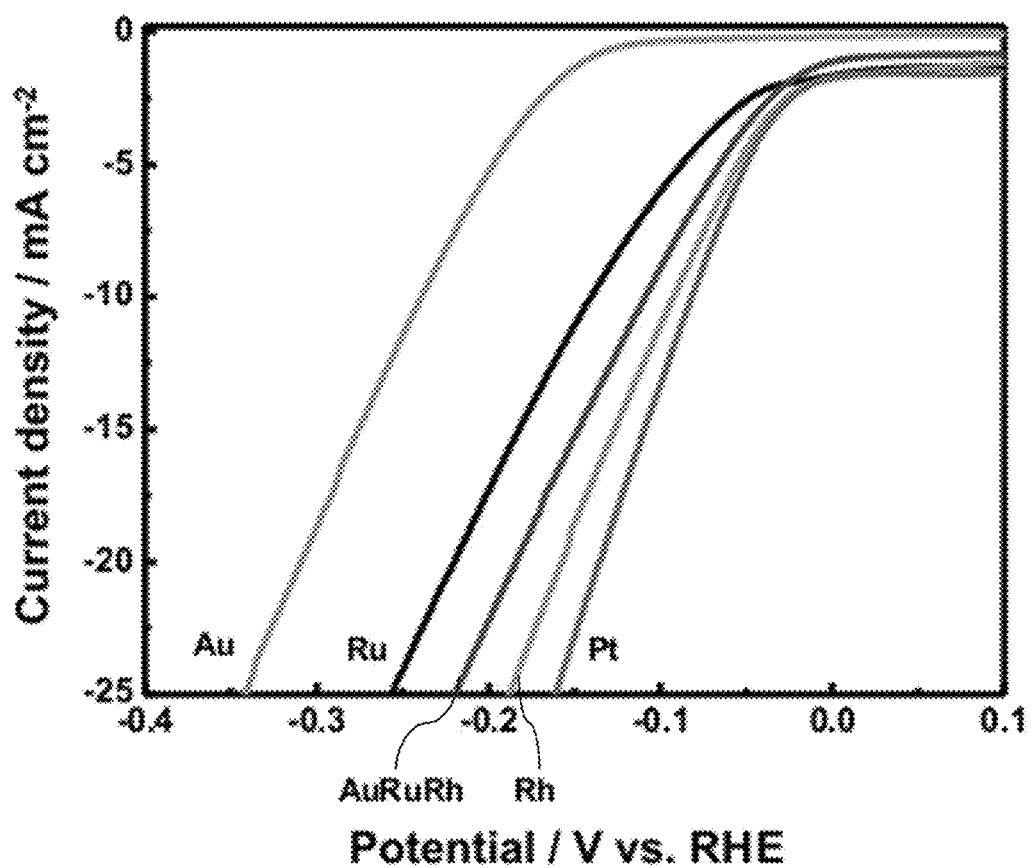
FIG. 22(A) is a graph relating to the HER catalyst activity of the alloy obtained in Example 11.
Figure 22B:
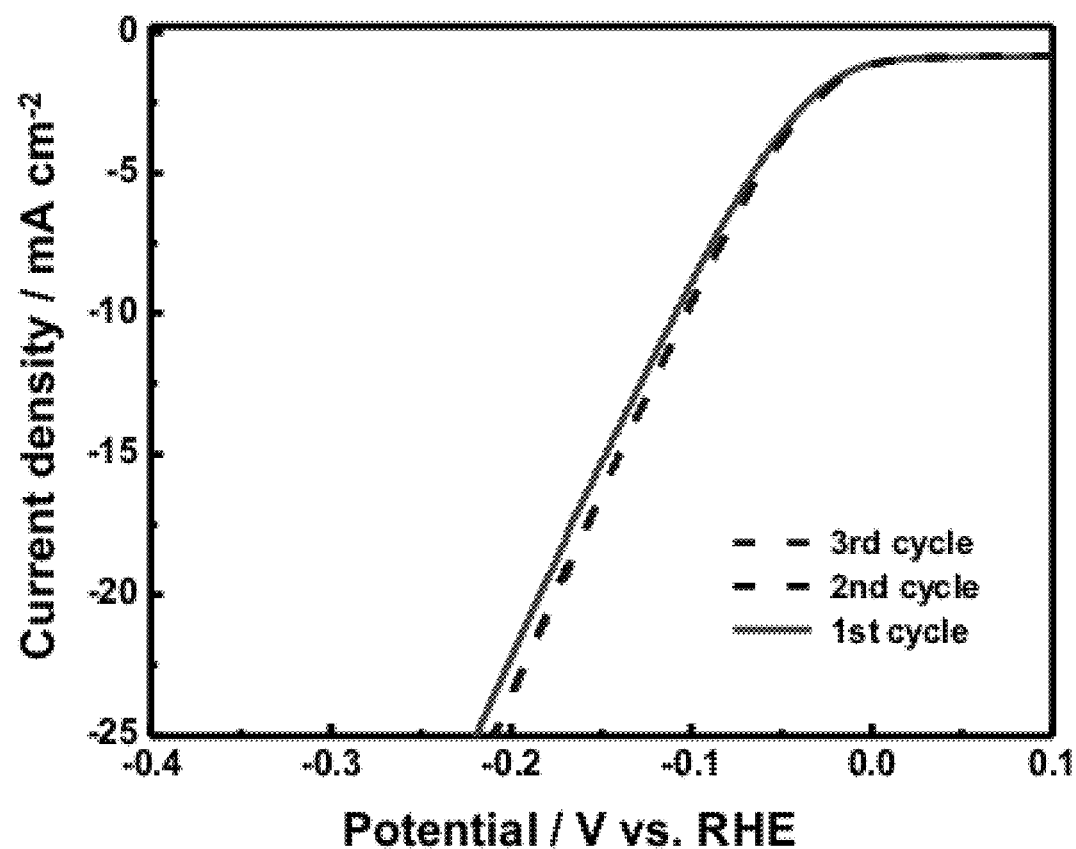
FIG. 22(B) is a graph relating to the comparison in three measurements of the HER catalyst activity of the alloy obtained in Example 11.

Measurement method: Using a three-electrode mode cell (counter electrode: platinum wire, reference electrode: silver-silver chloride electrode (Ag/AgCl), electrolytic solution: aqueous 0.1 M $HClO_4$ solution, 25° C., oxygen saturation) in which the cathode was a rotary ring disc electrode having the resultant RuRhAu nanoparticles supported on carbon particles, the current value I was measured when the potential E was swept from 0.1 V to −0.4 V (vs. RHE) at 5 mV/s, to thereby evaluate the HER catalyst activity. The results are shown in FIG. 22(A) and FIG. 22(B).

[Example 21]: fcc-PtIrRu

<Individual Ultrasonic Treatment of Metal Ion Solutions>

A metal ion solution was prepared by dissolving $K_2RuCl_5$ (NO) in ion-exchanged water, and while light was blocked, the solution was ultrasonically treated for 5 minutes.

A metal ion solution was prepared by dissolving $H_2PtCl_6$ in ion-exchanged water, and ultrasonically treated for 5 minutes.

A metal ion solution was prepared by dissolving $H_2IrCl_6$ in ion-exchanged water, and ultrasonically treated for 5 minutes.

The three metal ion solutions that had been individually ultrasonicated were mixed in $H_2PtCl_6/K_2RuCl_5(NO)/H_2IrCl_6=1.5/7/1.5$ and each metal ion mixed solution of 0.2 mmol aqueous solution were dissolved and combined to be 20 ml.

<Preparation of Alloy>

100 ml of ethylene glycol (EG) containing polyvinylpyrrolidone (PVP) K30 (4 mmol: by FUJIFILM Wako Pure Chemical Corporation) was stirred under heat at 190° C.

The metal ion mixed solution was sprayed over the solution, and kept at 190° C. for 10 minutes. Subsequently, this was left cooled to room temperature. The resultant precipitate, nanoparticles were separated by centrifugation to prepare an alloy of nanoparticles of Example 21.

[Example 22]: hcp-PtIrRu

<Individual Ultrasonic Treatment of Metal Ion Solutions>

A metal ion solution was prepared by dissolving $K_2RuCl_5$ (NO) in diethylene glycol DEG, and while light was blocked, the solution was ultrasonically treated for 5 minutes.

A metal ion solution was prepared by dissolving $Pt(acac)_2$ in diethylene glycol DEG, and ultrasonically treated for 5 minutes.

A metal ion solution was prepared by dissolving $H_2IrCl_6$ in diethylene glycol DEG, and ultrasonically treated for 5 minutes.

The three metal ion solutions that had been individually ultrasonicated were mixed in $Pt(acac)_2/K_2RuCl_5(NO)/H_2IrCl_6=1.5/7/1.5$ and metal ion mixed solution of 0.2 mmol diethylene glycol DEG solution (10 ml) was prepared.

<Preparation of Alloy>

100 ml of ethylene glycol (EG) containing polyvinylpyrrolidone (PVP) K30 (0.6 mmol: by FUJIFILM Wako Pure Chemical Corporation) was stirred under heat at 180° C.

To the solution, the metal ion mixed solution was added dropwise at a rate of 3.0 ml/min using a syringe pump, and was rapidly cooled to room temperature. The formed precipitate of nanoparticles was separated by centrifugation to prepare an alloy of nanoparticles of Example 22.

<Elementary Analysis by STEM-EDS>

Thus separated, the alloy of Example 21 and the alloy of Example 22 were analyzed by STEM-EDS analysis in the same manner as in Example 1.

First, the alloy (fcc-PtIrRu) nanoparticles obtained in Example 21 were analyzed by line scanning elementary analysis using plural fields of view of a scanning transmission electron microscope, and the metal composition of the three types of elements was calculated.

Figure 23:
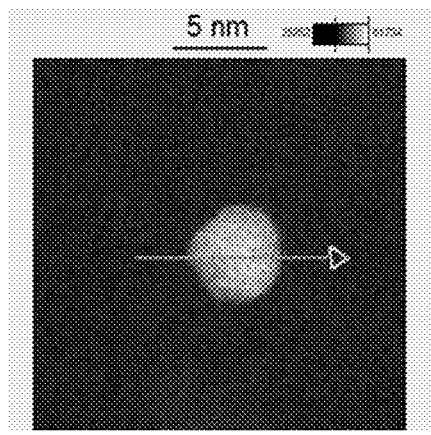
FIG. 23 is a scanning transmission electron micrograph used in EDS line scan analysis in STEM-EDS of the alloy obtained in Example 21.
Figure 24A:
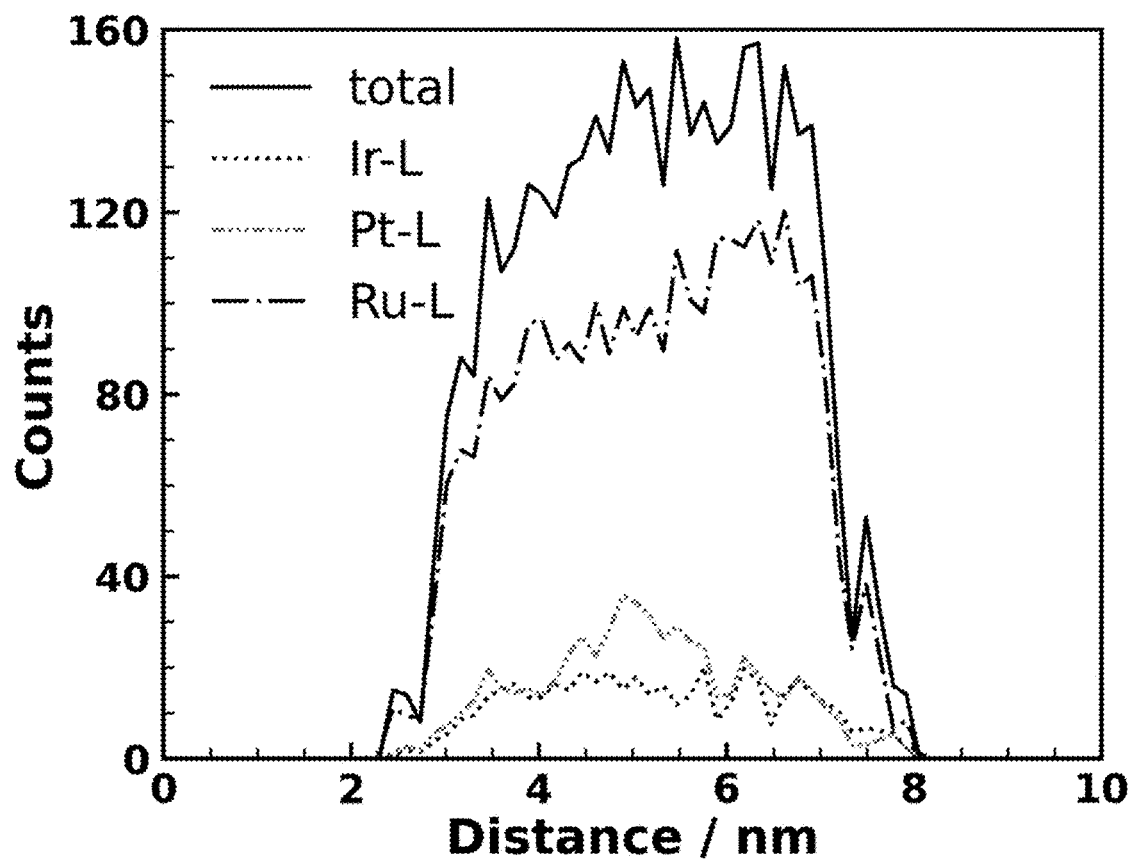
FIG. 24(A) is a graph showing the specific X-ray counts at each position through the arrowed part in FIG. 23.
Figure 24B:
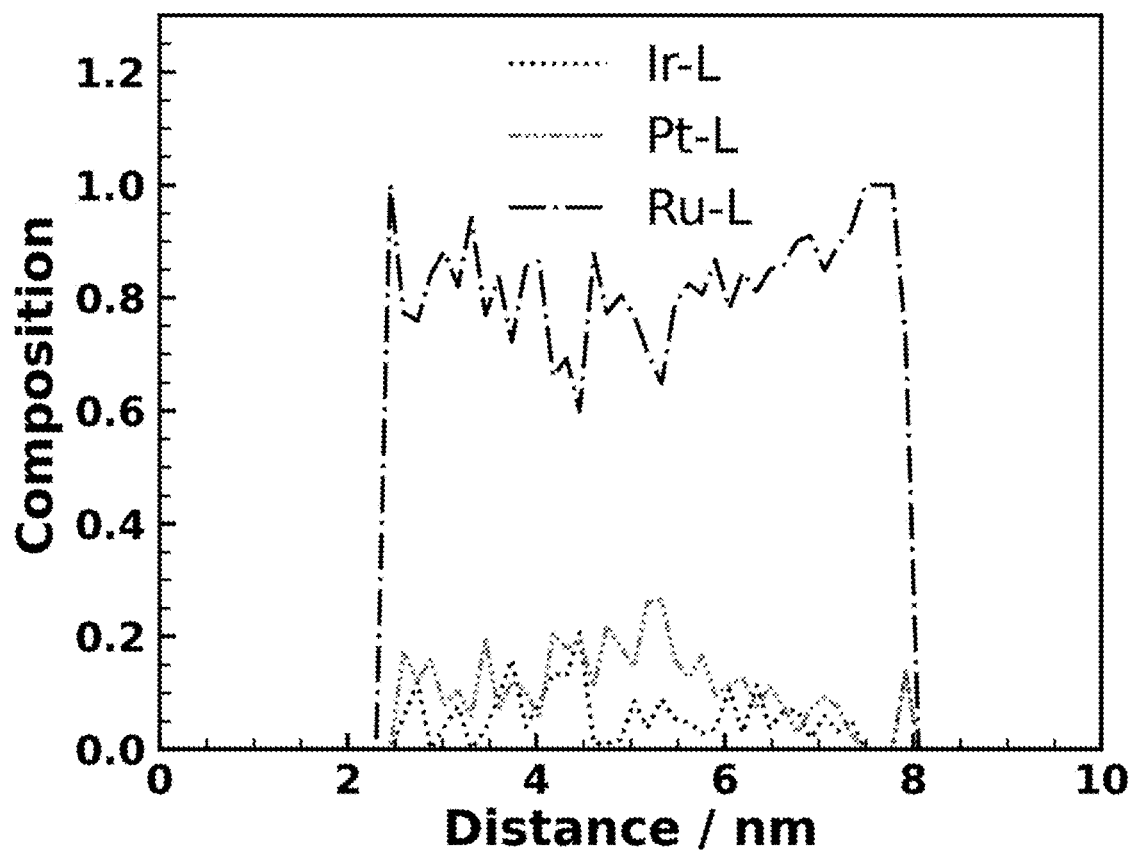
FIG. 24(B) is a graph showing the composition at each position through the arrowed part in FIG. 23.

At the measurement point in FIG. 23, elemental analysis of the nanoparticles obtained in Example 21 was performed at intervals of 0.15 to 0.30 nm in the arrowed part. The background threshold was 30 counts. A graph of the specific X-ray counts and a graph of the composition at each position in the arrowed part in FIG. 23 are shown in FIG. 24(A) and FIG. 24(B), respectively. The average composition and the standard deviation of distribution in the alloy of each element constituting the alloy were determined, and the data are shown in the following Table 9. The average composition, the standard deviation and the correlation coefficient were determined in the same manner as in Example 1.

TABLE 9

|  | Pt | Ir | Ru |
|---|---|---|---|
| Average Composition (atomic %) | 12% | 6% | 82% |
| Standard Deviation | 0.09 | 0.05 | 0.10 |
| Correlation Coefficient | Pt—Ir 0.04 | Pt—Ru 0.25 | Ir—Ru −0.28 |

Figure 25:
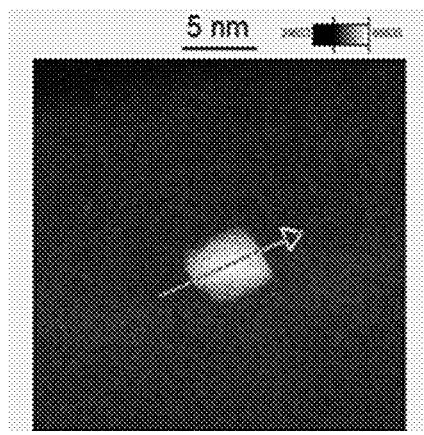
FIG. 25 is a scanning transmission electron micrograph used in other EDS line scan analysis in STEM-EDS of the alloy obtained in Example 21.
Figure 26A:
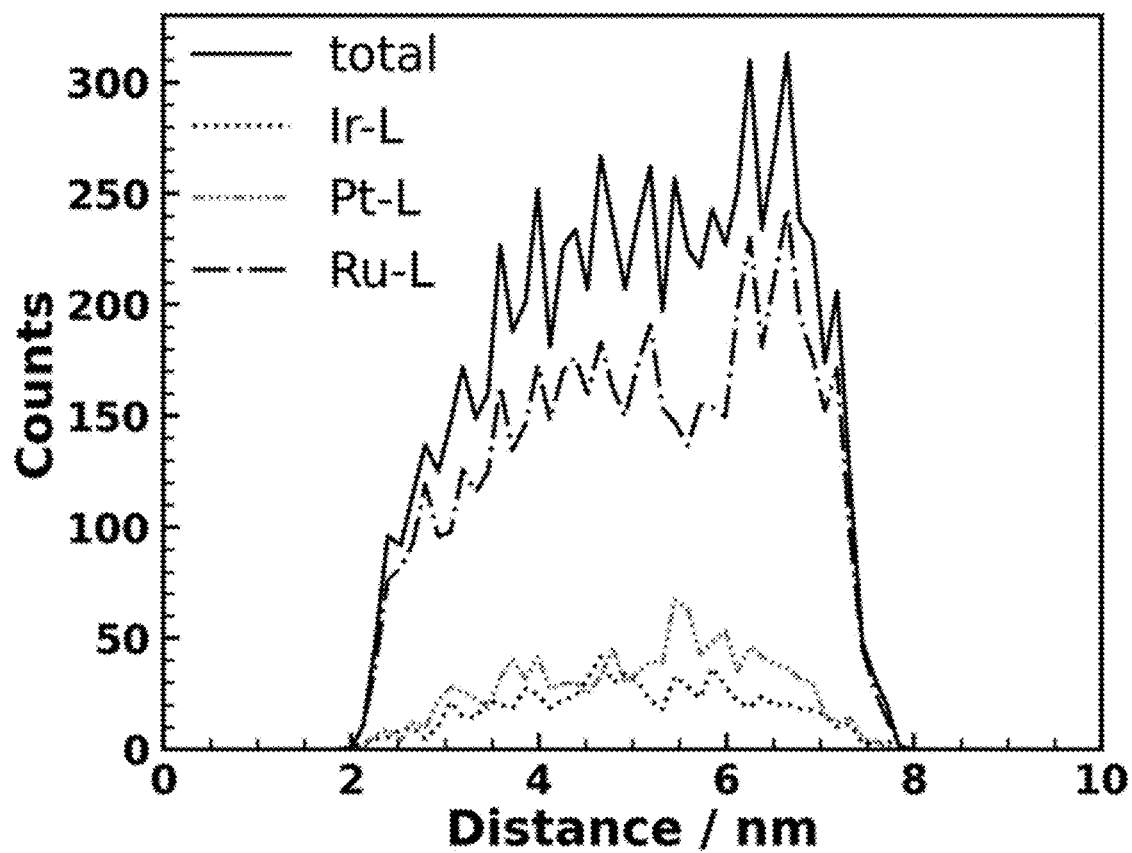
FIG. 26(A) is a graph showing the specific X-ray counts at each position through the arrowed part in FIG. 25.
Figure 26B:
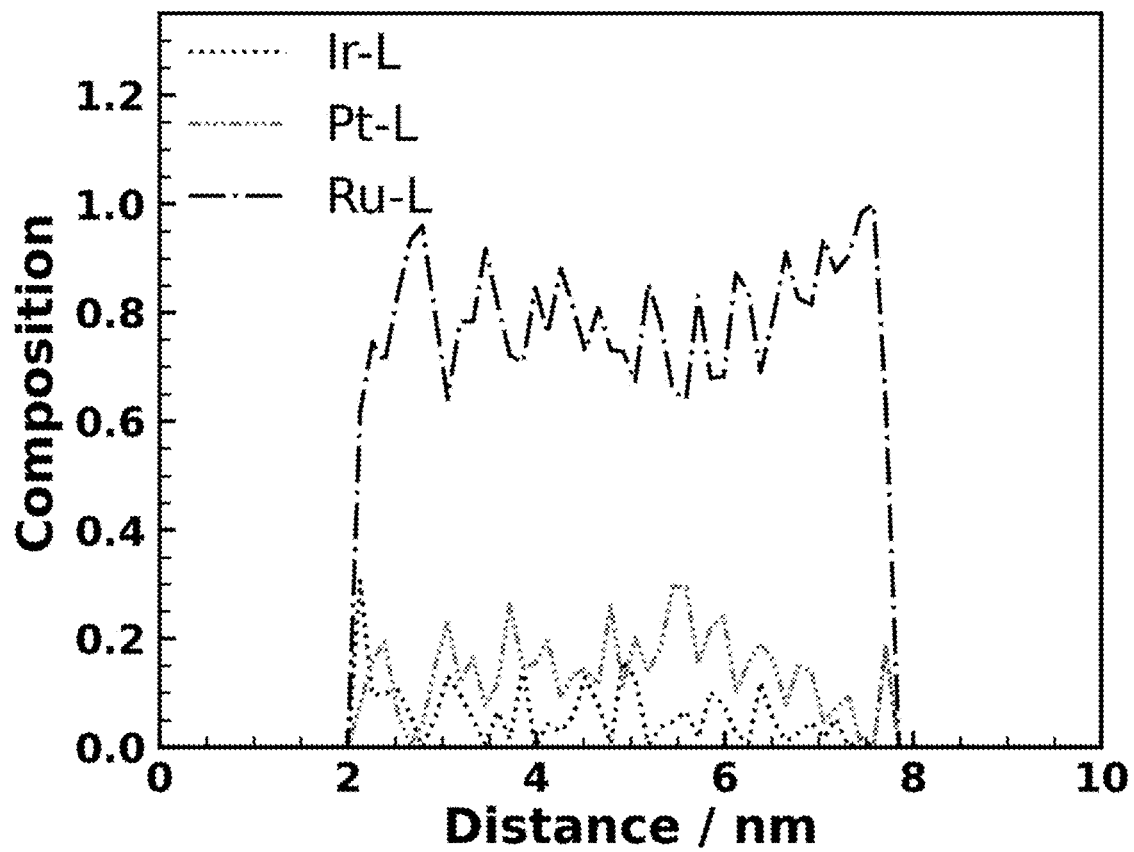
FIG. 26(B) is a graph showing the composition at each position through the arrowed part in FIG. 25.

At the measurement point in FIG. 25, elemental analysis of the nanoparticles obtained in Example 21 was performed at intervals of 0.15 to 0.30 nm in the arrowed part. The background threshold was 30 counts. A graph of the specific X-ray counts and a graph of the composition at each position in the arrowed part in FIG. 25 are shown in FIG. 26(A) and FIG. 26(B), respectively. The average composition and the standard deviation of distribution in the alloy of each element constituting the alloy were determined, and the data are shown in the following Table 10. The average composition, the standard deviation and the correlation coefficient were determined in the same manner as in Example 1.

TABLE 10

|  | Pt | Ir | Ru |
|---|---|---|---|
| Average Composition (atomic %) | 14% | 6% | 80% |
| Standard Deviation | 0.07 | 0.06 | 0.10 |
| Correlation Coefficient | Pt—Ir −0.14 | Pt—Ru 0.28 | Ir—Ru −0.15 |

Figure 27:
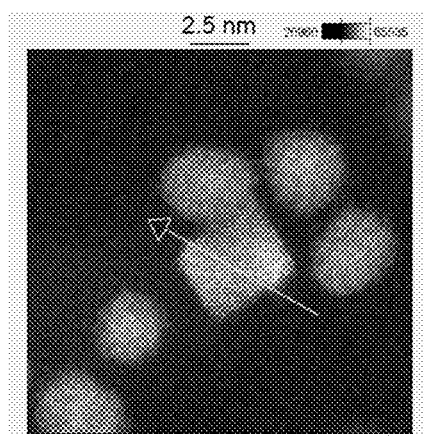
FIG. 27 is a scanning transmission electron micrograph used in other EDS line scan analysis in STEM-EDS of the alloy obtained in Example 21.
Figure 28B:
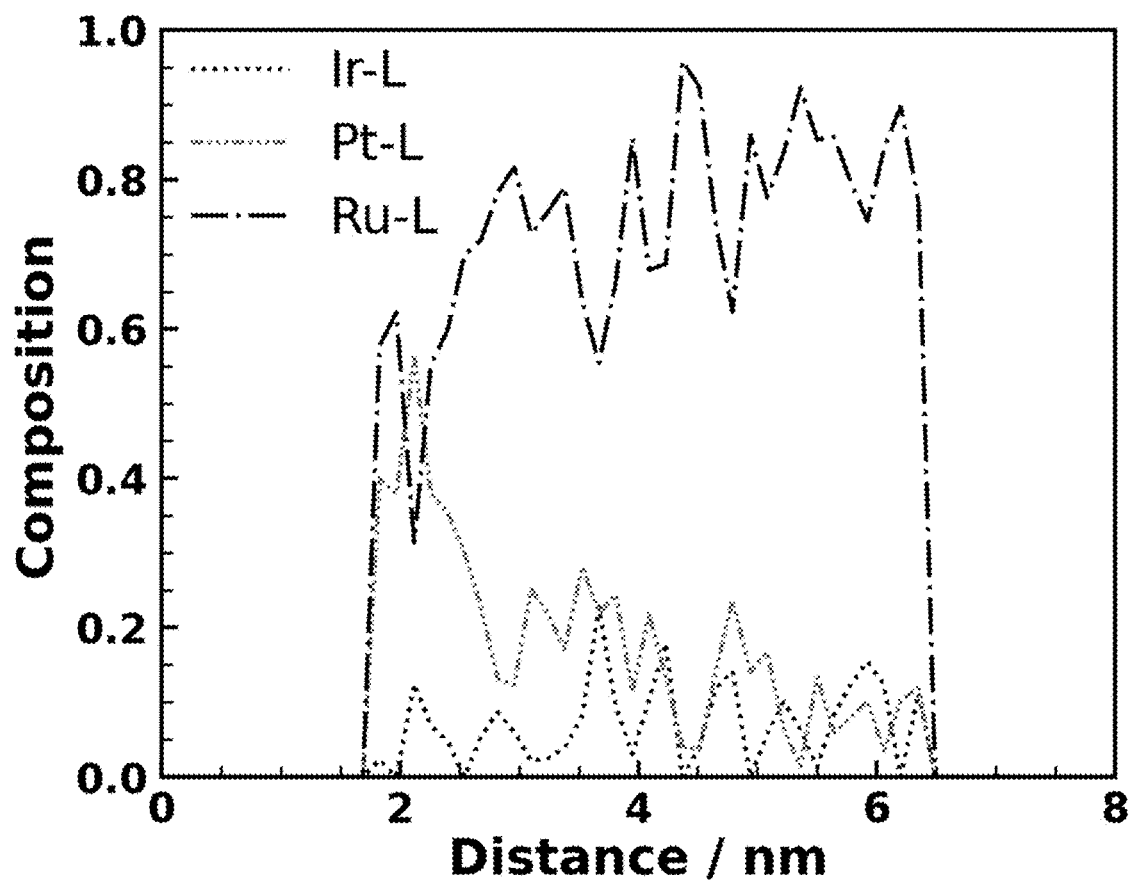
FIG. 28(B) is a graph showing the composition at each position through the arrowed part in FIG. 27.

At the measurement point in FIG. 27, elemental analysis of the nanoparticles obtained in Example 21 was performed at intervals of 0.15 to 0.30 nm in the arrowed part. The background threshold was 30 counts. A graph of the specific X-ray counts and a graph of the composition at each position in the arrowed part in FIG. 27 are shown in FIG. 28(A) and FIG. 28(B), respectively. The average composition and the standard deviation of distribution in the alloy of each element constituting the alloy were determined, and the data are shown in the following Table 11. The average composition, the standard deviation and the correlation coefficient were determined in the same manner as in Example 1.

TABLE 11

|  | Pt | Ir | Ru |
|---|---|---|---|
| Average Composition (atomic %) | 19% | 7% | 74% |
| Standard Deviation | 0.12 | 0.05 | 0.13 |
| Correlation Coefficient | Pt—Ir −0.35 | Pt—Ru 0.27 | Ir—Ru 0.10 |

From Tables 9 to 11, it is known that the alloy of the present invention which is the alloy (fcc-PtIrRu) nanoparticles obtained in Example 21 has a high solid solution uniformity in the shape of nanoparticles thereof.

Next, the alloy (hcp-PtIrRu) nanoparticles obtained in Example 22 were analyzed by line scanning elementary analysis using plural fields of view of a scanning transmission electron microscope, and the metal composition of the three types of elements was calculated.

Figure 29:
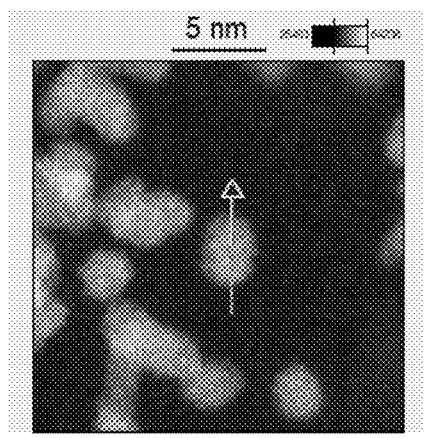
FIG. 29 is a scanning transmission electron micrograph used in EDS line scan analysis in STEM-EDS of the alloy obtained in Example 22.
Figure 30A:
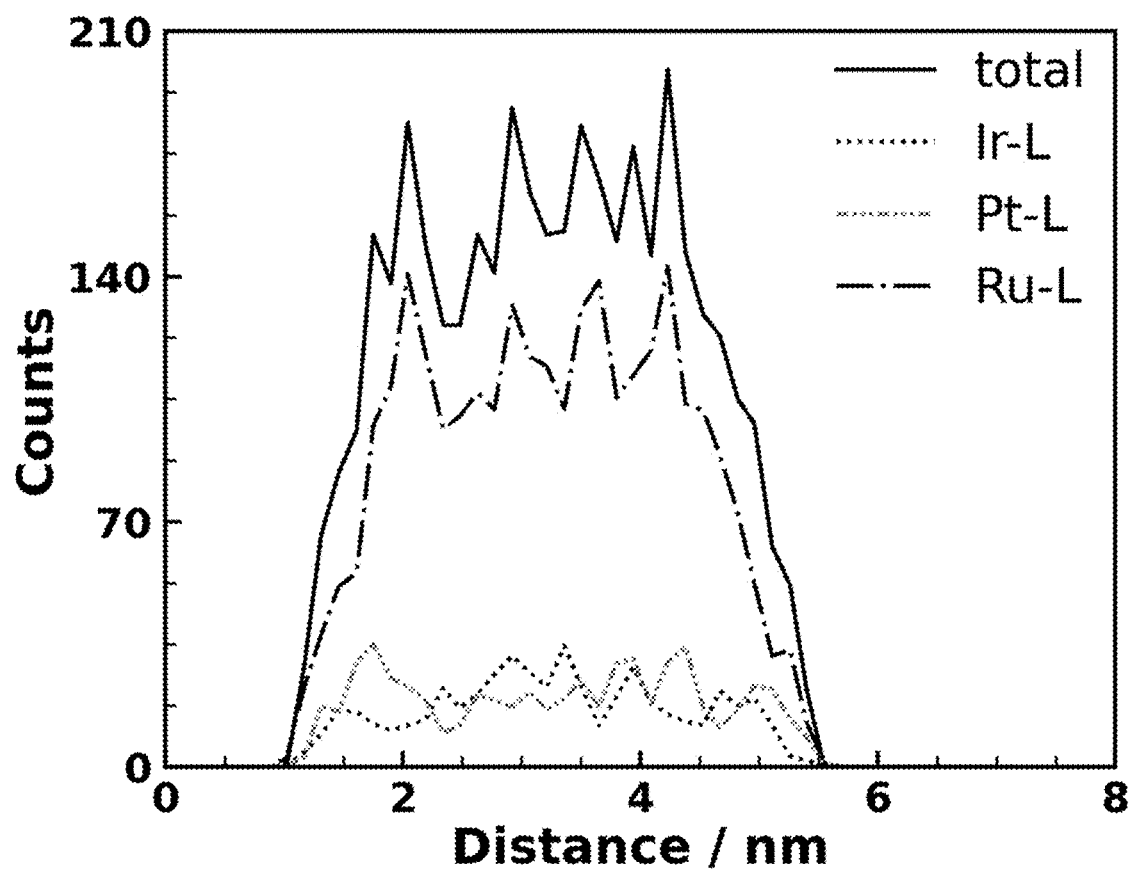
FIG. 30(A) is a graph showing the specific X-ray counts at each position through the arrowed part in FIG. 29.
Figure 30B:
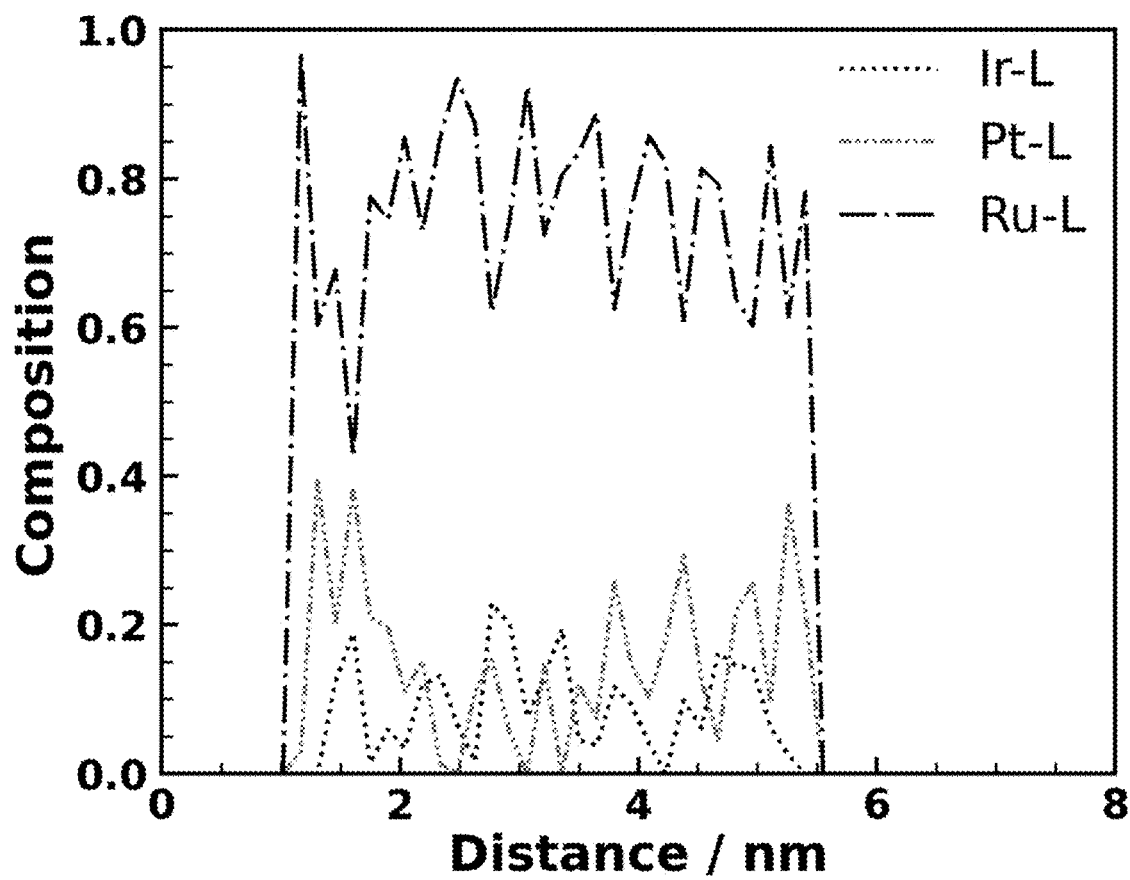
FIG. 30(B) is a graph showing the composition at each position through the arrowed part in FIG. 29.

At the measurement point in FIG. 29, elemental analysis of the nanoparticles obtained in Example 22 was performed at intervals of 0.15 to 0.30 nm in the arrowed part. The background threshold was 30 counts. A graph of the specific X-ray counts and a graph of the composition at each position in the arrowed part in FIG. 29 are shown in FIG. 30(A) and FIG. 30(B), respectively. The average composition and the standard deviation of distribution in the alloy of each element constituting the alloy were determined, and the data are shown in the following Table 12. The average composition, the standard deviation and the correlation coefficient were determined in the same manner as in Example 1.

TABLE 12

|  | Pt | Ir | Ru |
|---|---|---|---|
| Average Composition (atomic %) | 16% | 9% | 75% |
| Standard Deviation | 0.11 | 0.06 | 0.12 |
| Correlation Coefficient | Pt—Ir −0.49 | Pt—Ru 0.15 | Ir—Ru 0.38 |

Figure 31:
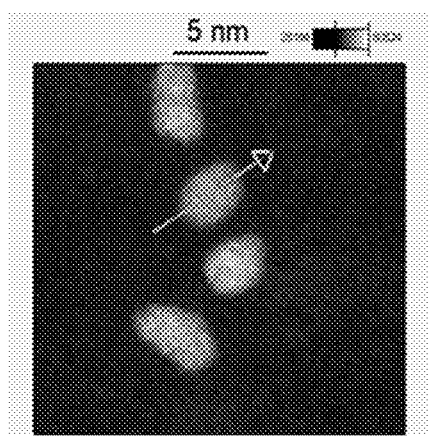
FIG. 31 is a scanning transmission electron micrograph used in other EDS line scan analysis in STEM-EDS of the alloy obtained in Example 22.
Figure 32A:
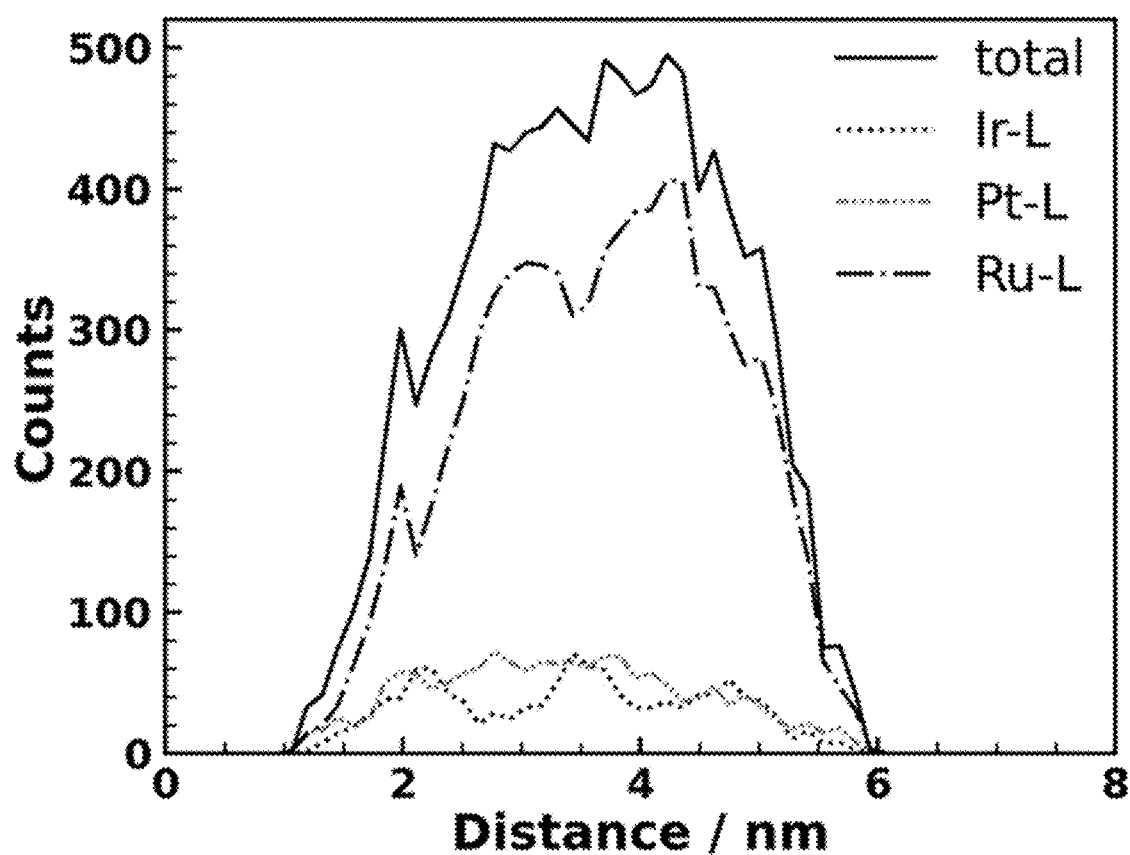
FIG. 32(A) is a graph showing the specific X-ray counts at each position through the arrowed part in FIG. 31.
Figure 32B:
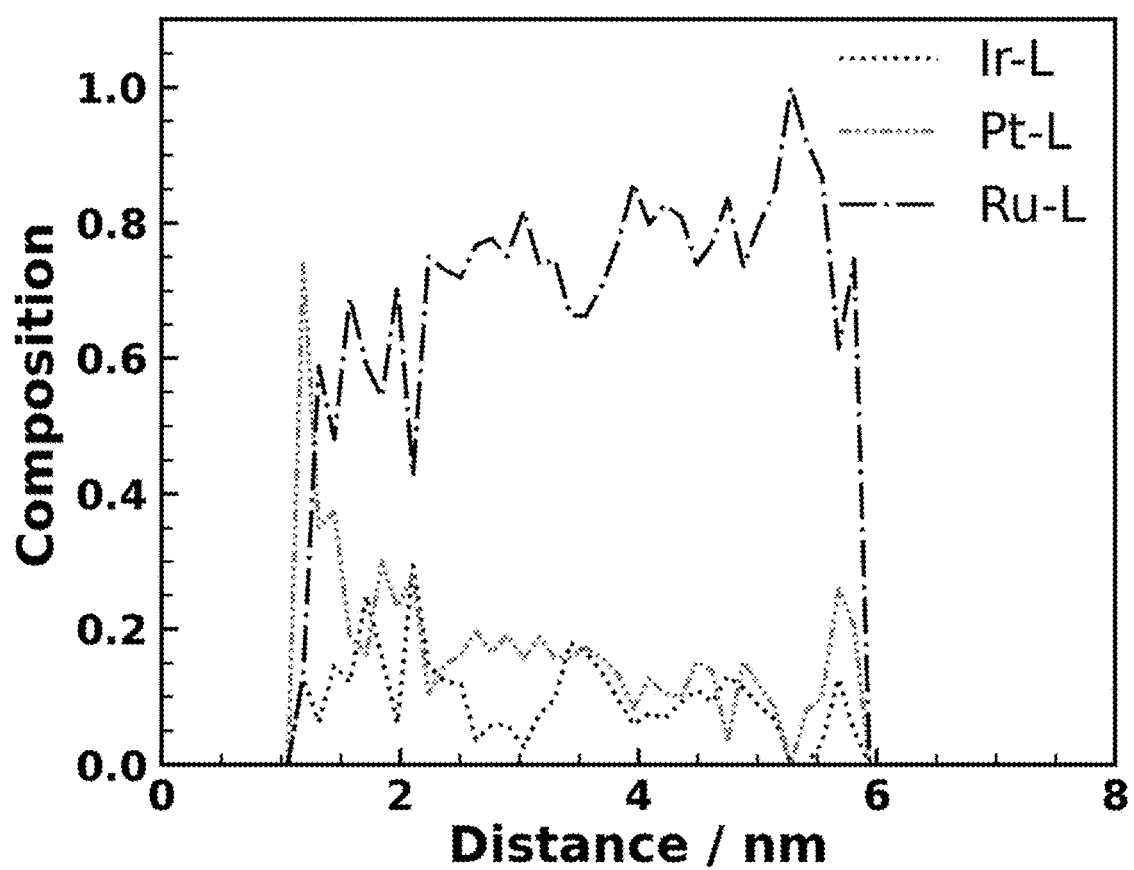
FIG. 32(B) is a graph showing the composition at each position through the arrowed part in FIG. 31.

At the measurement point in FIG. 31, elemental analysis of the nanoparticles obtained in Example 22 was performed at intervals of 0.15 to 0.30 nm in the arrowed part. The background threshold was 30 counts. A graph of the specific X-ray counts and a graph of the composition at each position in the arrowed part in FIG. 31 are shown in FIG. 32(A) and FIG. 32(B), respectively. The average composition and the standard deviation of distribution in the alloy of each element constituting the alloy were determined, and the data are shown in the following Table 13. The average composition, the standard deviation and the correlation coefficient were determined in the same manner as in Example 1.

TABLE 13

|  | Pt | Ir | Ru |
|---|---|---|---|
| Average Composition (atomic %) | 18% | 10% | 72% |
| Standard Deviation | 0.12 | 0.06 | 0.15 |
| Correlation Coefficient | Pt—Ir 0.28 | Pt—Ru −0.19 | Ir—Ru −0.10 |

From Tables 12 and 13, it is known that the alloy of the present invention which is the alloy (hcp-PtIrRu) nanoparticles obtained in Example 22 has a high solid solution uniformity in the shape of nanoparticles thereof.

Figure 33:
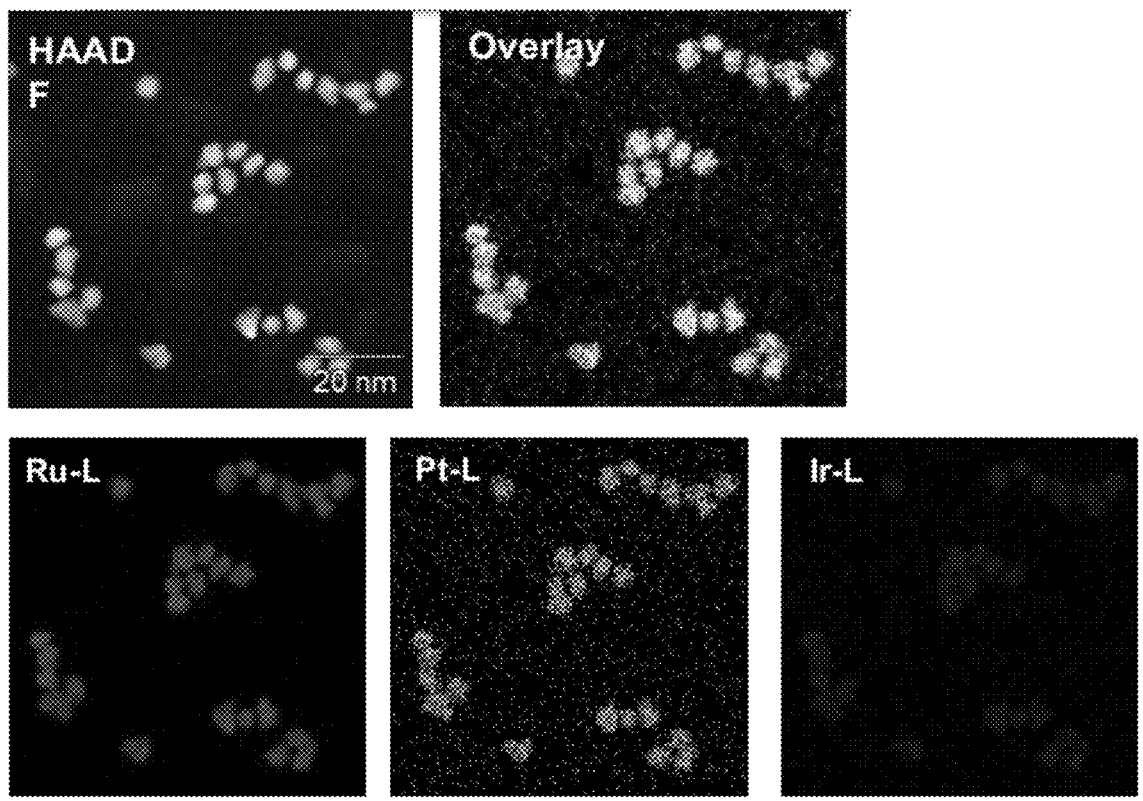
FIG. 33 shows a HAADF-STEM image and an energy dispersive X-ray spectroscopy (EDS) map of the alloy obtained in Example 21.
Figure 34:
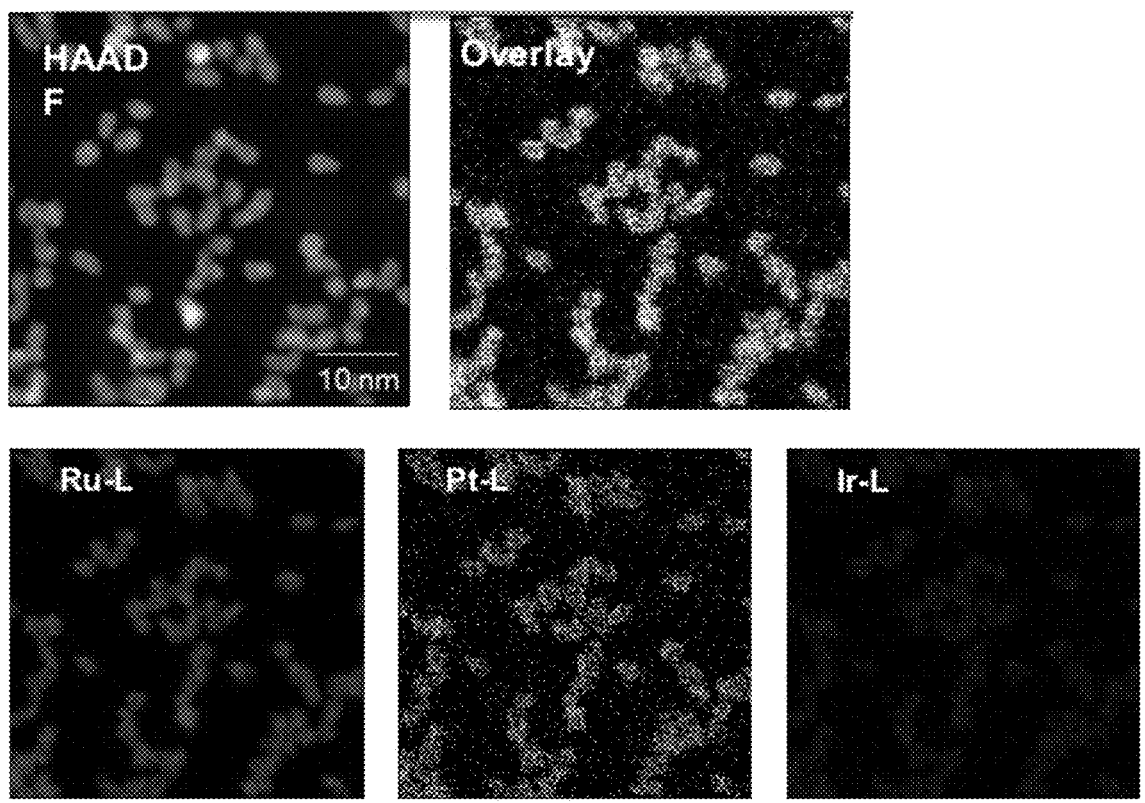
FIG. 34 shows a HAADF-STEM image and an energy dispersive X-ray spectroscopy (EDS) map of the alloy obtained in Example 22.

An HAADF-STEM image and an EDS map of a part of all the alloys (fcc-PtIrRu) obtained in Example 21 are shown in FIG. 33. An HAADF-STEM image and an EDS map of a part of all the alloys (hcp-PtIrRu) obtained in Example 22 are shown in FIG. 34. From FIG. 33 and FIG. 34, it is confirmed that, so far as the STEM image was observed, all elements dissolved in solid solution in each nanoparticle. Namely, in the range of the field of view confirmed in this Example, it is known that the aggregate of alloy nanoparticles contains 100% by number of the alloy nanoparticles each composed of, as the constituent elements in the form of a solid solution, all the three types of elements contained in the compounds used for production of the alloy. In addition, it is known that, in the alloy of the present invention, arbitrary alloy nanoparticles constituting the aggregate contain, as the constituent elements, all the three types of elements contained in the compounds used for production of the alloy.

<XRD Analysis>

Figure 35:
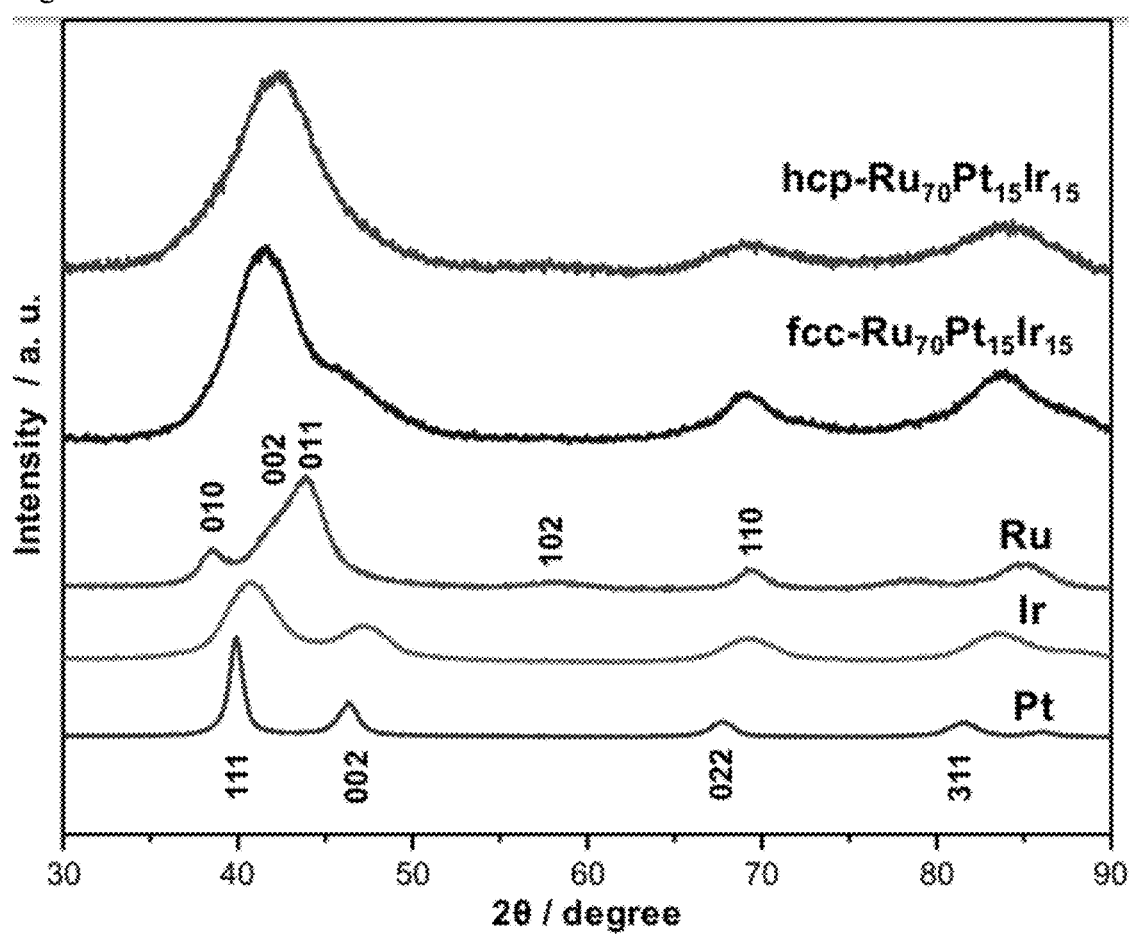
FIG. 35 shows an energy powder X-ray diffraction (XRD or PXRD) pattern of the alloy obtained in Examples 21 and 22.

The alloy of Example 21 and the alloy of Example 22 obtained were analyzed by XRD analysis. The resultant data are shown in FIG. 35.

<Elementary Analysis by TEM and XRF>

Figure 36:
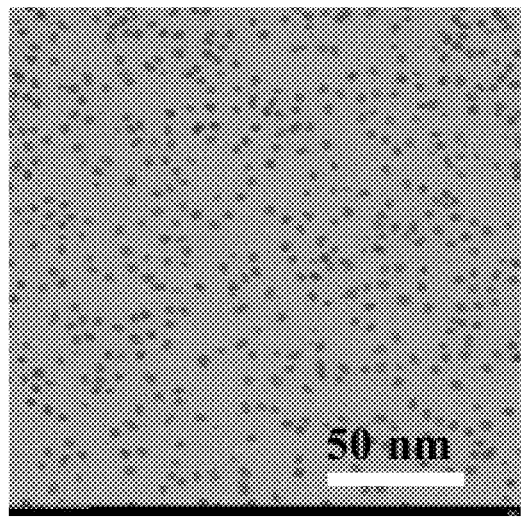
FIG. 36(A) is a transmission electron micrograph (TEM) of the alloy obtained in Example 21.
FIG. 36(B) is a transmission electron micrograph (TEM) of the alloy obtained in Example 22.
Figure 36:
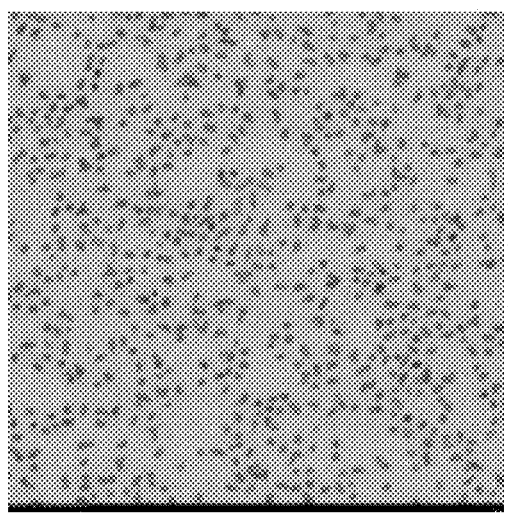

A TEM image of the nanoparticles of the alloy (fcc-PtIrRu) of Example 21 is shown in FIG. 36(A). In FIG. 36(A), the average particle size of the nanoparticles was 3.5±0.56 nm. A TEM image of the nanoparticles of the alloy (hcp-PtIrRu) of Example 22 is shown in FIG. 36(B). In FIG. 36(B), the average particle size of the nanoparticles was 3.0±0.34 nm.

The elementary analysis by XRF was performed. As a result, the alloy (fcc-PtIrRu) of Example 21 was Pt/Ru/Ir=14.3 atomic %/71.4 atomic %/14.35 atomic %. The alloy (hcp-PtIrRu) of Example 22 was Pt/Ru/Ir=14.7 atomic %/70.1 atomic %/15.2 atomic %.

<Catalyst Activity>

The resultant nanoparticles of the alloy (fcc-PtIrRu) of Example 21 or the nanoparticles of the alloy (hcp-PtIrRu) of Example 22 were held on carbon particles to produce an electrode catalyst (alloy/C: metal amount 20 wt %). The amount of the nanoparticles was 10 μg.

Current measurement device: Potentiostat (ALS760E, by BAS Inc.)

Measurement method: Using a three-electrode mode cell (counter electrode: platinum wire, reference electrode: silver-silver chloride electrode (Ag/AgCl), electrolytic solution: aqueous 0.1 M KOH solution, 25° C., oxygen saturation) in which the cathode was a rotary ring disc electrode having the resultant AuRuIr nanoparticles supported on carbon particles, the current value I was measured when the potential E was swept from 0.00 V to −0.15 V (vs. RHE) at LSV 5 mV/s, to thereby evaluate the HER catalyst activity. The results are shown in FIG. 37.

HER:     $2H_2O + 2e^- \rightarrow H_2 + 2OH^-$

Figure 37:
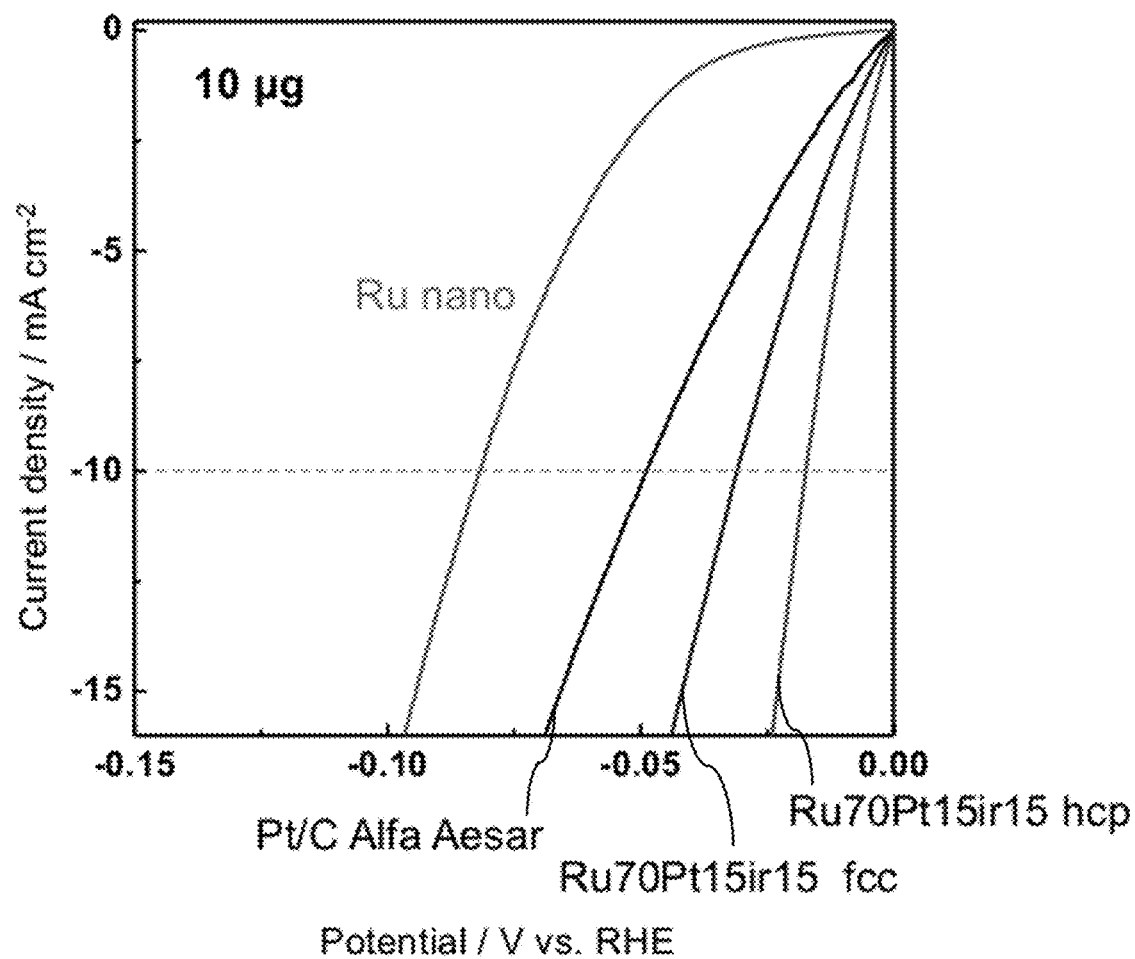
FIG. 37 is a graph relating to the HER catalyst activity of the alloy obtained in Examples 21 and 22.

As in FIG. 37, the alloy of Example 22 (hcp-PtIrRu) showed better catalyst activity than the alloy of Example 22 (fcc-PtIrRu) and the commercially-available Pt/C catalyst (by Alfa Aesar).

[Example 31]: PdRuB (1) Preparation of PdRu Nanoparticles

<Individual Ultrasonic Treatment for Metal Ion Solutions>

A metal ion solution was prepared by dissolving $K_2PdCl_4$ in ion-exchanged water, and while kept shielded from light, this was ultrasonicated for 5 minutes.

A metal ion solution was prepared by dissolving $K_2RuCl_5$ (NO) in ion-exchanged water, and while kept shielded from light, this was ultrasonicated for 5 minutes.

The individually ultrasonicated two types of metal ion solutions were mixed in a ratio of $K_2PdCl_4/K_2RuCl_5(NO)$= 1/1 to prepare a metal ion mixed solution of an aqueous solution (35 ml) of Pd 0.7 mmol and Ru 0.85 mmol.

<Preparation of Alloy>

150 ml of triethylene glycol containing polyvinylpyrrolidone (PVP) K30 (0.6 mmol: by FUJIFILM Wako Pure Chemical Corporation) was stirred under heat at 200° C.

The metal ion mixed solution was sprayed over the solution and was rapidly cooled to room temperature. The resultant precipitate, nanoparticles were separated by centrifugation to prepare an PdRu nanoparticles.

(2) Preparation of PdRuB Nanoparticles

Using as a raw material, the resultant PdRu nanoparticles were degassed overnight at 80° C. via a vacuum pump. Subsequently, this was purged with a nitrogen gas.

A THF solution of 1 M $BH_3$ (by Sigma-Aldrich) was added to and mixed with the PdRu nanoparticles in such a manner that the solution could be excessive over the nanoparticles, and kept stirred under heat at 80° C. for 2 days in a nitrogen atmosphere.

The resultant precipitate, nanoparticles were separated by centrifugation to give PdRuB nanoparticles.

<Elementary Analysis by STEM-EDS>

The separated PdRuB nanoparticles were analyzed by STEM-EDS elementary analysis in the same manner as in Example 1. The average composition, the standard deviation of distribution in the alloy of each element constituting the alloy, and the correlation coefficient of distribution of the two elements constituting the alloy were determined.

It is known that the alloy of the present invention has a high solid solution uniformity in the shape of nanoparticles thereof.

Figure 38:
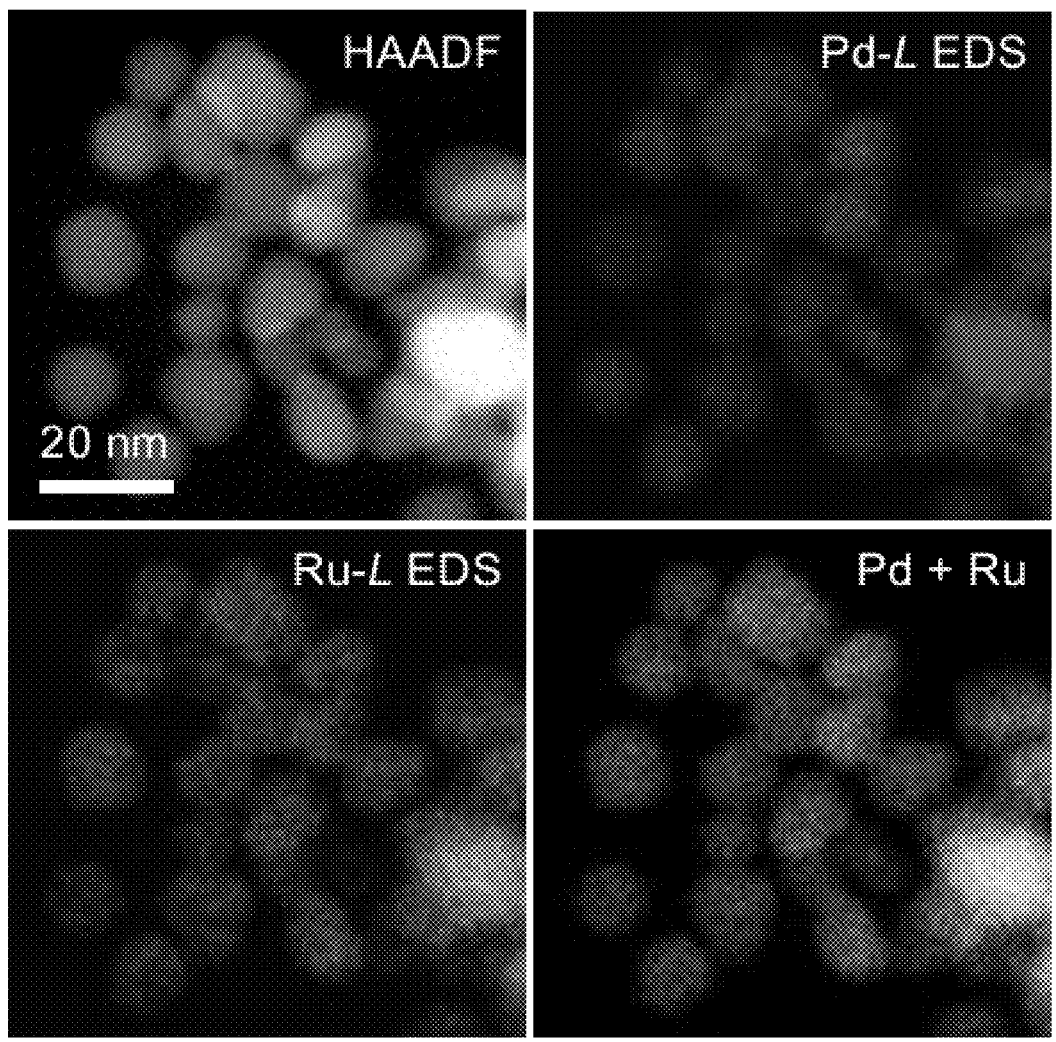
FIG. 38 shows a HAADF-STEM image and an energy dispersive X-ray spectroscopy (EDS) map of the alloy obtained in Example 31.
Figure 39:
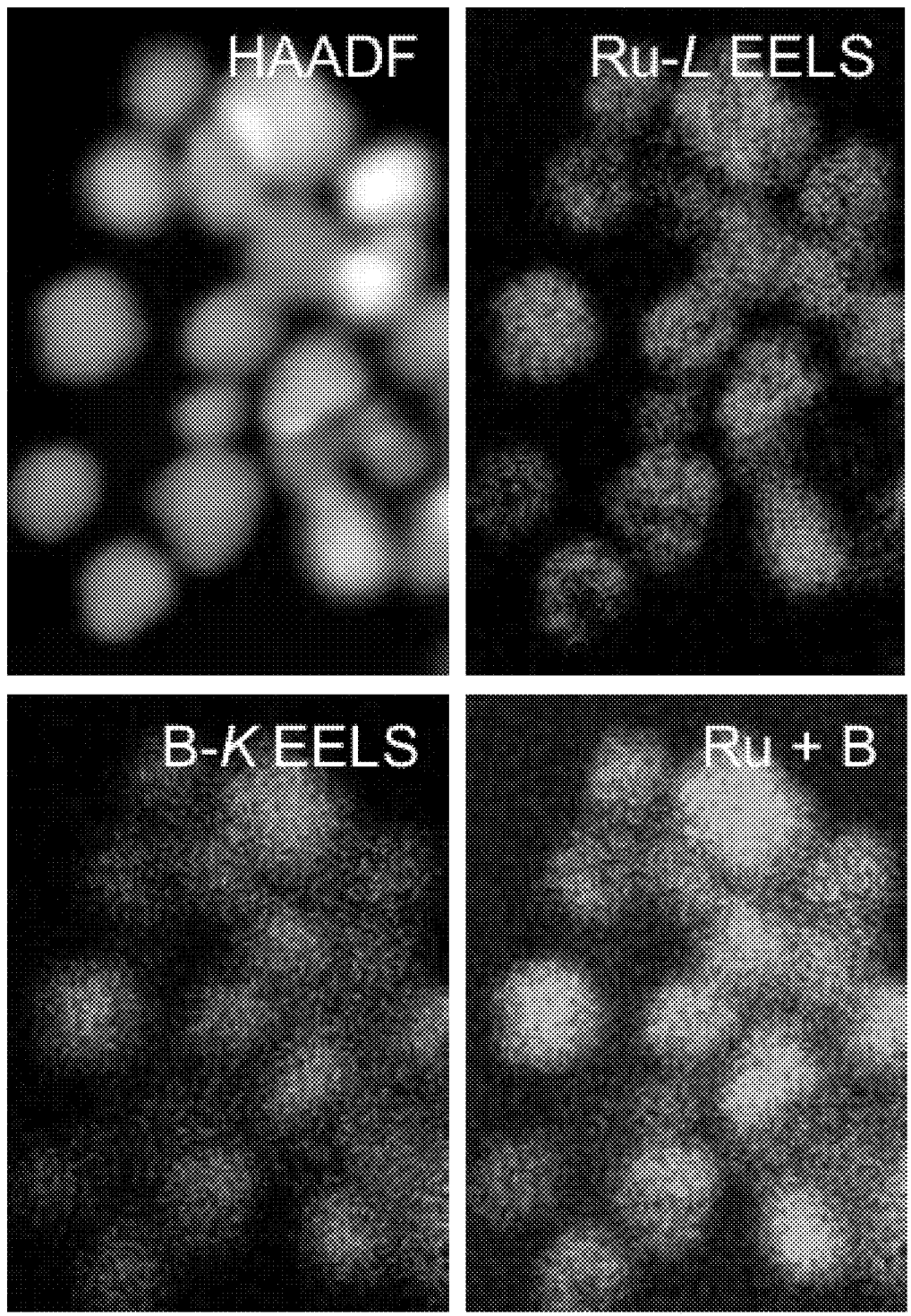
FIG. 39 shows a HAADF-STEM image and an Electron Energy Loss Spectroscopy (EELS) map of the alloy obtained in Example 31.

An HAADF-STEM image and an EDS map of a part of all the obtained PdRuB alloy nanoparticles are shown in FIG. 38, and an HAADF-STEM image and an EELS map of them are shown in FIG. 39, respectively. From FIG. 38 and FIG. 39, it is confirmed that, so far as the STEM image was observed, all elements dissolved in solid solution in each nanoparticle. Namely, in the range of the field of view confirmed in this Example, it is known that the aggregate of alloy nanoparticles contains 100% by number of the alloy nanoparticles each composed of, as the constituent elements in the form of a solid solution, all the three types of elements contained in the compounds used for production of the alloy. In addition, it is known that, in the alloy of the present invention, arbitrary alloy nanoparticles constituting the aggregate contain, as the constituent elements, all the three types of elements contained in the compounds used for production of the alloy.

<XRD Analysis>

Figure 40:
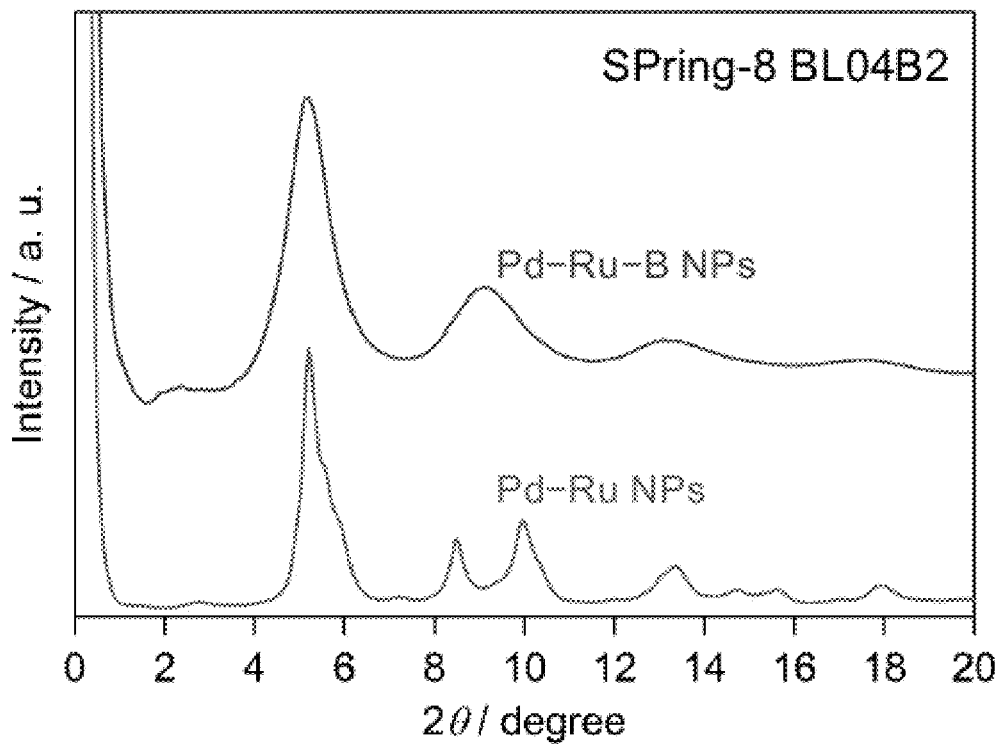
FIG. 40 shows an energy powder X-ray diffraction (XRD or PXRD) pattern of the alloy obtained in Example 31.

The resultant PdRuB nanoparticles were analyzed by XRD analysis using Spring-8 BL04B2. The resultant data are shown in FIG. 40.

<Elementary Analysis by TEM and XRF>

Figure 41:
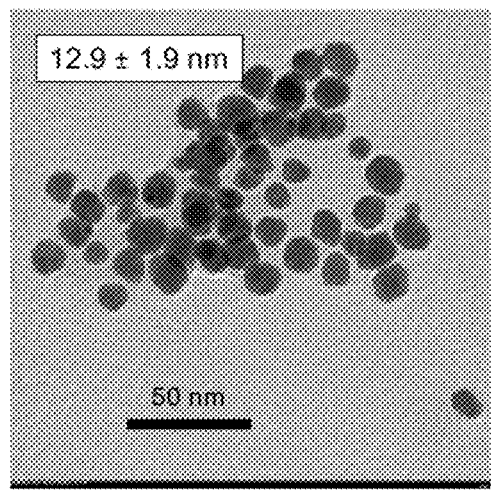
FIG. 41(A) is a transmission electron micrograph (TEM) of the alloy obtained in Example 31.
FIG. 41(B) is a transmission electron micrograph (TEM) of PdRu used as a raw material in Example 31.
Figure 41:
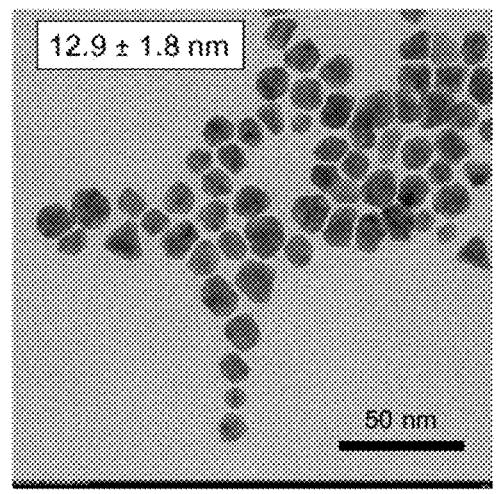

A TEM image of the resultant PdRuB nanoparticles is shown in FIG. 41(A). In FIG. 41(A), the average particle size of the nanoparticles was 12.9±1.9 nm.

In addition, a TEM image of the intermediate product PdRu nanoparticles is shown in FIG. 41(B). In FIG. 41(B), the average particle size of the nanoparticles was 12.9±1.8 nm.

The elementary analysis by XRF was performed. As a result, the intermediate product PdRu nanoparticles was Pd/Ru=48 atomic %/52 atomic %.

[Example 41]: AuPdRu

<Individual Ultrasonic Treatment for Metal Ion Solutions>

A metal ion solution was prepared by dissolving $HAuCl_4·3H_2O$ in ion-exchanged water, and while kept shielded from light, this was ultrasonicated for 5 minutes.

A metal ion solution was prepared by dissolving $K_2PdCl_4$ in ion-exchanged water, and while kept shielded from light, this was ultrasonicated for 5 minutes.

A metal ion solution was prepared by dissolving RuCl₃·nH₂O in ion-exchanged water, and while kept shielded from light, this was ultrasonicated for 5 minutes.

The three metal ion solutions that had been individually ultrasonicated were mixed in 1/1/1, and about 13.3 ml of each metal ion mixed solution of 0.35 mmol aqueous solution was dissolved and combined to be 40 ml.

<Preparation of Alloy>

300 ml of triethylene glycol (TEG) containing polyvinylpyrrolidone (PVP) K30 (10 mmol: by FUJIFILM Wako Pure Chemical Corporation) was stirred under heat at 225° C.

The metal ion mixed solution was sprayed over the solution at a rate at which the TEG solution did not fall below 220° C. and kept at 225° C. for 10 minutes. Subsequently, this was left cooled to room temperature. The resultant precipitate, nanoparticles were separated by centrifugation.

<Elementary Analysis)

Figure 42:
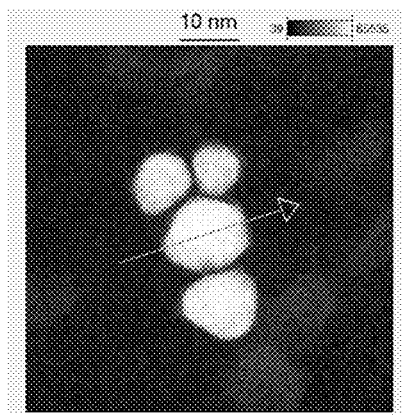
FIG. 42 is a scanning transmission electron micrograph used in EDS line scan analysis in STEM-EDS of the alloy obtained in Example 41.
Figure 43A:
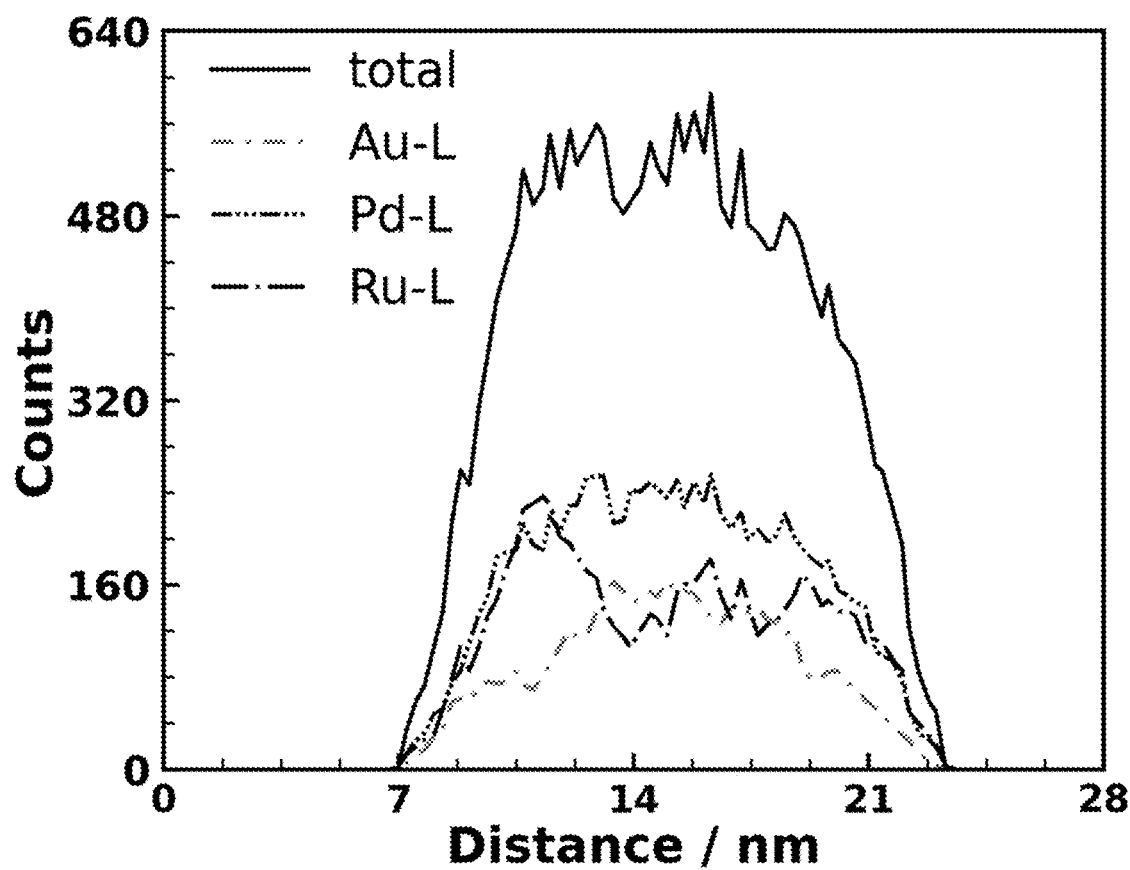
FIG. 43(A) is a graph showing the specific X-ray counts at each position through the arrowed part in FIG. 42.
Figure 43B:
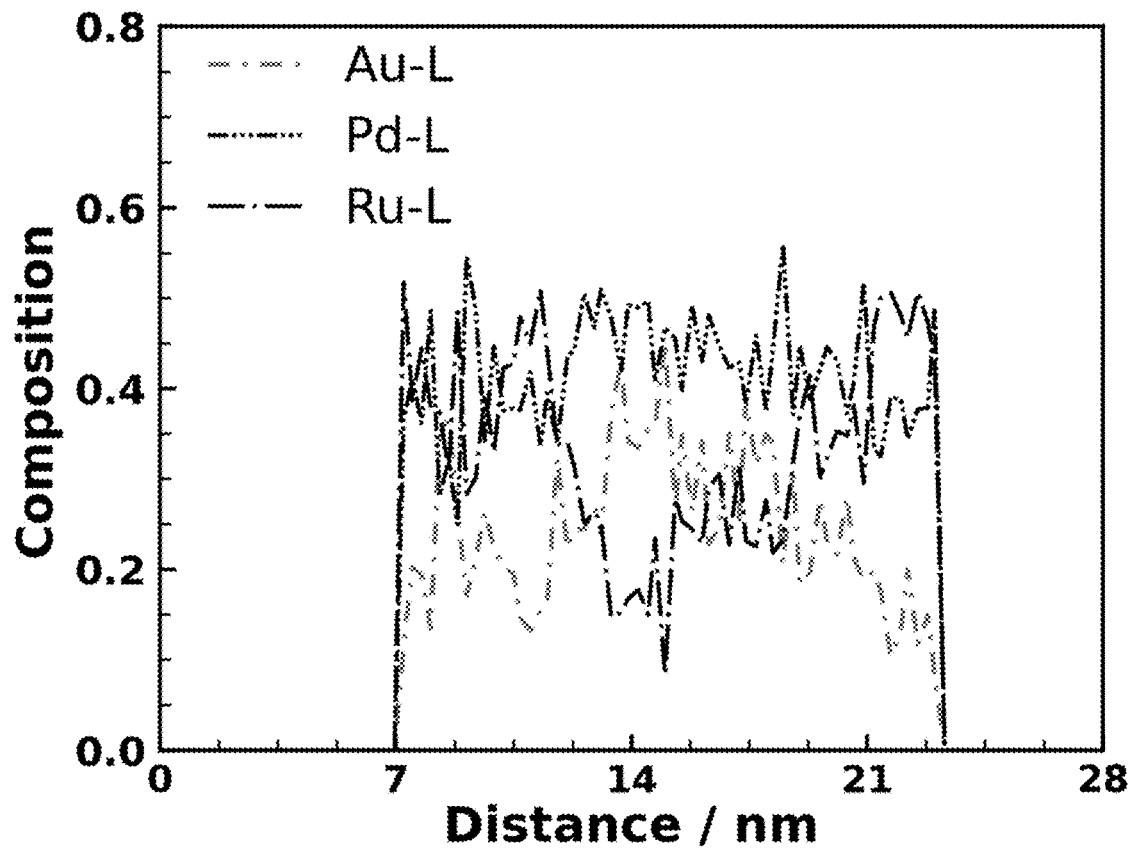
FIG. 43(B) is a graph showing the composition at each position through the arrowed part in FIG. 42.

The separated nanoparticles were analyzed by STEM-EDS. By line scanning elemental analysis with a scanning transmission electron microscope for plural fields of view, the metal composition of the three elements was calculated. Increased solid solution uniformity . . . . At the measurement point in FIG. 41, elemental analysis of the nanoparticles obtained in Example 41 was performed at intervals of 0.15 to 0.30 nm in the arrowed part. The background threshold was 30 counts. A graph of the specific X-ray counts and a graph of the composition at each position in the arrowed part in FIG. 42 are shown in FIG. 43(A) and FIG. 43(B), respectively. The average composition and the standard deviation of distribution in the alloy of each element constituting the alloy were determined, and the data are shown in the following Table 14. The average composition, the standard deviation and the correlation coefficient were determined in the same manner as in Example 1.

TABLE 14

|  | Au | Pd | Ru |
|---|---|---|---|
| Average Composition (atomic %) | 25% | 42% | 33% |
| Standard Deviation | 0.09 | 0.06 | 0.11 |
| Correlation Coefficient | Au—Pd 0.53 | Pd—Ru −0.29 | Ru—Au −0.68 |

From Table 14, it is known that the alloy of the present invention has a high solid solution uniformity in the shape of nanoparticles thereof.

[Comparative Example 42]: AuPdRu

<Preparation of Alloy>

A metal ion solution was prepared by dissolving HAuCl₄·3H₂O in ion-exchanged water.

A metal ion solution was prepared by dissolving K₂PdCl₄ in ion-exchanged water.

A metal ion solution was prepared by dissolving RuCl₃·nH₂O in ion-exchanged water.

The three metal ion solutions that had not been individually ultrasonicated were mixed in 1/1/1, and about 13.3 ml of each metal ion mixed solution of 0.35 mmol aqueous solution were dissolved and combined to be 40 ml.

<Preparation of Alloy>

300 ml of triethylene glycol (TEG) containing polyvinylpyrrolidone (PVP) K30 (4 mmol: by FUJIFILM Wako Pure Chemical Corporation) was stirred under heat at 225° C.

The metal ion mixed solution was sprayed over the solution at a rate at which the TEG solution did not fall below 220° C. and kept at 225° C. for 10 minutes. Subsequently, this was left cooled to room temperature. The resultant precipitate, nanoparticles were separated by centrifugation.

<Elementary Analysis)

The separated nanoparticles were analyzed by STEM-EDS. By line scanning elemental analysis with a scanning transmission electron microscope for plural fields of view, the metal composition of the three elements was calculated.

Figure 44:
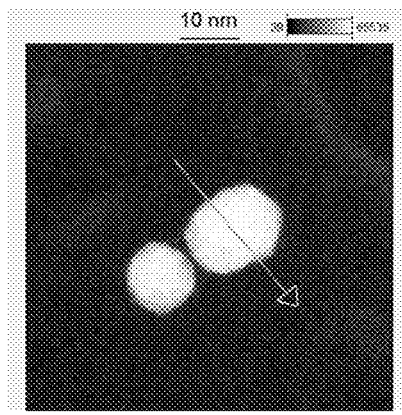
FIG. 44 is a scanning transmission electron micrograph used in EDS line scan analysis in STEM-EDS of the alloy obtained in Comparative Example 42.
Figure 45A:
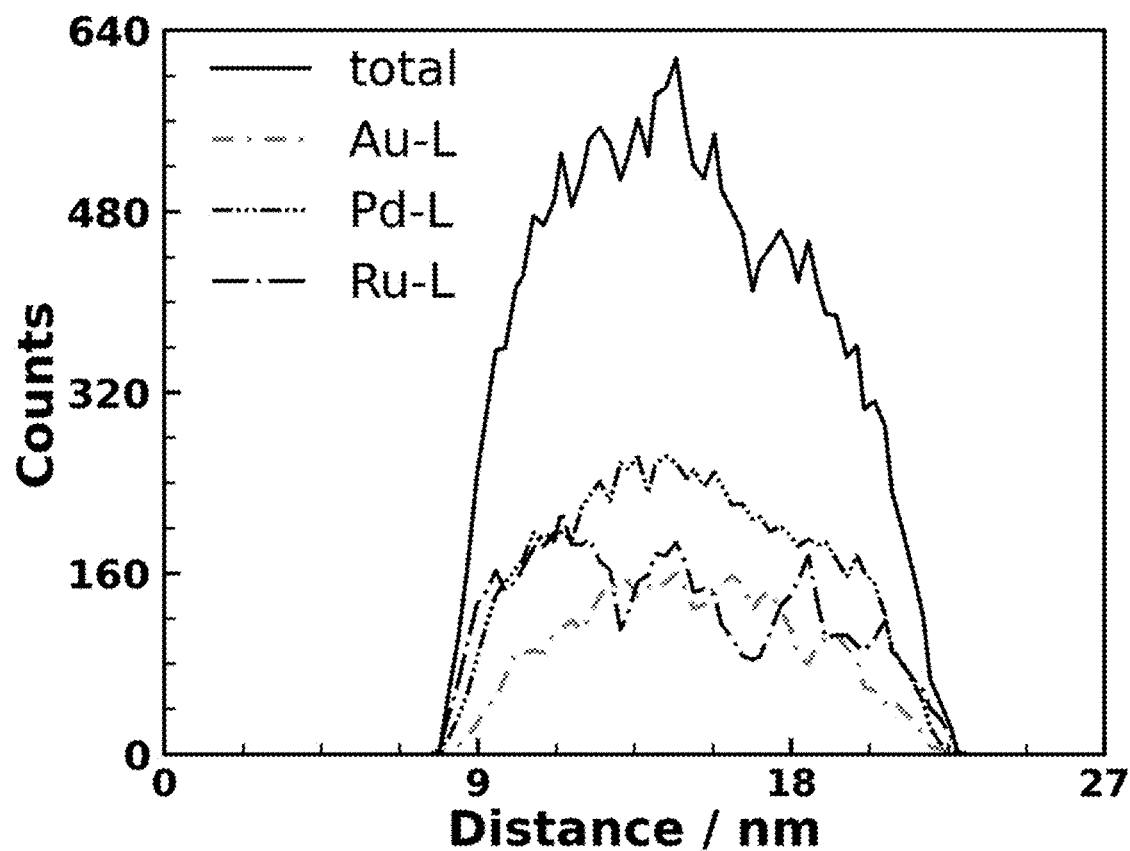
FIG. 45(A) is a graph showing the specific X-ray counts at each position through the arrowed part in FIG. 44.
Figure 45B:
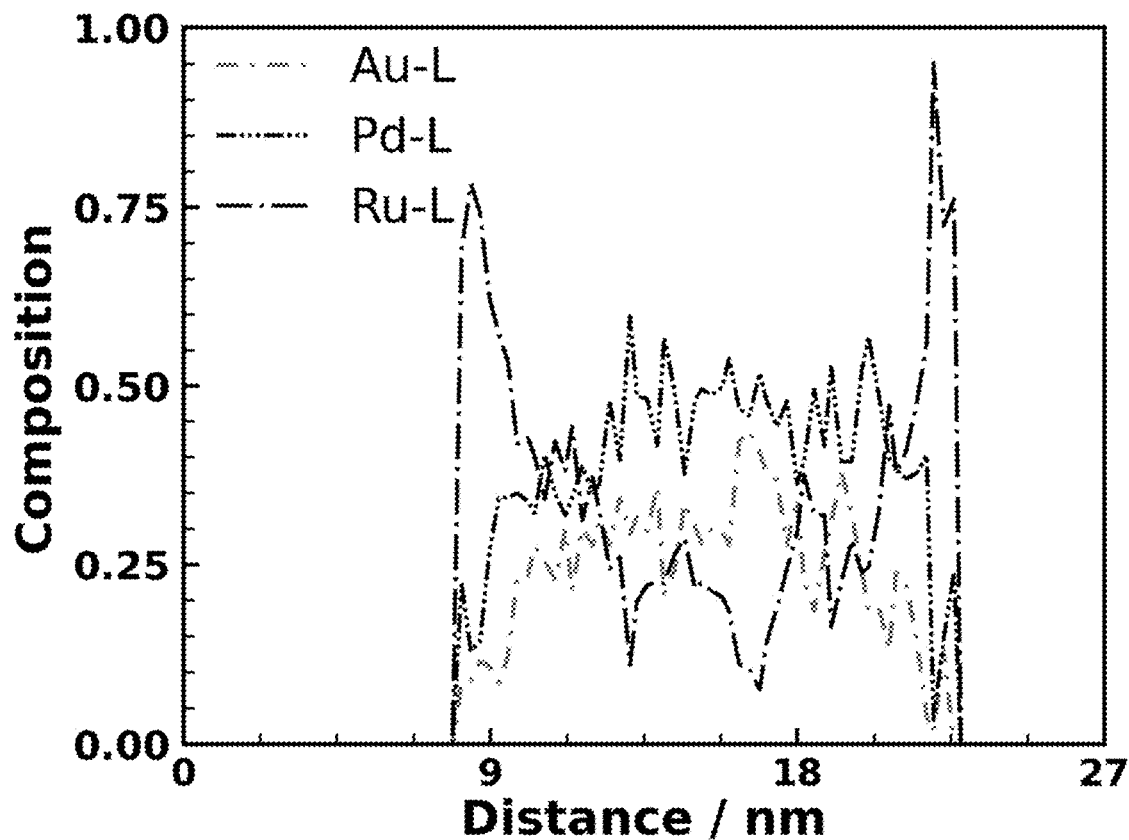
FIG. 45(B) is a graph showing the composition at each position through the arrowed part in FIG. 44.

At the measurement point in FIG. 44, elemental analysis of the nanoparticles obtained in Comparative Example 42 was performed at intervals of 0.15 to 0.30 nm in the arrowed part. The background threshold was 30 counts. A graph of the specific X-ray counts and a graph of the composition at each position in the arrowed part in FIG. 44 are shown in FIG. 45(A) and FIG. 45(B), respectively. The average composition and the standard deviation of distribution in the alloy of each element constituting the alloy were determined, and the data are shown in the following Table 15. The average composition, the standard deviation and the correlation coefficient were determined in the same manner as in Example 1.

TABLE 15

|  | Au | Pd | Ru |
|---|---|---|---|
| Average Composition (atomic %) | 25% | 40% | 35% |
| Standard Deviation | 0.10 | 0.11 | 0.19 |
| Correlation Coefficient | Au—Pd 0.71 | Pd—Ru −0.03 | Ru—Au −0.70 |

Figure 46:
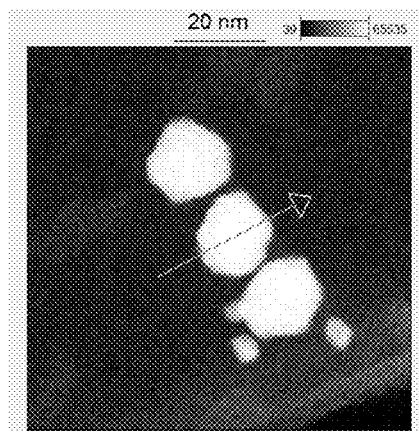
FIG. 46 is a scanning transmission electron micrograph used in other EDS line scan analysis in STEM-EDS of the alloy obtained in Comparative Example 42.
Figure 47A:
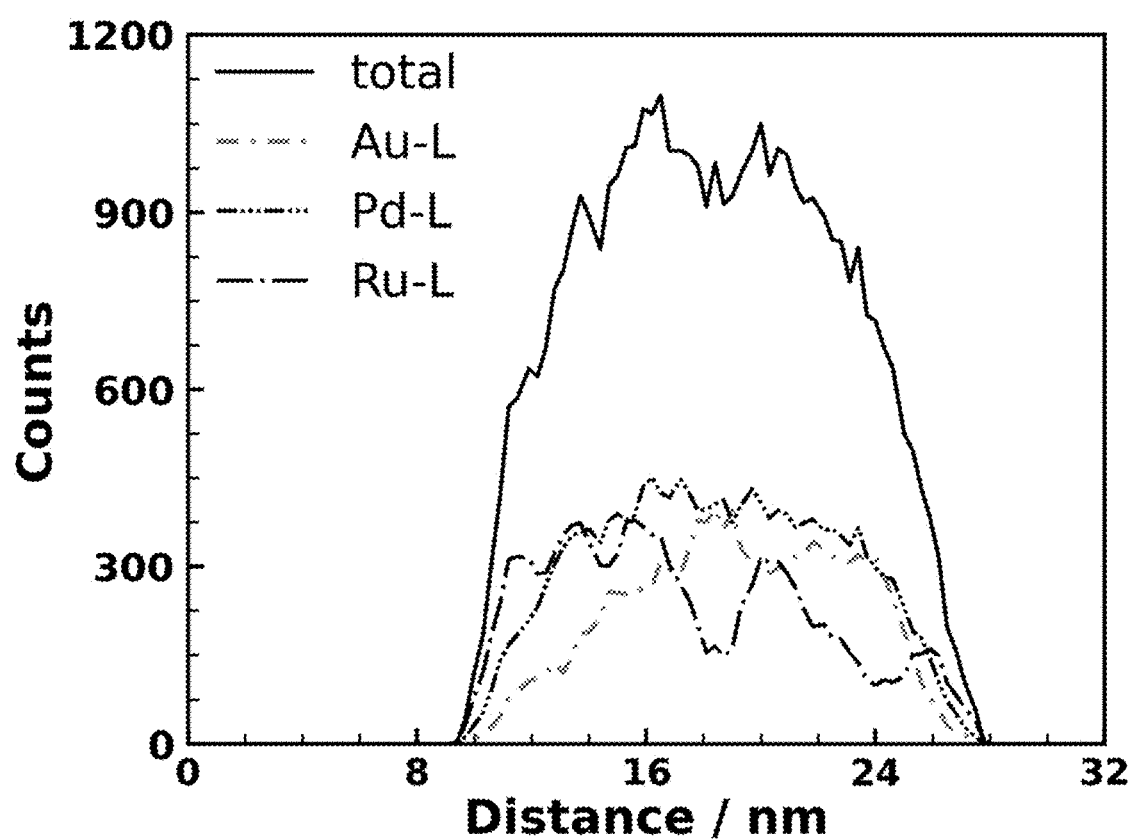
FIG. 47(A) is a graph showing the specific X-ray counts at each position through the arrowed part in FIG. 46.
Figure 47B:
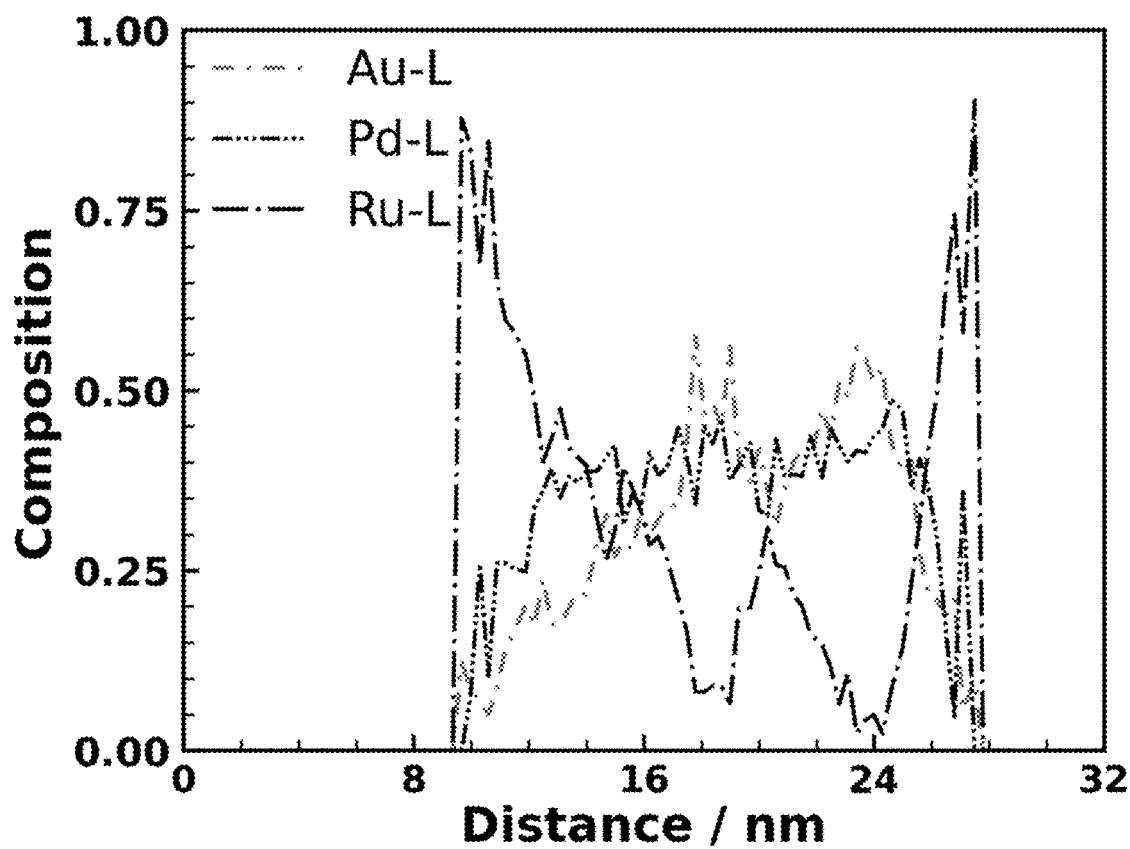
FIG. 47(B) is a graph showing the composition at each position through the arrowed part in FIG. 46.

At the measurement point in FIG. 46, elemental analysis of the nanoparticles obtained in Comparative Example 42 was performed at intervals of 0.15 to 0.30 nm in the arrowed part. The background threshold was 30 counts. A graph of the specific X-ray counts and a graph of the composition at each position in the arrowed part in FIG. 46 are shown in FIG. 47(A) and FIG. 47(B), respectively. The average composition and the standard deviation of distribution in the alloy of each element constituting the alloy were determined, and the data are shown in the following Table 16. The average composition, the standard deviation and the correlation coefficient were determined in the same manner as in Example 1.

TABLE 16

|  | Au | Pd | Ru |
|---|---|---|---|
| Average Composition (atomic %) | 32% | 35% | 33% |
| Standard Deviation | 0.14 | 0.11 | 0.23 |
| Correlation Coefficient | Au—Pd 0.79 | Pd—Ru −0.43 | Ru—Au −0.62 |

From Tables 15 and 16, it is known that, in the alloy of Comparative Example 42, the standard deviation of distribution therein of the element (Ru) constituting the alloy is 19% to 23%, that is over 15%, and the uniformity of solid solution in the shape of the nanoparticles is low.

[Example 51]: RuRhPdOsIrPt

<Individual Ultrasonic Treatment for Metal Ion Solutions>

A metal ion solution was prepared by dissolving $K_2PdCl_4$ in ion-exchanged water, and while kept shielded from light, this was ultrasonicated for 5 minutes.

A metal ion solution was prepared by dissolving $RuCl_3 \cdot nH_2O$ in ion-exchanged water, and while kept shielded from light, this was ultrasonicated for 5 minutes.

A metal ion solution was prepared by dissolving $RhCl_3 \cdot 3H_2O$ in ion-exchanged water, and while kept shielded from light, this was ultrasonicated for 5 minutes.

A metal ion solution was prepared by dissolving $OsCl_3 \cdot 3H_2O$ in ion-exchanged water, and while kept shielded from light, this was ultrasonicated for 5 minutes.

A metal ion solution was prepared by dissolving $IrCl_4 \cdot xH_2O$ in ion-exchanged water, and while kept shielded from light, this was ultrasonicated for 5 minutes.

A metal ion solution was prepared by dissolving $K_2[PtCl_4]$ in ion-exchanged water, and while kept shielded from light, this was ultrasonicated for 5 minutes.

The six metal ion solutions that had been individually ultrasonicated were mixed in 1/1/1/1/1/1, and about 1.5 ml of each metal ion mixed solution of 0.167 mmol TEG solution was dissolved and combined to be 10 ml.

<Preparation of Alloy>

100 ml of triethylene glycol (TEG) containing polyvinylpyrrolidone (PVP) K30 (4 mmol: by FUJIFILM Wako Pure Chemical Corporation) was stirred under heat at 230° C.

To the solution, the metal ion mixed solution was added dropwise at a rate of 1.5 ml/min using a syringe pump and kept at 230° C. for 10 minutes. Subsequently, this rapidly cooled to room temperature. The formed precipitate of nanoparticles was separated by centrifugation.

<Elementary Analysis)

The separated nanoparticles were analyzed by STEM-EDS. By line scanning elemental analysis with a scanning transmission electron microscope for plural fields of view, the metal composition of the six elements was calculated.

Figure 48:
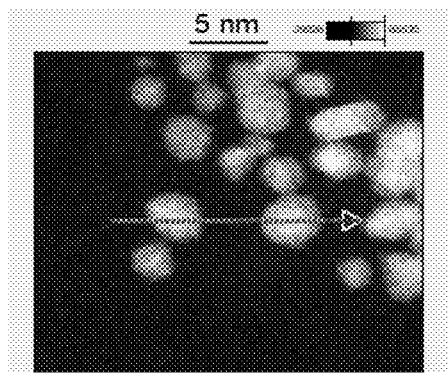
FIG. 48 is a scanning transmission electron micrograph used in EDS line scan analysis in STEM-EDS of the alloy obtained in Example 51.
Figure 49A:
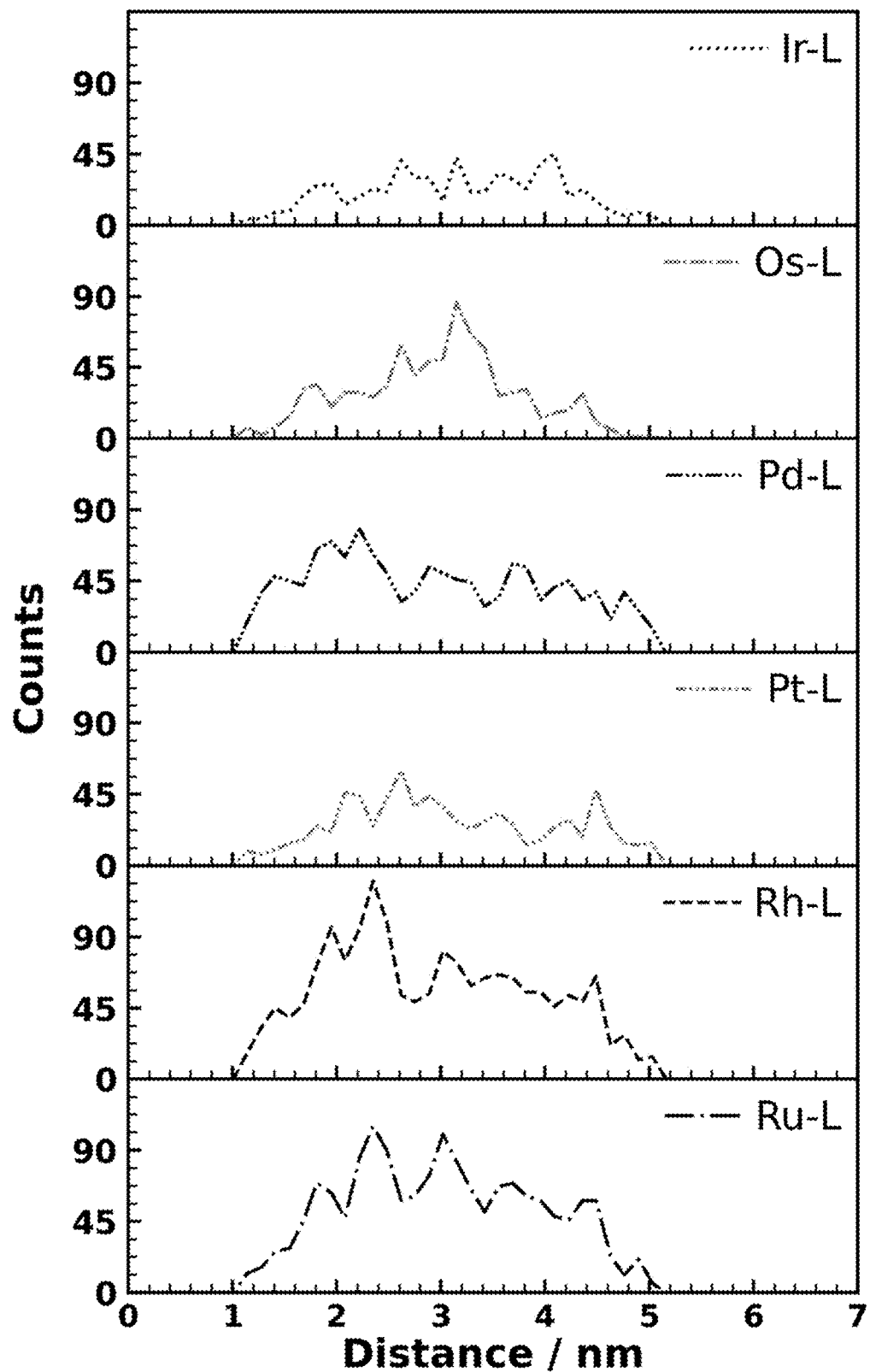
FIG. 49(A) is a graph showing the specific X-ray counts at each position through the arrowed part in FIG. 48.
Figure 49B:
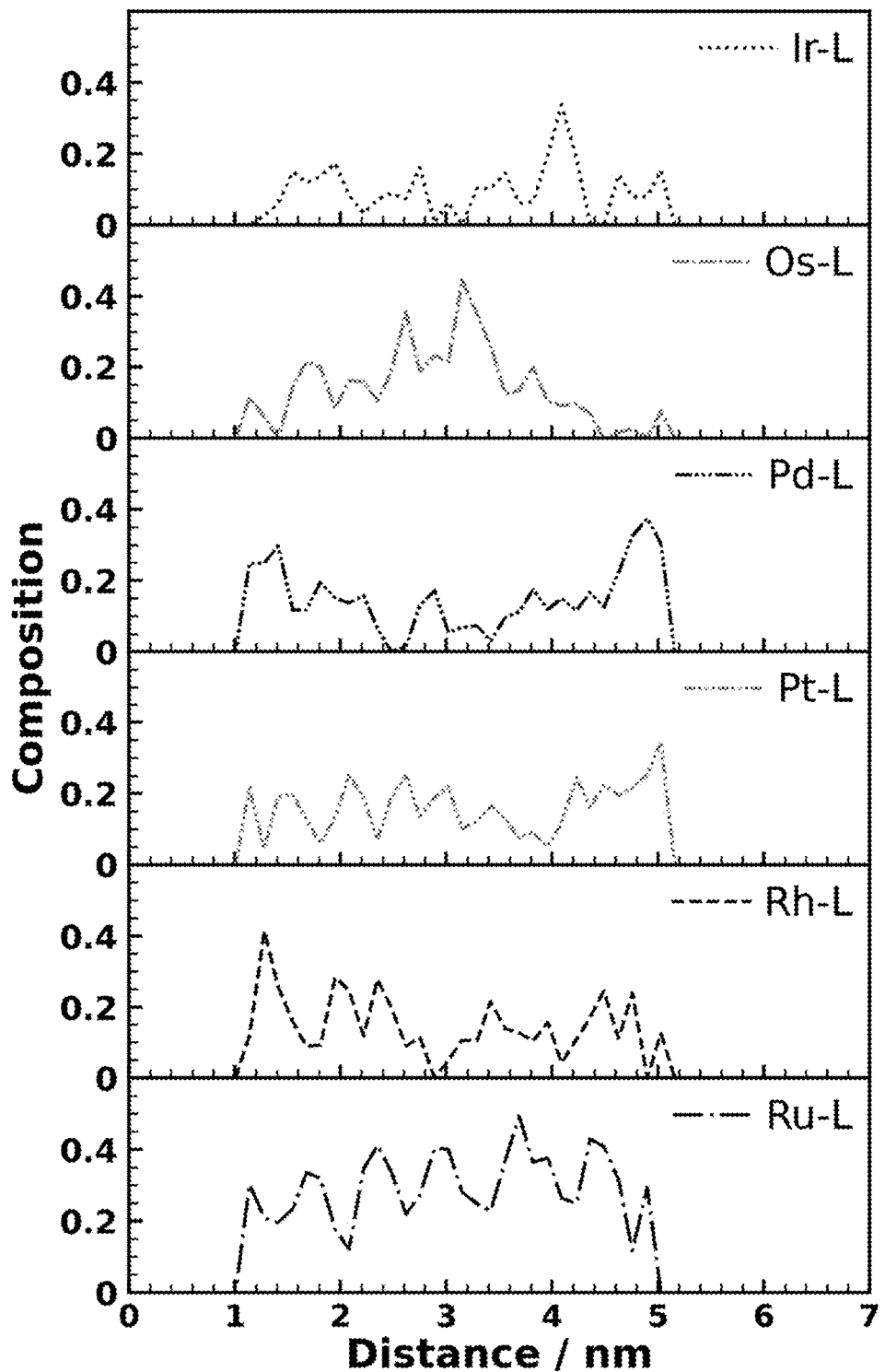
FIG. 49(B) is a graph showing the composition at each position through the arrowed part in FIG. 48.

At the measurement point in FIG. 48, elemental analysis of the nanoparticles obtained in Example 51 was performed at intervals of 0.15 to 0.30 nm in the arrowed part. The background threshold was 30 counts. A graph of the specific X-ray counts and a graph of the composition at each position in the arrowed part in FIG. 48 are shown in FIG. 49(A) and FIG. 49(B), respectively. The average composition and the standard deviation of distribution in the alloy of each element constituting the alloy were determined, and the data are shown in the following Table 17 and Table 18. The average composition, the standard deviation and the correlation coefficient were determined in the same manner as in Example 1.

TABLE 17

|  | Ir | Os | Pd | Pt | Rh | Ru |
|---|---|---|---|---|---|---|
| Average Composition (atomic %) | 10% | 15% | 15% | 16% | 15% | 29% |
| Standard Deviation | 0.07 | 0.11 | 0.09 | 0.07 | 0.09 | 0.10 |

TABLE 18

| Correlation Coefficient | | | | | | |
|---|---|---|---|---|---|---|
| Ir | Os | Pd | Pt | Rh | Ru | |
| 1.00 | 0.01 | −0.09 | −0.13 | −0.07 | −0.34 | Ir |
|  | 1.00 | −0.46 | 0.00 | −0.04 | 0.35 | Os |
|  |  | 1.00 | 0.31 | 0.20 | 0.23 | Pd |
|  |  |  | 1.00 | 0.14 | 0.23 | Pt |
|  |  |  |  | 1.00 | 0.16 | Rh |
|  |  |  |  |  | 1.00 | Ru |

From Tables 17 and 18, it is known that the alloy of the present invention has a high solid solution uniformity in the shape of nanoparticles thereof.

[Example 61]: PdRuIrPtRh

<Individual Ultrasonic Treatment for Metal Ion Solutions>

A metal ion solution was prepared by dissolving $K_2PdCl_4$ in ion-exchanged water, and while kept shielded from light, this was ultrasonicated for 5 minutes.

A metal ion solution was prepared by dissolving $RuCl_3 \cdot nH_2O$ in ion-exchanged water, and while kept shielded from light, this was ultrasonicated for 5 minutes.

A metal ion solution was prepared by dissolving $RhCl_3 \cdot 3H_2O$ in ion-exchanged water, and while kept shielded from light, this was ultrasonicated for 5 minutes.

A metal ion solution was prepared by dissolving $IrCl_4 \cdot xH_2O$ in ion-exchanged water, and while kept shielded from light, this was ultrasonicated for 5 minutes.

A metal ion solution was prepared by dissolving $K_2[PtCl_4]$ in ion-exchanged water, and while kept shielded from light, this was ultrasonicated for 5 minutes.

The five metal ion solutions that had been individually ultrasonicated were mixed in 1/1/1/1/1, and about 2.0 ml of each metal ion mixed solution of 0.200 mmol TEG solution was dissolved and combined to be 10 ml.

<Preparation of Alloy>

100 ml of triethylene glycol (TEG) containing polyvinylpyrrolidone (PVP) K30 (4 mmol: by FUJIFILM Wako Pure Chemical Corporation) was stirred under heat at 230° C.

To the solution, the metal ion mixed solution was added dropwise at a rate of 1.5 ml/min using a syringe pump and kept at 230° C. for 10 minutes. Subsequently, this rapidly cooled to room temperature. The formed precipitate of nanoparticles was separated by centrifugation.

<Elementary Analysis)

The separated nanoparticles were analyzed by STEM-EDS. By line scanning elemental analysis with a scanning transmission electron microscope for plural fields of view, the metal composition of the five elements was calculated.

Figure 50:
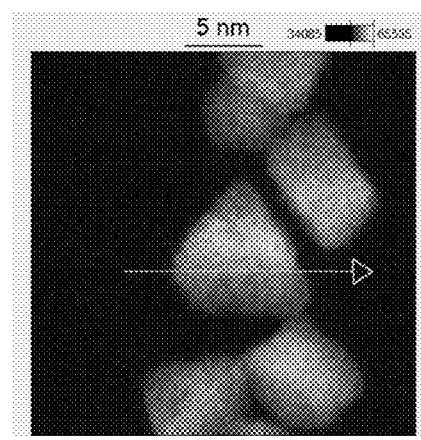
FIG. 50 is a scanning transmission electron micrograph used in EDS line scan analysis in STEM-EDS of the alloy obtained in Example 61.
Figure 51A:
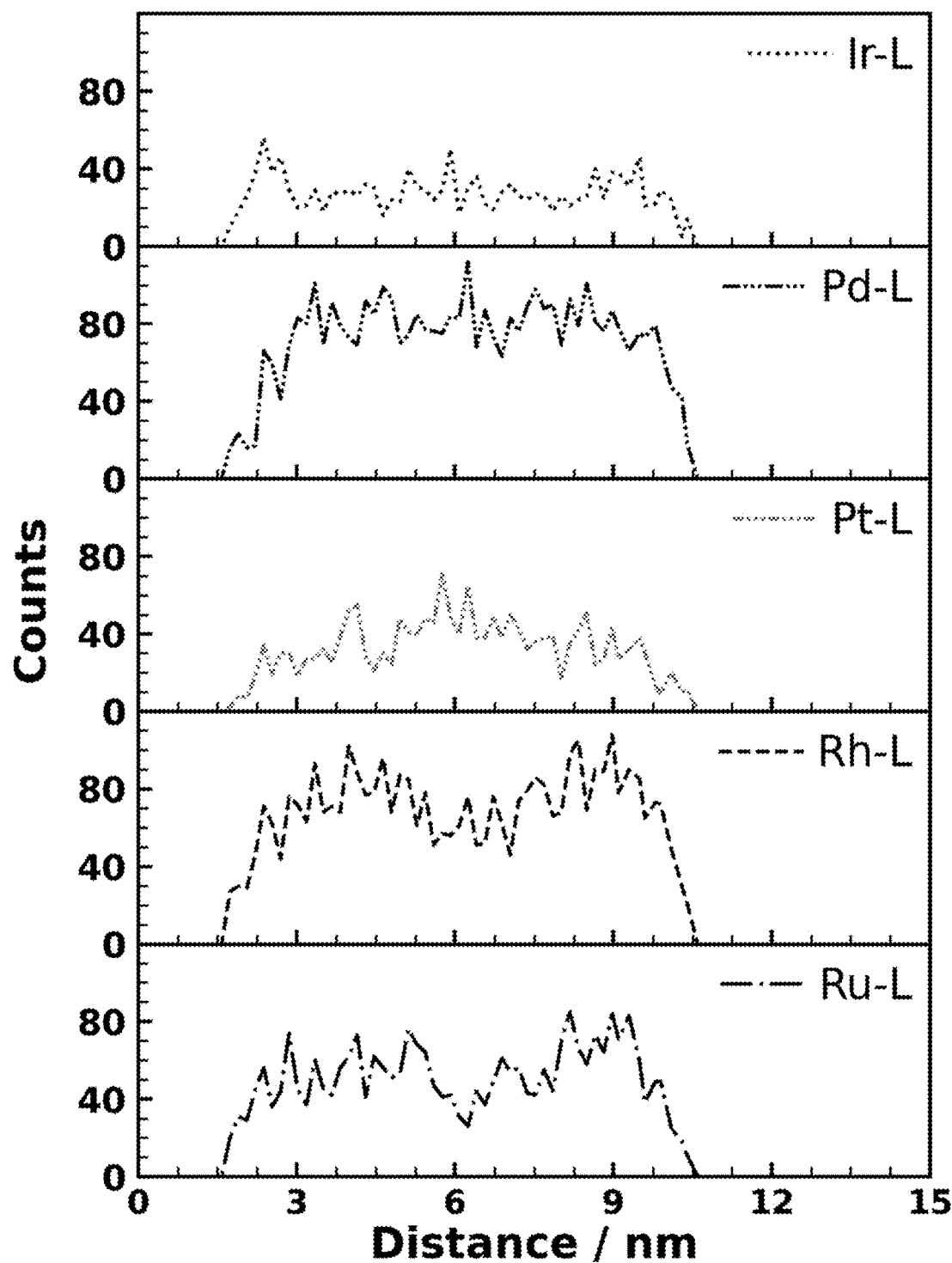
FIG. 51(A) is a graph showing the specific X-ray counts at each position through the arrowed part in FIG. 50.
Figure 51B:
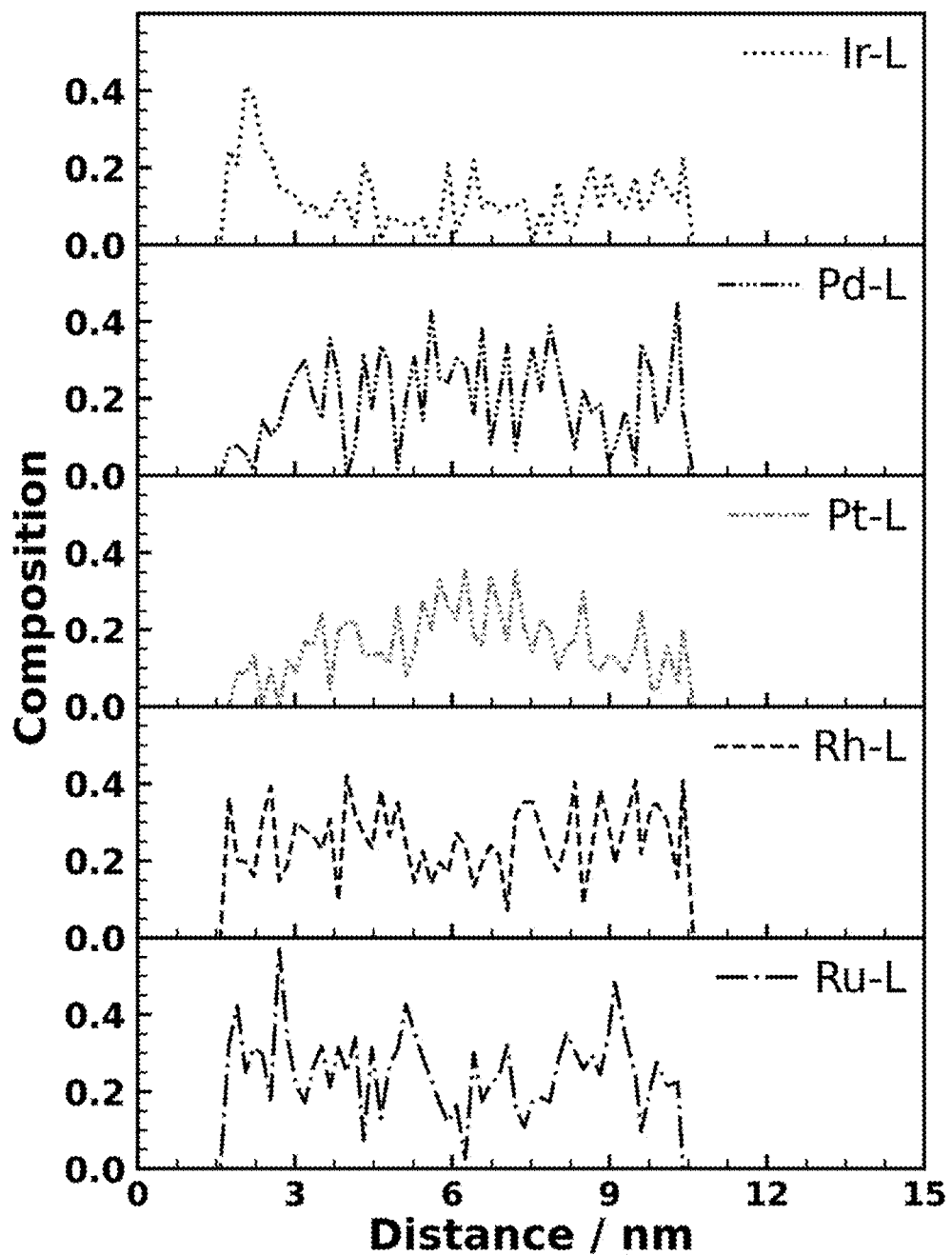
FIG. 51(B) is a graph showing the composition at each position through the arrowed part in FIG. 50.

At the measurement point in FIG. 50, elemental analysis of the nanoparticles obtained in Example 61 was performed at intervals of 0.15 to 0.30 nm in the arrowed part. The background threshold was 30 counts. A graph of the specific X-ray counts and a graph of the composition at each position in the arrowed part in FIG. 50 are shown in FIG. 51(A) and FIG. 51(B), respectively. The average composition and the standard deviation of distribution in the alloy of each element constituting the alloy were determined, and the data are shown in the following Table 19 and Table 20. The average composition, the standard deviation and the correlation coefficient were determined in the same manner as in Example 1.

TABLE 19

|  | Ir | Pd | Pt | Rh | Ru |
|---|---|---|---|---|---|
| Average Composition (atomic %) | 13% | 20% | 16% | 26% | 25% |
| Standard Deviation | 0.08 | 0.11 | 0.08 | 0.09 | 0.10 |

TABLE 20

| Correlation Coefficient | | | | | |
|---|---|---|---|---|---|
| Ir | Pd | Pt | Rh | Ru | |
| 1.00 | −0.32 | −0.16 | 0.18. | 0.21 | Ir |
|  | 1.00 | 0.15 | −0.01 | −0.10 | Pd |
|  |  | 1.00 | 0.21 | −0.12 | Pt |
|  |  |  | 1.00 | 0.14 | Rh |
|  |  |  |  | 1.00 | Ru |

From Tables 19 and 20, it is known that the alloy of the present invention has a high solid solution uniformity in the shape of nanoparticles thereof.

The invention claimed is:

1. An alloy composed of three or more types of elements, wherein:
   all the standard deviation of distribution in the alloy of each element constituting the alloy are each 15 atomic % or less; and
   the alloy is nanoparticles having an average particle size of 0.5 to 30 nm.

2. The alloy according to claim 1, wherein all the correlation coefficient of distribution of two elements constituting the alloy are within ±0.50.

3. The alloy according to claim 1, wherein the elements constituting the alloy include a combination of elements not dissolving in a phase equilibrium diagram in solid solution.

4. The alloy according to claim 1, wherein the elements constituting the alloy contain at least three types of elements of the group consisting of platinum group elements (Ru, Rh, Pd, Os, Ir, Pt), Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, H, B, Al, C, Si, N, P, Y, Zr, Nb, lanthanoids, Hf and Ta.

5. The alloy according to claim 1, wherein the elements constituting the alloy contain at least one type of elements of the group consisting of Ru, Rh, Pd, Os, Ir, Pt, Ag, Au and Ni.

6. The alloy according to claim 1, wherein:
   the number of types of elements constituting the alloy is m, with m being an integer of three or more,
   and wherein the average composition in the alloy of each i element constituting the alloy is $C_1$ atomic %, with i being an integer of 1 or more and m or less,
   all the standard deviation of distribution of each element in the alloy is $2.5 \times s_i \times 100$ atomic % or less where $s_i$ are expressed by the following formula 1:

$$s_i = \sqrt{\frac{c_i(100 - c_i)}{N}} \quad \text{Formula 1}$$

wherein $s_i$ represents a standard deviation relative to each element i in the composition distribution in a microvolume 1 nm³ to be analyzed, and N represents a number of atoms per the microvolume 1 nm³ to be analyzed.

7. The alloy according to claim 1, wherein the standard deviation of distribution in the alloy of each element constituting the alloy is 40% or less of the composition ratio of the element in the alloy.

8. The alloy according to claim 1, which is an aggregate of the nanoparticles.

9. The alloy according to claim 1, wherein the nanoparticles are held on a carrier.

10. The alloy according to claim 9, wherein the carrier is a non-carbon material carrier or a granular carbon carrier.

11. An aggregate of alloy nanoparticles, containing the alloy of claim 1 in an amount of 98% by number or more.

12. A catalyst containing the alloy of claim 1.

* * * * *